United States Patent [19]
Bailey, Jr. et al.

[11] 3,984,814
[45] Oct. 5, 1976

[54] RETRY METHOD AND APPARATUS FOR USE IN A MAGNETIC RECORDING AND REPRODUCING SYSTEM

[75] Inventors: Myrl Kennedy Bailey, Jr., North Billerica; George J. Barlow, Tewksbury, both of Mass.

[73] Assignee: Honeywell Information Systems, Inc., Waltham, Mass.

[22] Filed: Dec. 24, 1974

[21] Appl. No.: 536,281

[52] U.S. Cl. ................ 340/172.5; 235/153 AK
[51] Int. Cl.² ................ G06F 11/00; G06F 13/04
[58] Field of Search .......... 340/172.5; 235/153 AK

[56] References Cited
UNITED STATES PATENTS

| | | | |
|---|---|---|---|
| 3,539,996 | 11/1970 | Bee et al. | 340/172.5 |
| 3,618,042 | 11/1971 | Miki et al. | 340/172.5 |
| 3,688,274 | 8/1972 | Cormier et al. | 340/172.5 |
| 3,736,566 | 5/1973 | Anderson et al. | 340/172.5 |
| 3,806,878 | 4/1974 | Edstrom | 340/172.5 |

Primary Examiner—Gareth D. Shaw
Assistant Examiner—Melvin B. Chapnick
Attorney, Agent, or Firm—Faith F. Driscoll; Ronald T. Reiling

[57] ABSTRACT

A magnetic tape subsystem includes a peripheral controller which processes data signals of a block received during the reading and recording of the block on a magnetic tape medium by a selected one of a plurality of magnetic tape devices in response to commands received from a data processing system. The peripheral controller includes a data recovery unit having a plurality of storage indicators. These indicators are set by the controller in accordance with the characteristics of the block of data signals recovered by the data recovery unit providing indications of the results of the reading or recording operation performed by the selected magnetic tape device during the peripheral controller's execution of the command. The controller divides up the interval of time of an operation into a number of time periods and monitors the characteristics of the signals of a block which should be received by the data recovery unit during those intervals. During execution of a write command, the controller monitors the tape recording or write operation during different time intervals by monitoring the continuity of the signals recorded by the magnetic tape device indications of which the data recovery unit receives during its performance of a read after write checking operation. The various indicators signal whether the block written was normal or was damaged in addition to signaling the extent of damage which occurred during the writing of the block. Signals representative of the indications are grouped to specify at least two types of error conditions which are tested by the controller to establish whether the command is retryable and nonretryable. The peripheral controller initiates a retry of the command executed only when the indicator signal that the extent of damage has not exceeded a predetermined amount thereby ensuring that only commands which can be retried successfully are re-executed. The controller performs similar monitoring operations during the execution of read commands for establishing signal indications used in determining whether the command should be retried upon detection of errors in the block read by the data recovery unit.

39 Claims, 68 Drawing Figures

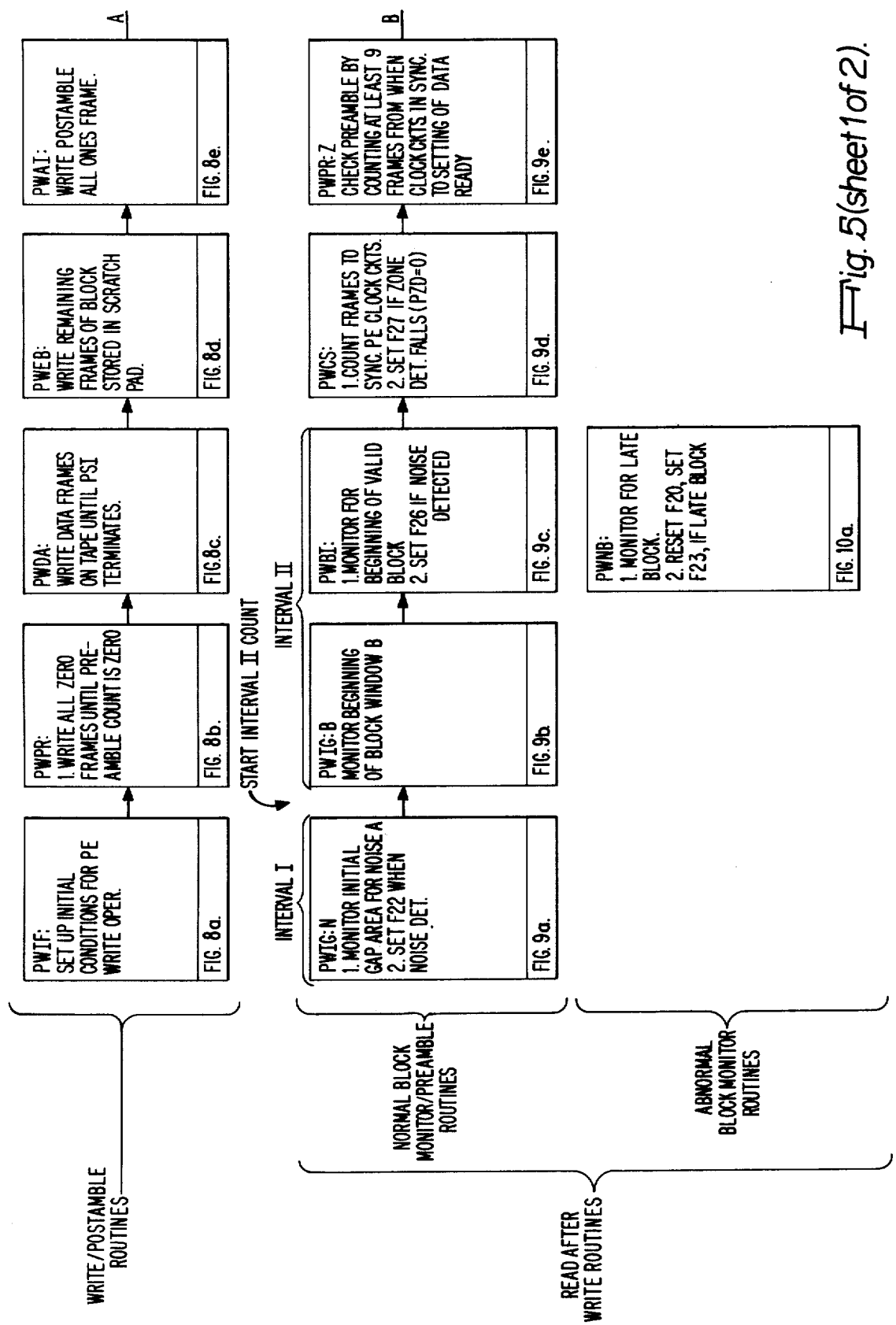
Fig. 5 (sheet 1 of 2).

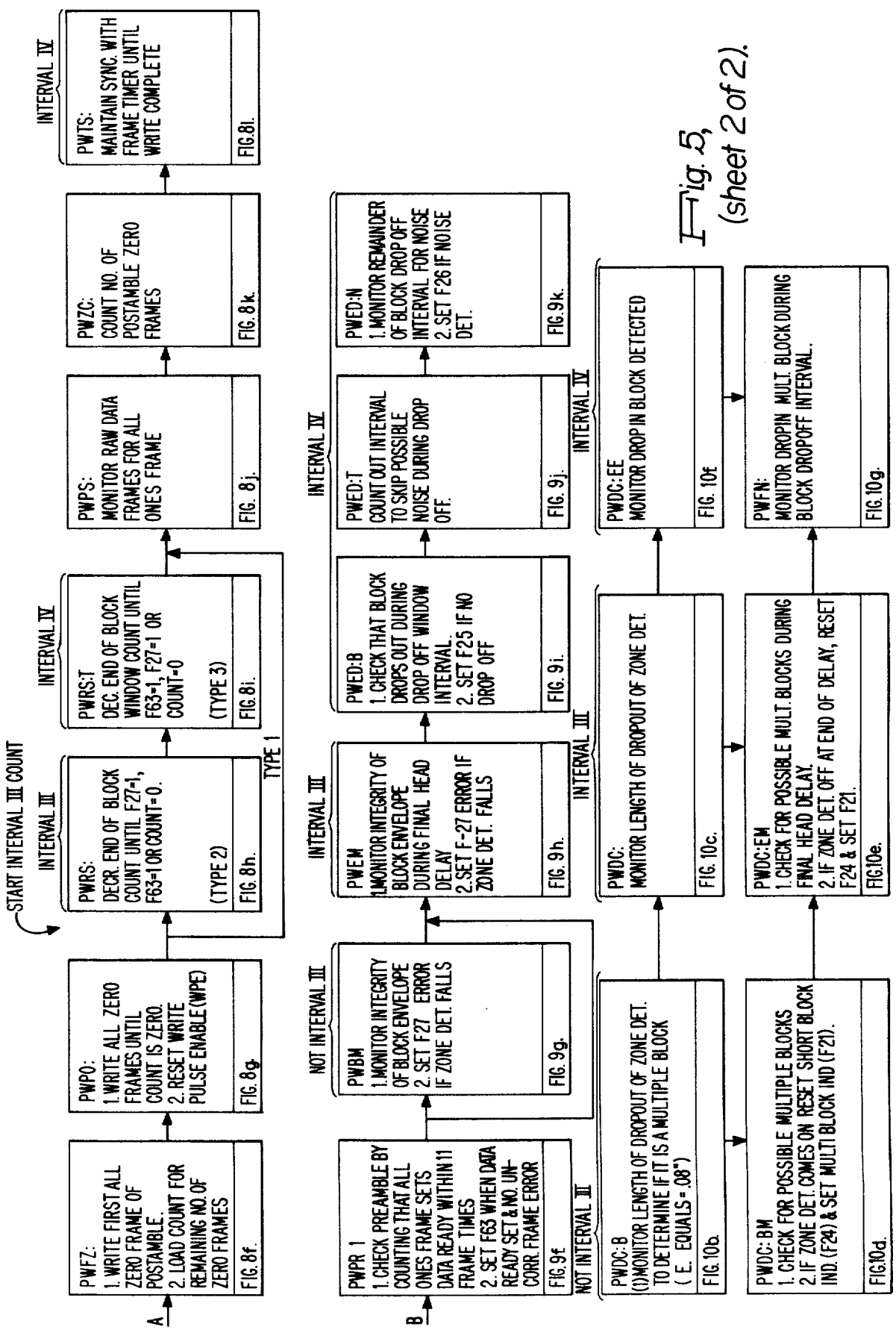

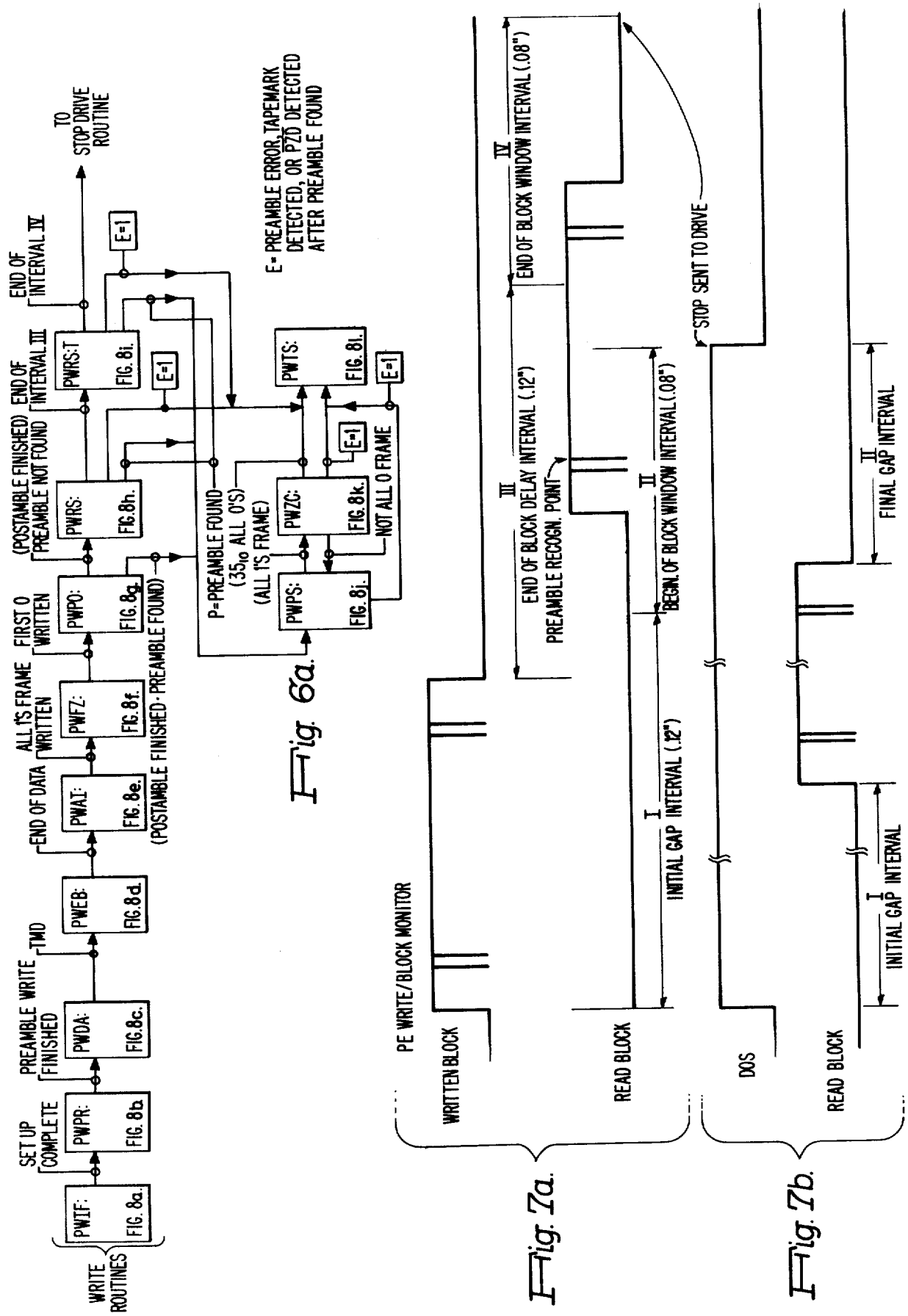

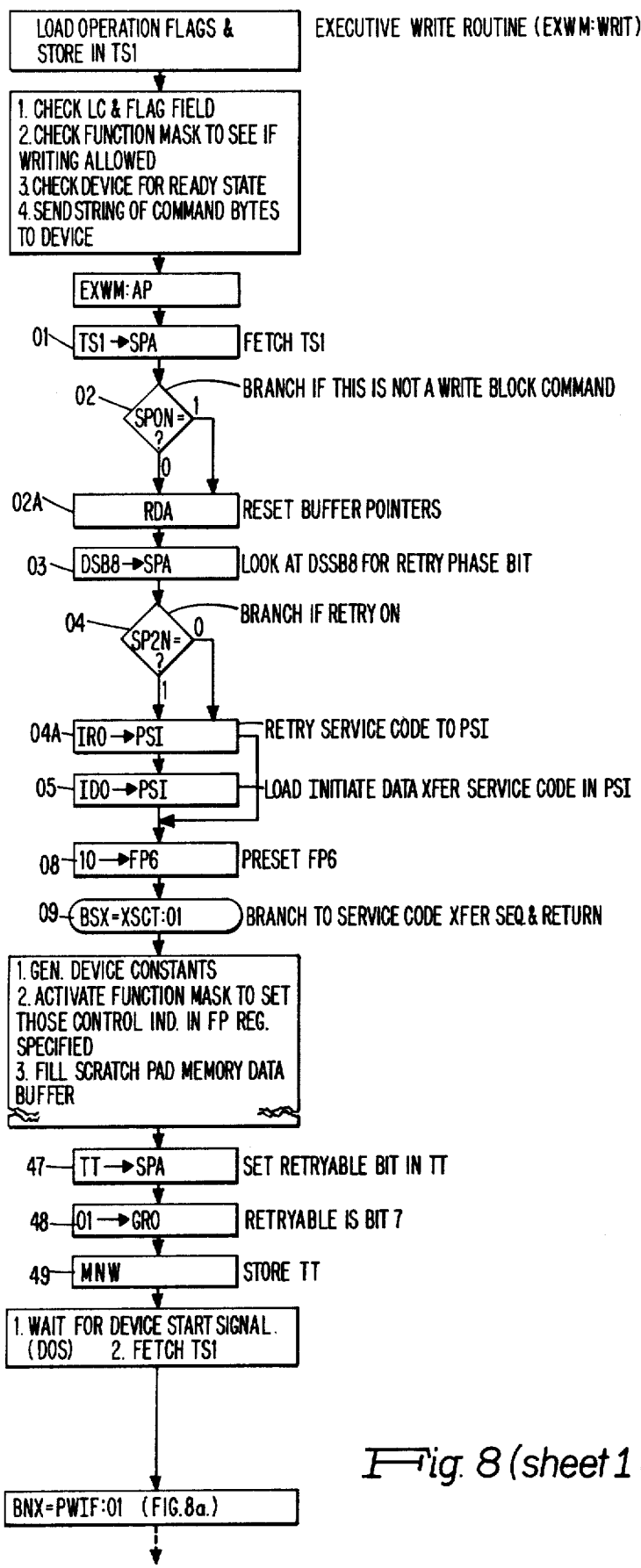
Fig. 8 (sheet 1 of 2).

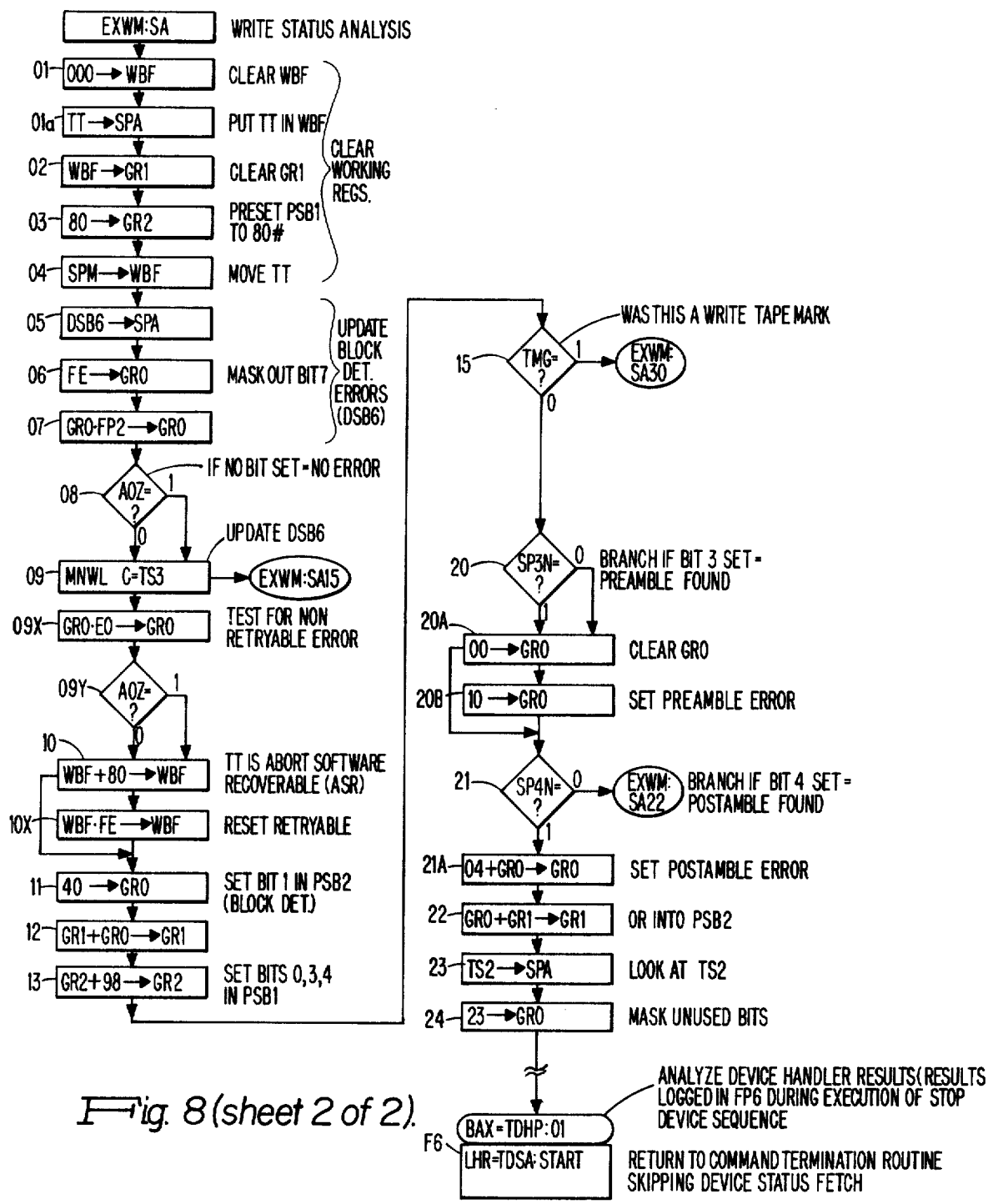
Fig. 8 (sheet 2 of 2).

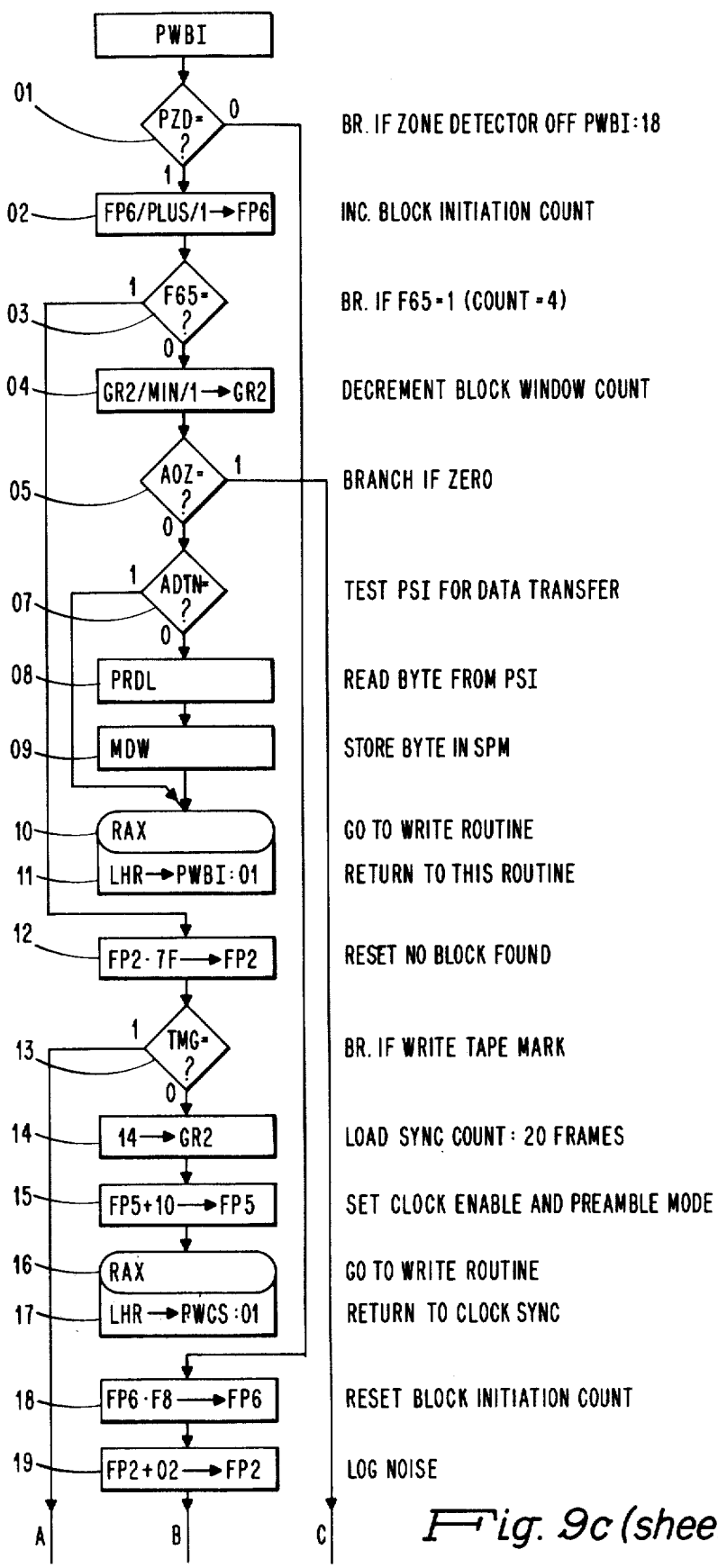
Fig. 9c (sheet 1 of 2)

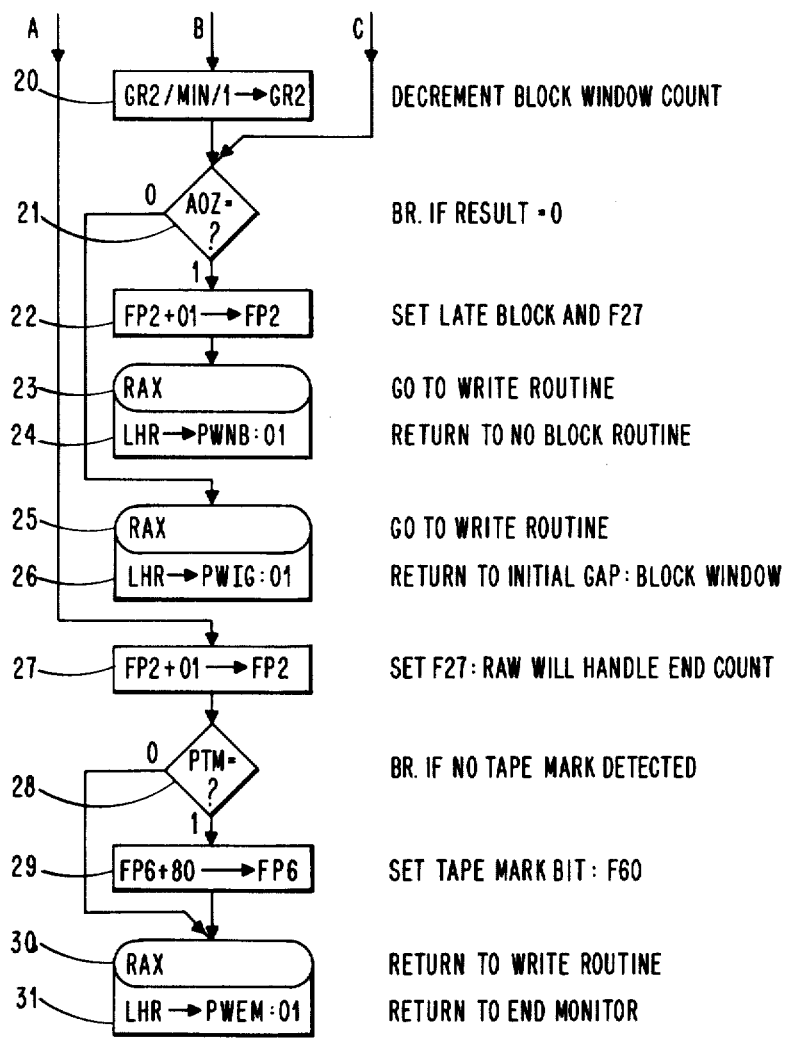
Fig. 9c (sheet 2 of 2)

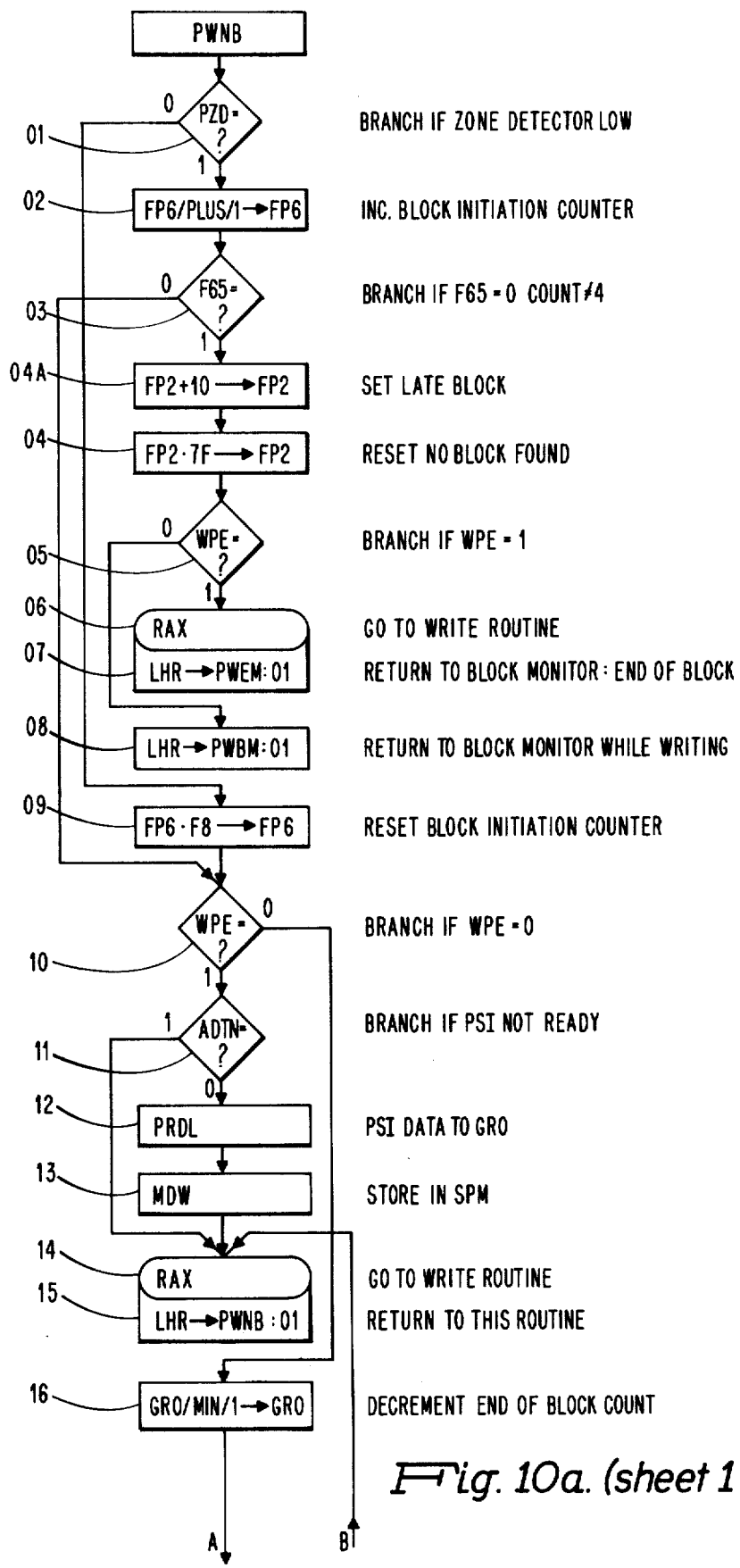
Fig. 10a. (sheet 1 of 2)

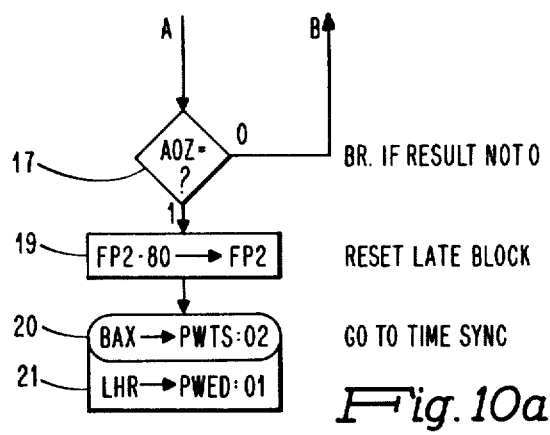
Fig. 10a. (sheet 2 of 2)
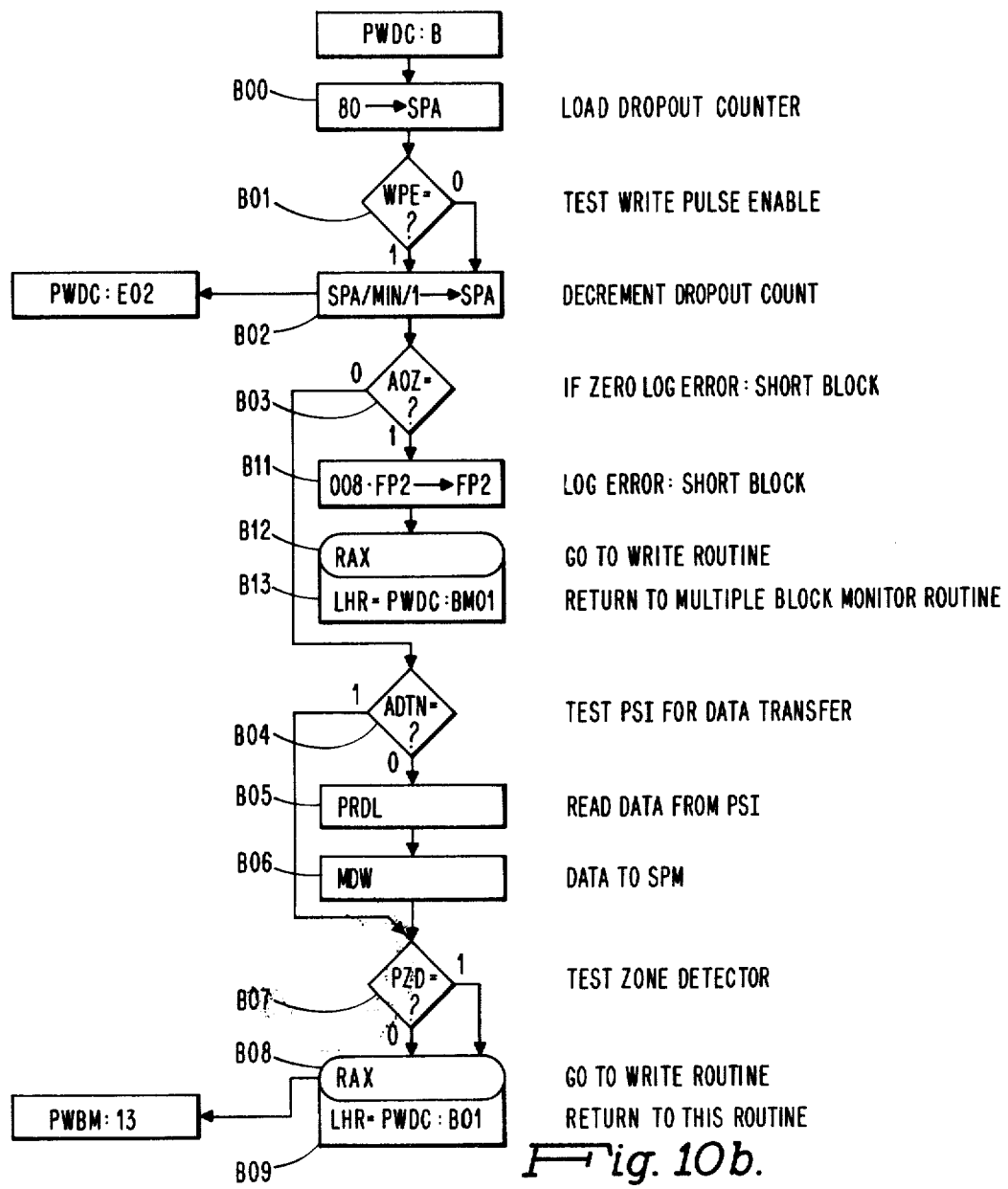
Fig. 10b.

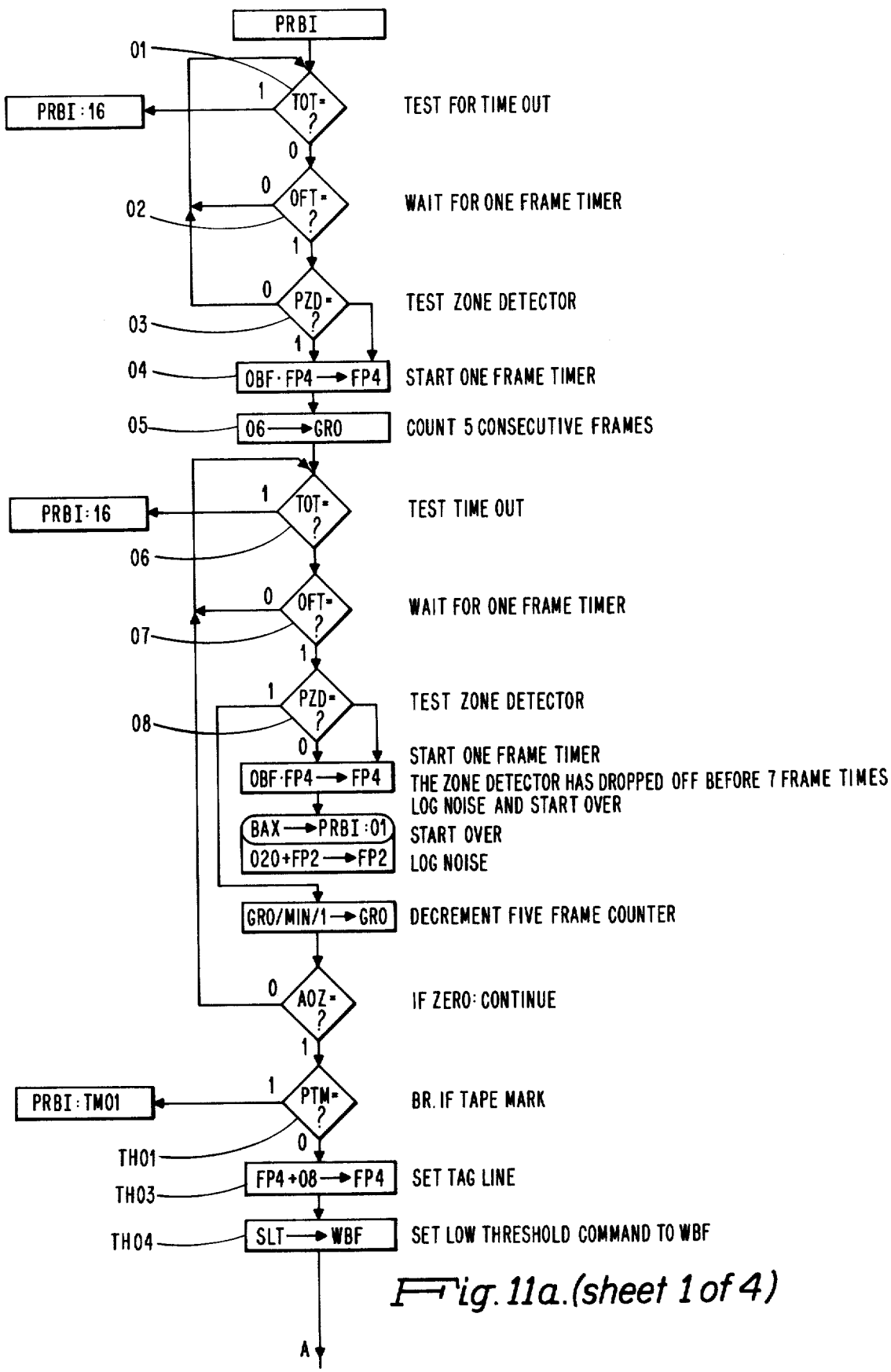
Fig. 11a.(sheet 1 of 4)

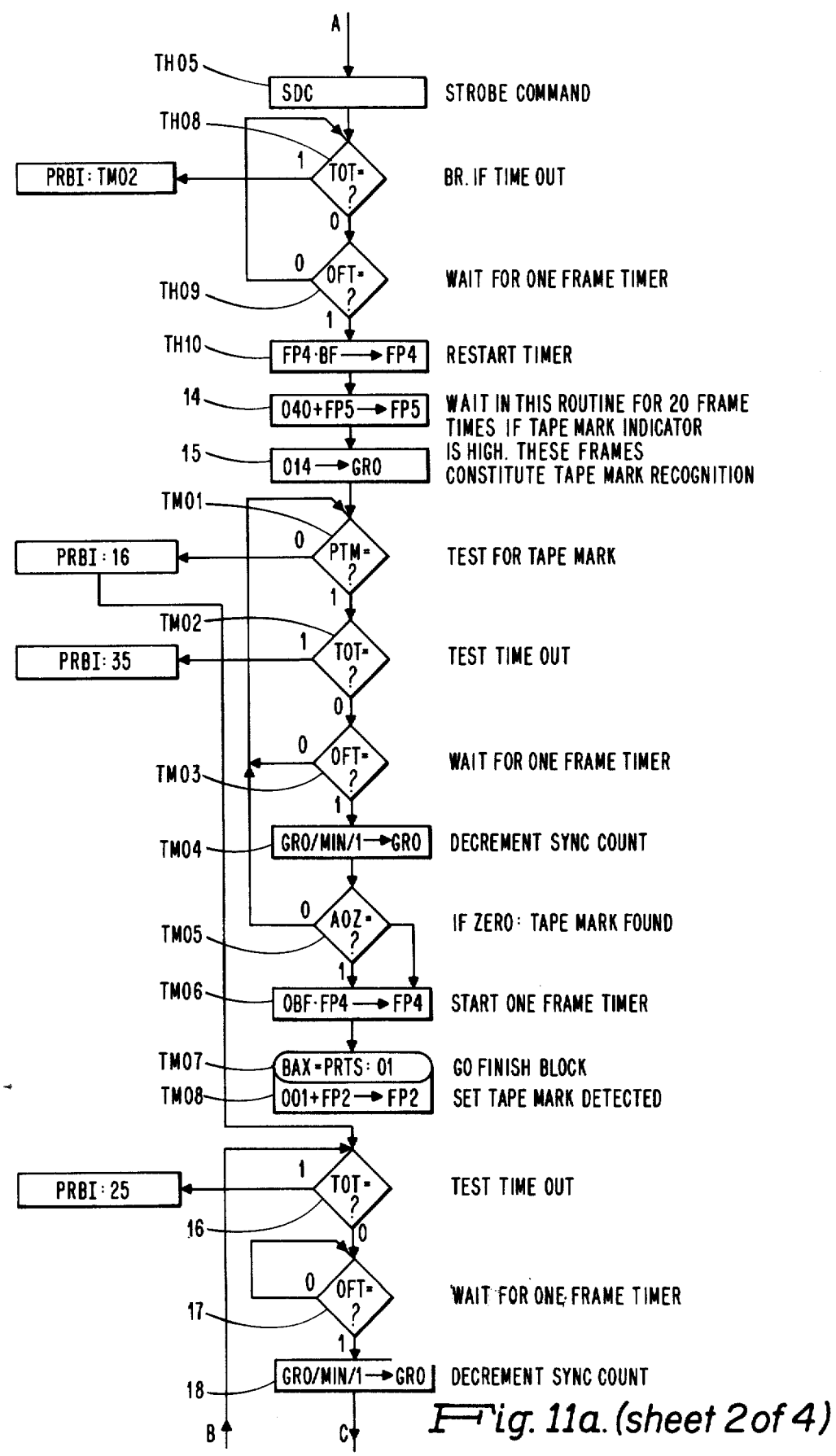
Fig. 11a. (sheet 2 of 4)

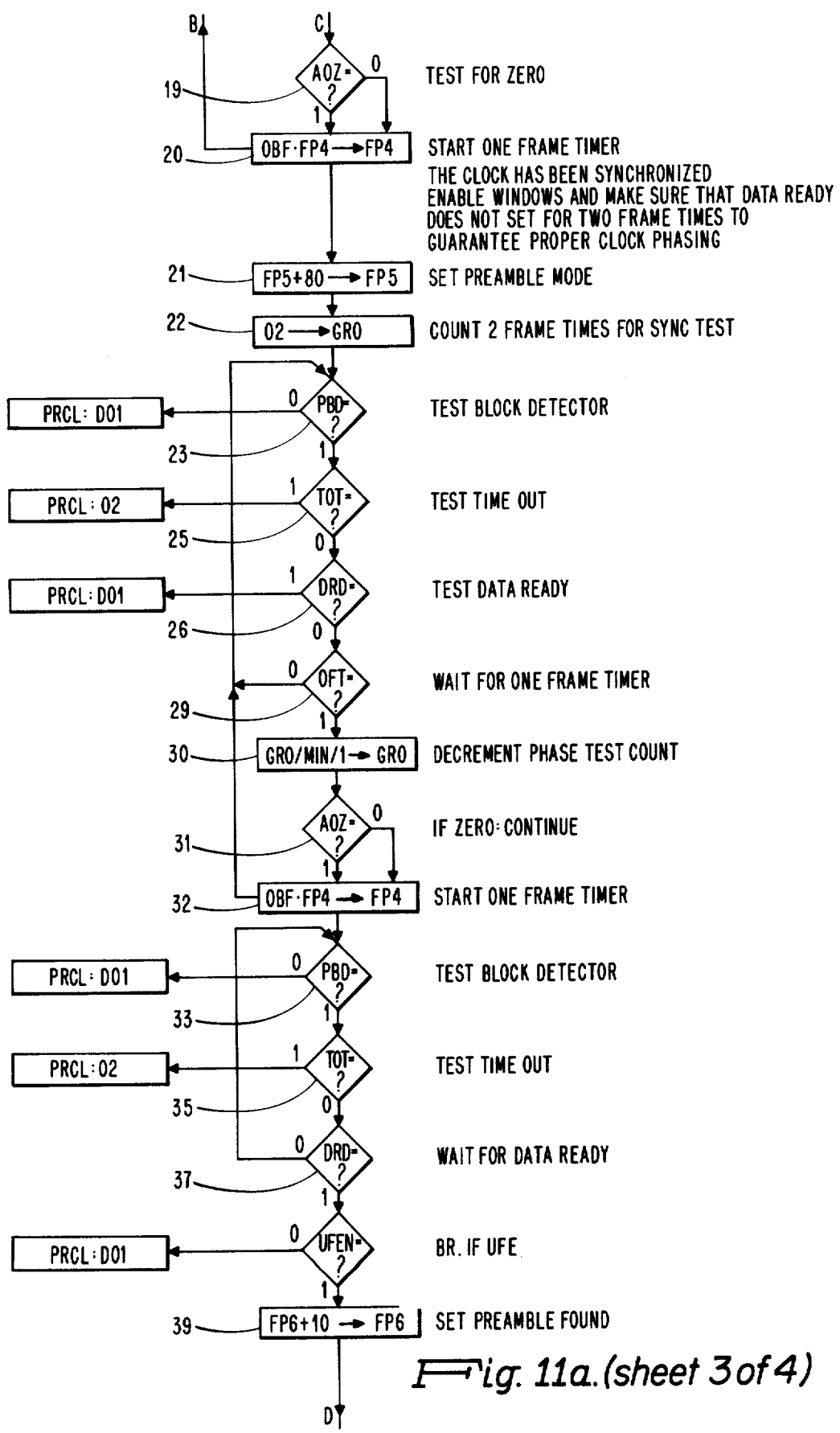
Fig. 11a.(sheet 3 of 4)

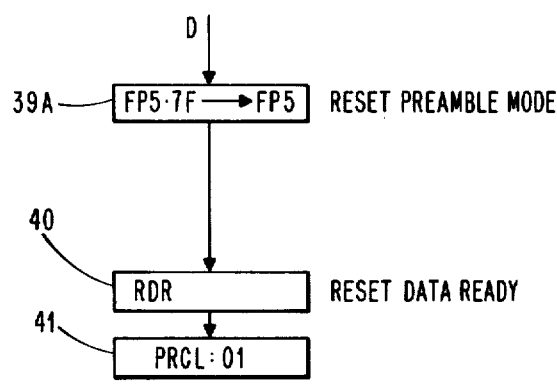
Fig. 11a. (sheet 4 of 4)
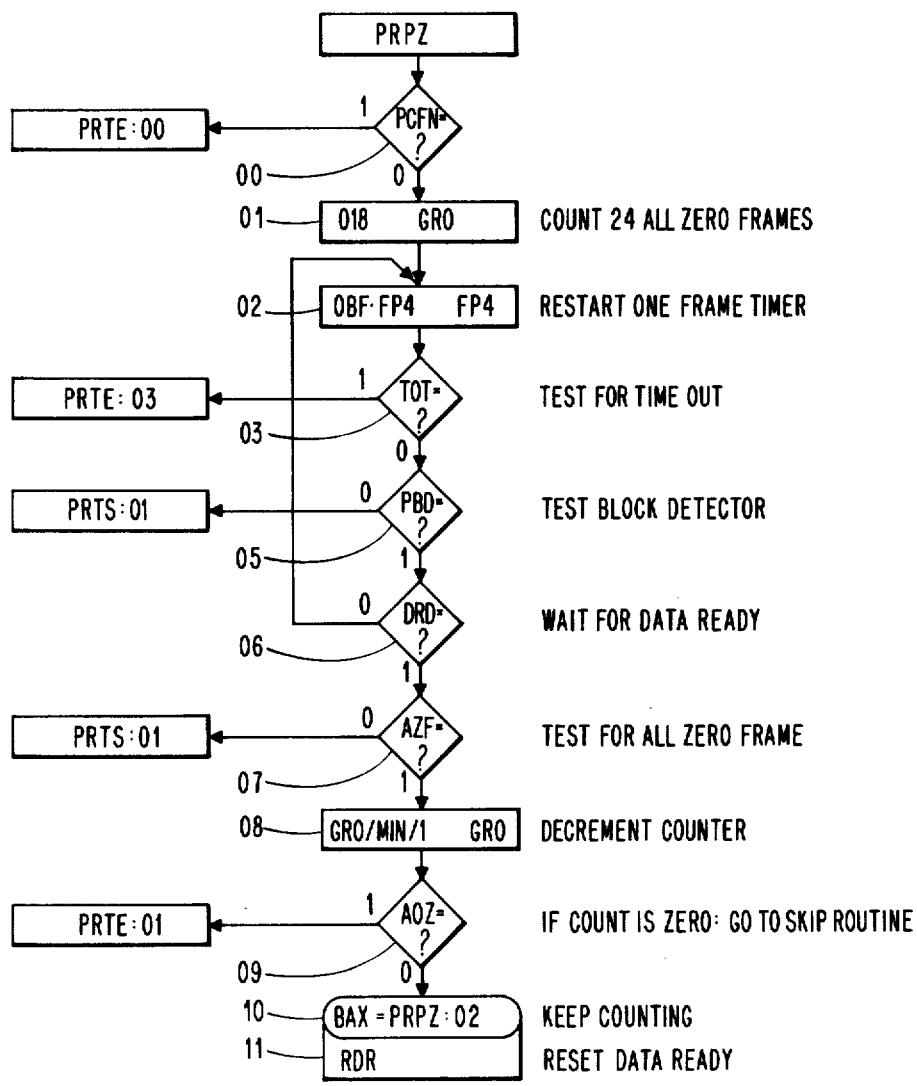
Fig. 11c.

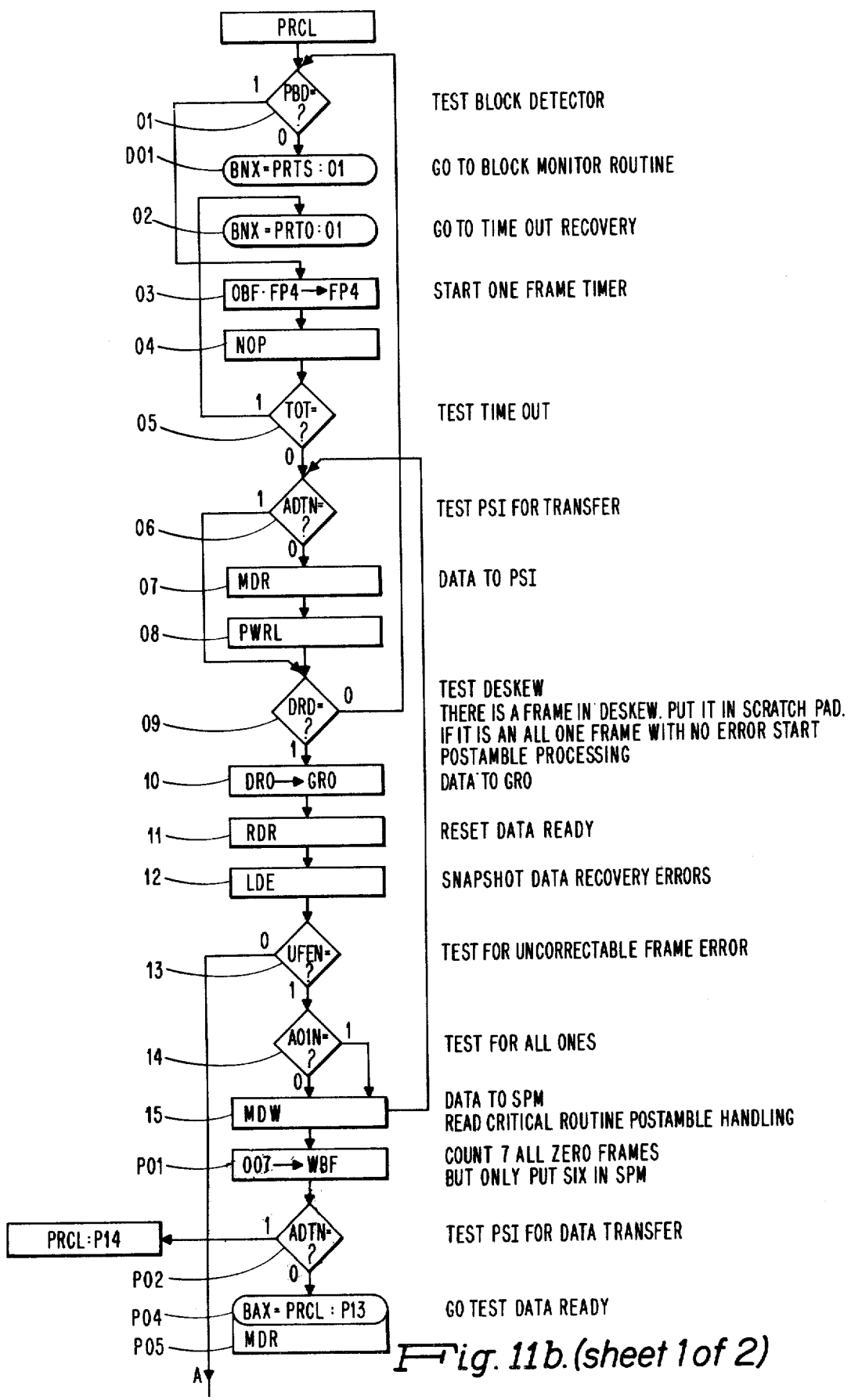
Fig. 11b. (sheet 1 of 2)

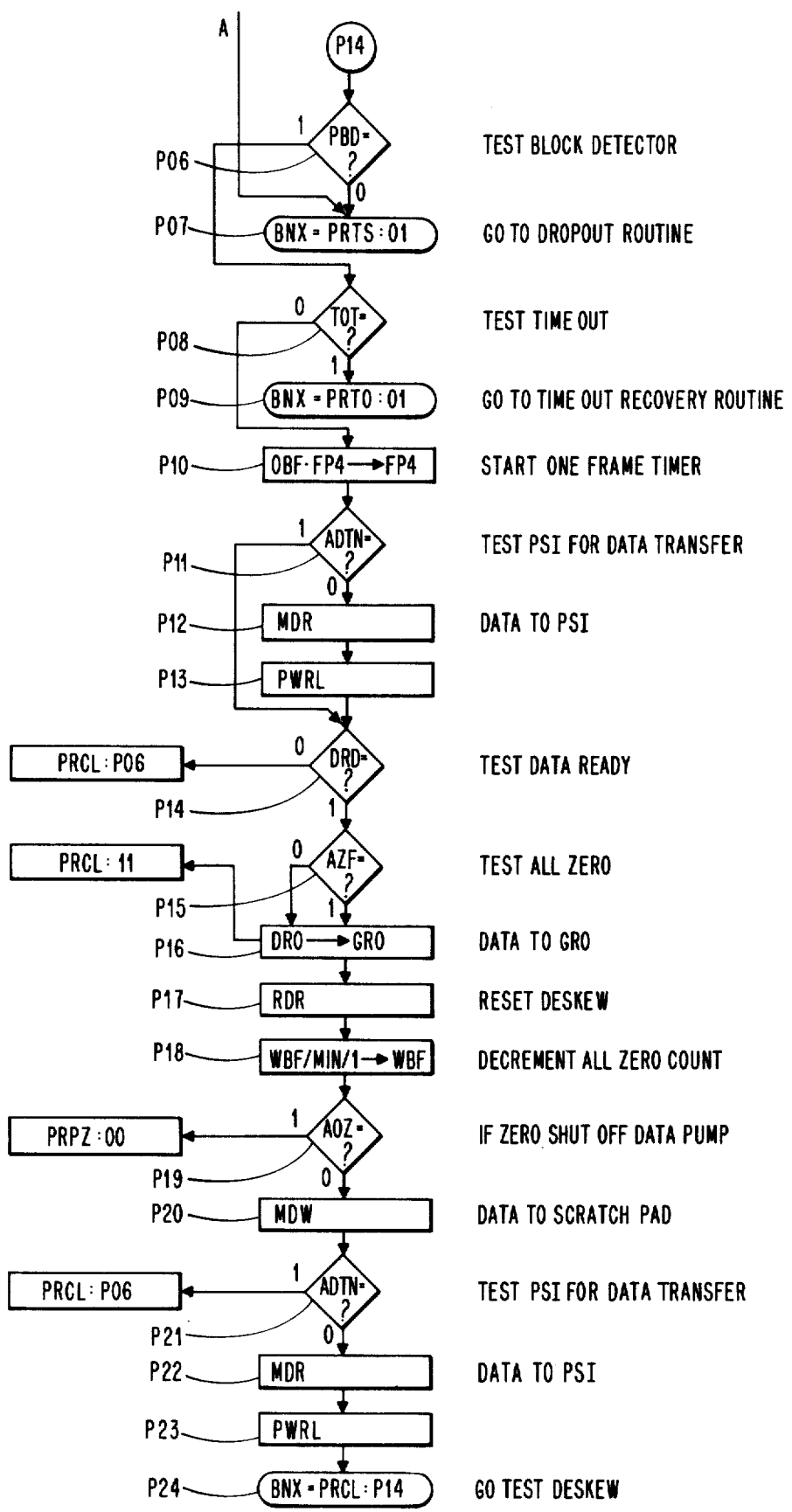
Fig. 11b.(sheet 2 of 2)

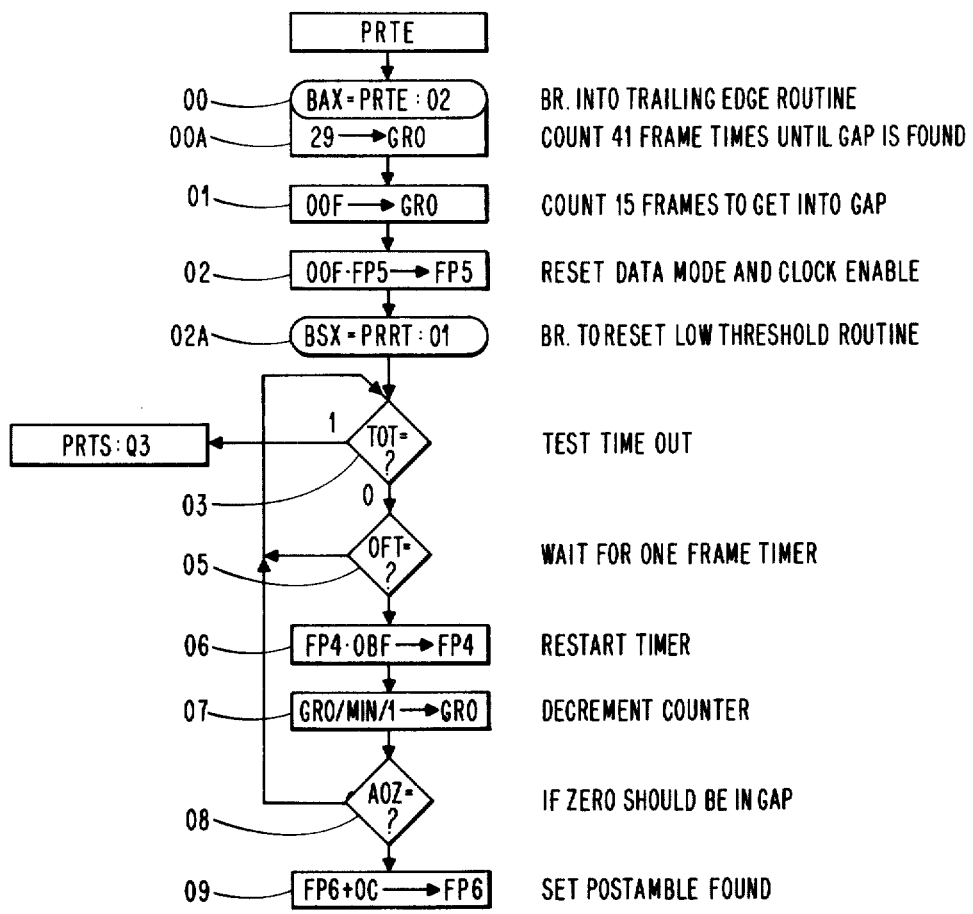
Fig. 11d.
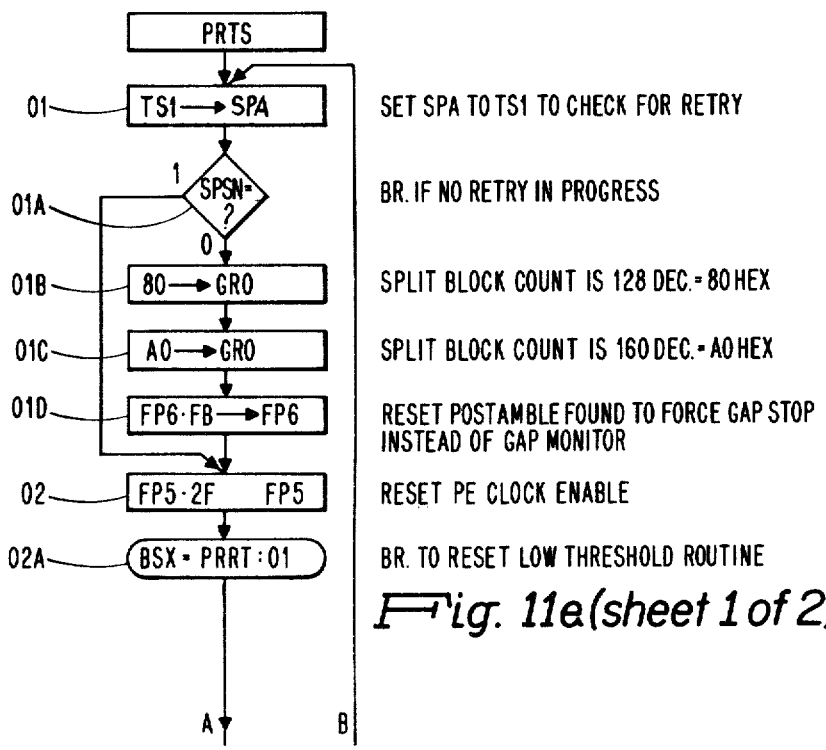
Fig. 11e (sheet 1 of 2)

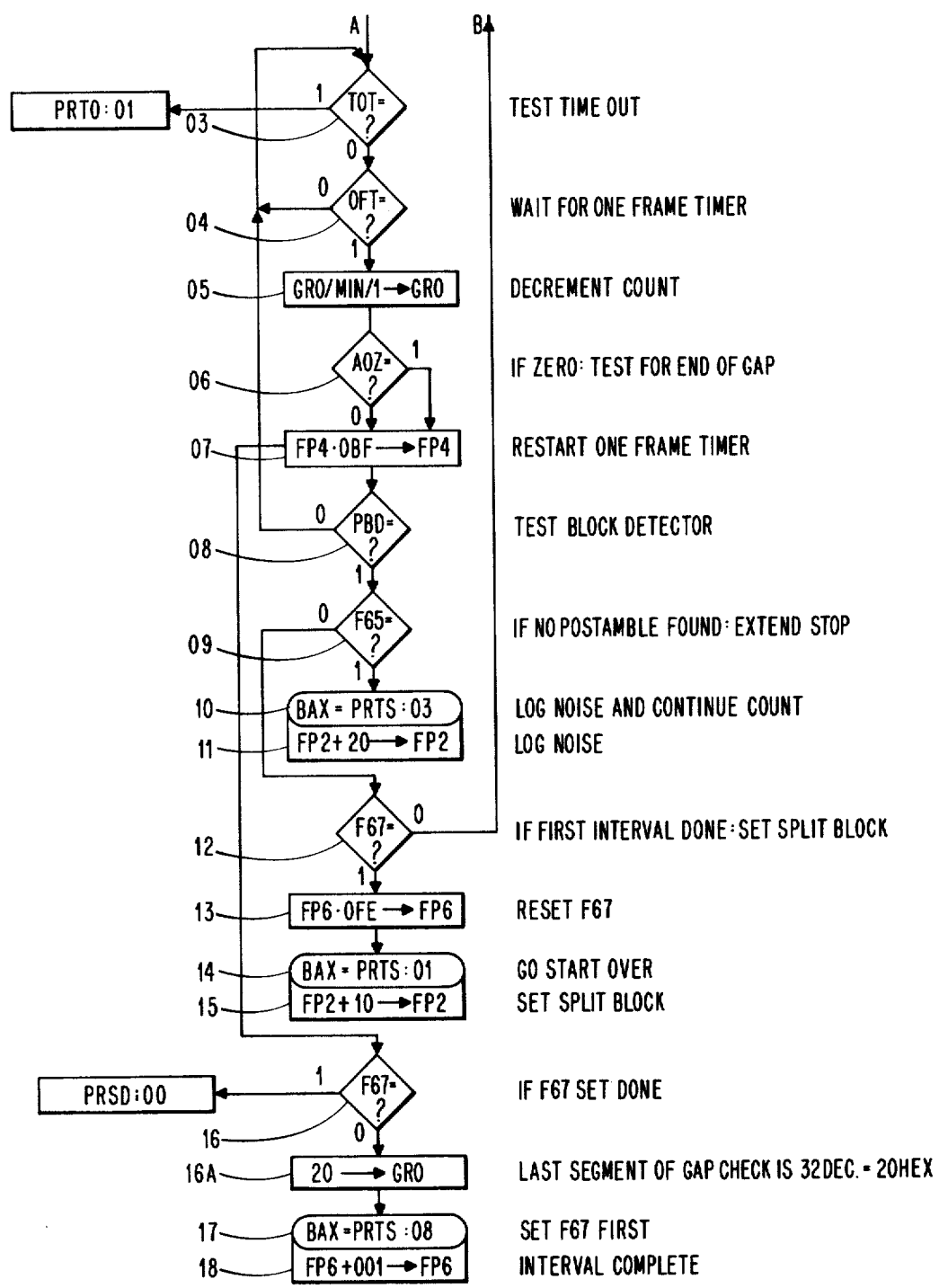
Fig. 11a. (sheet 2 of 2)

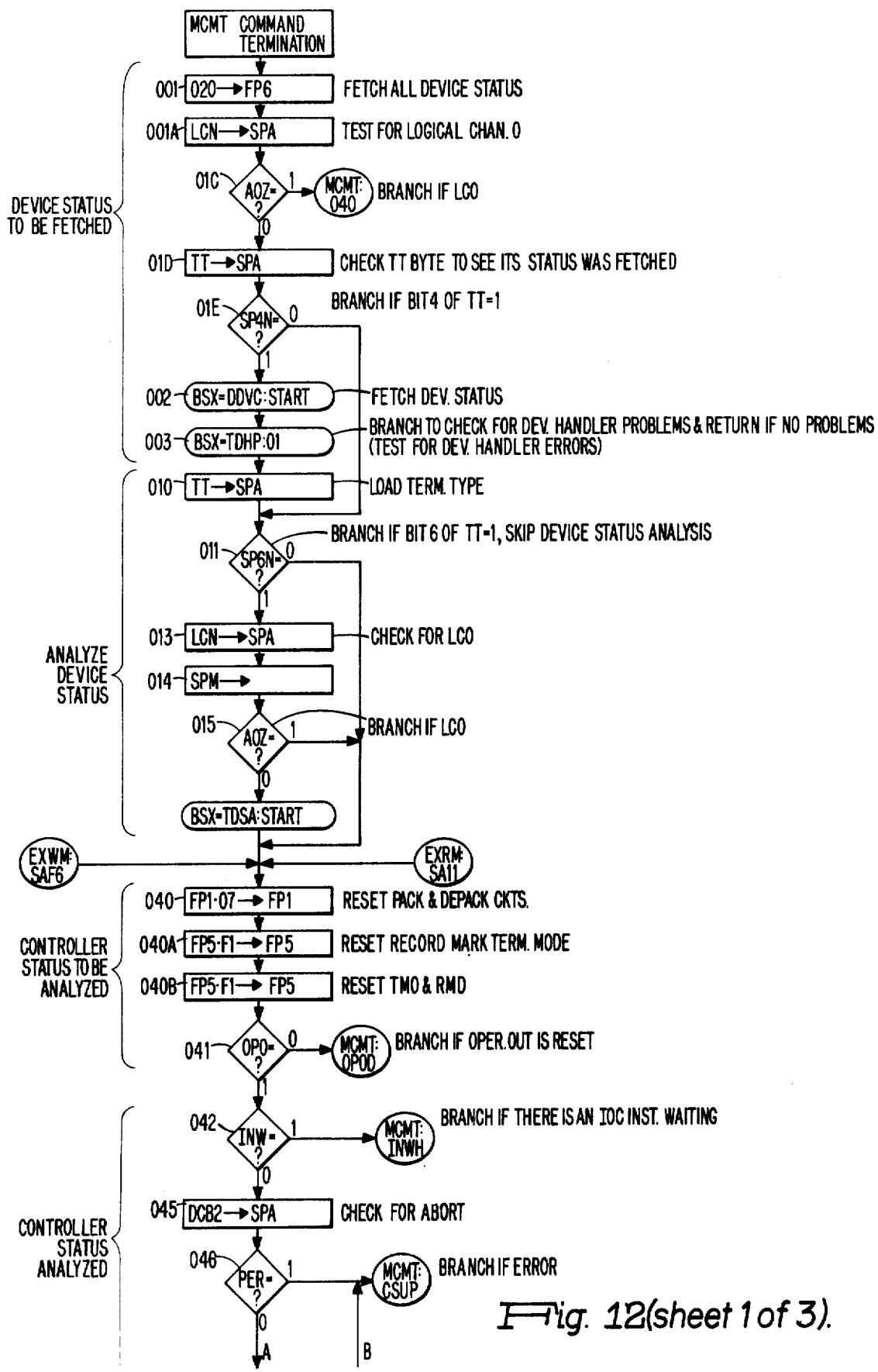
Fig. 12 (sheet 1 of 3).

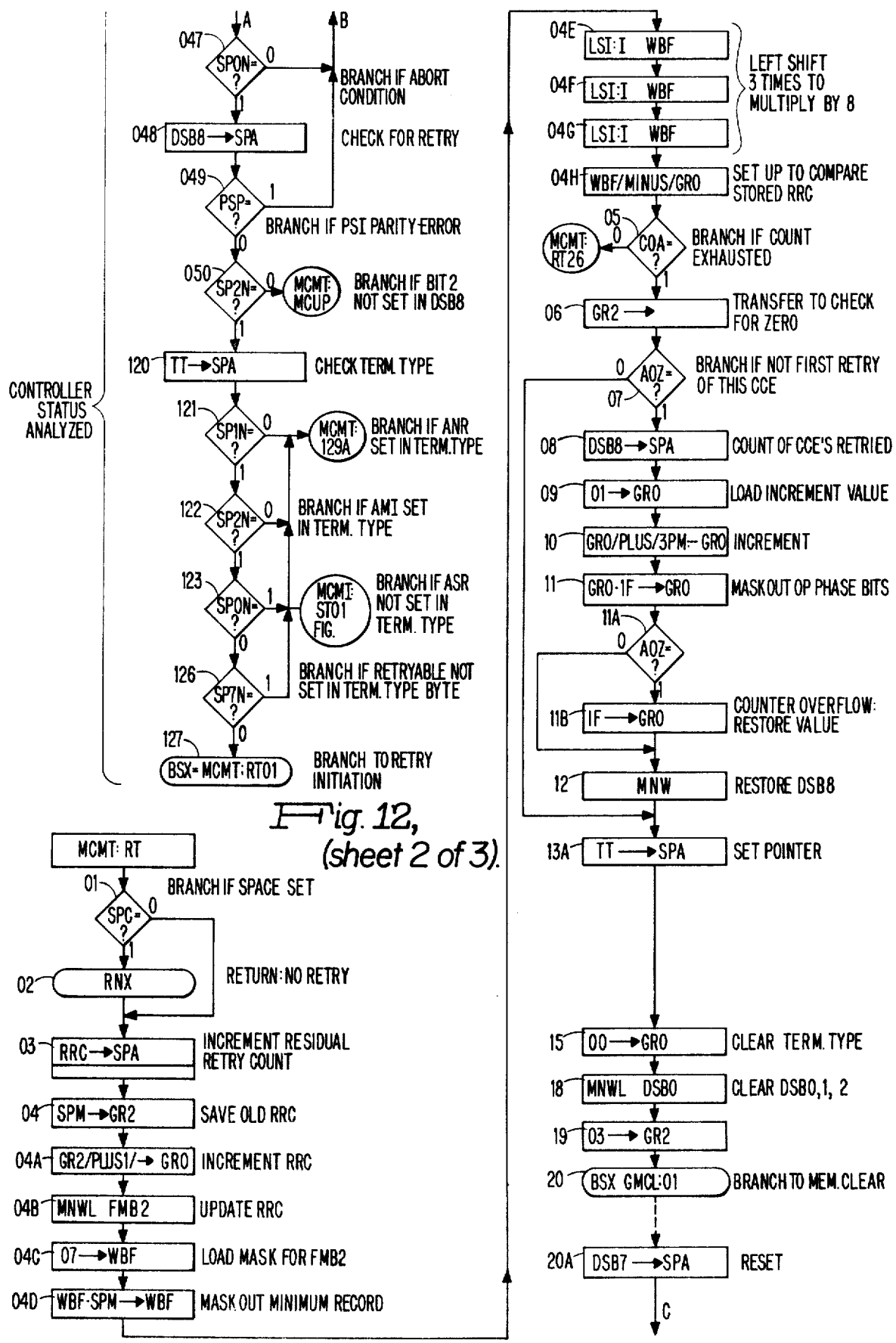
Fig. 12, (sheet 2 of 3).

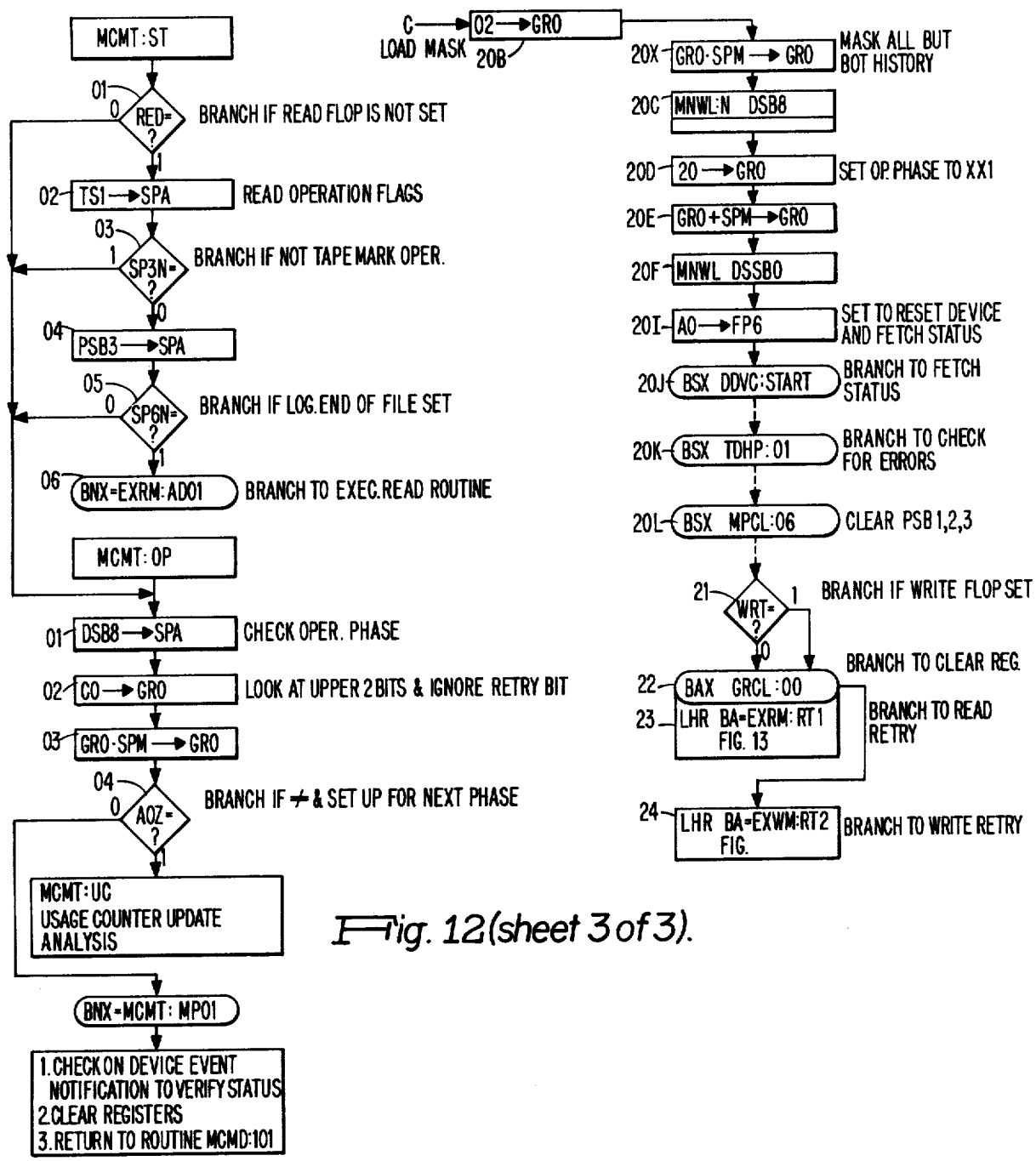
Fig. 12 (sheet 3 of 3).

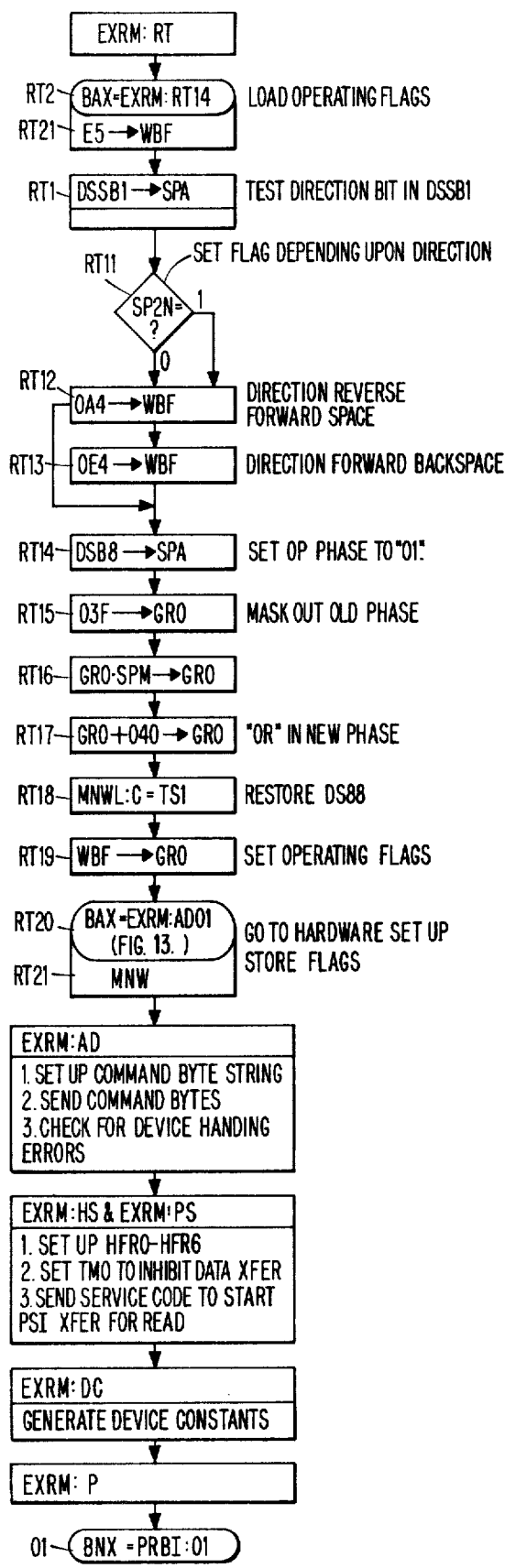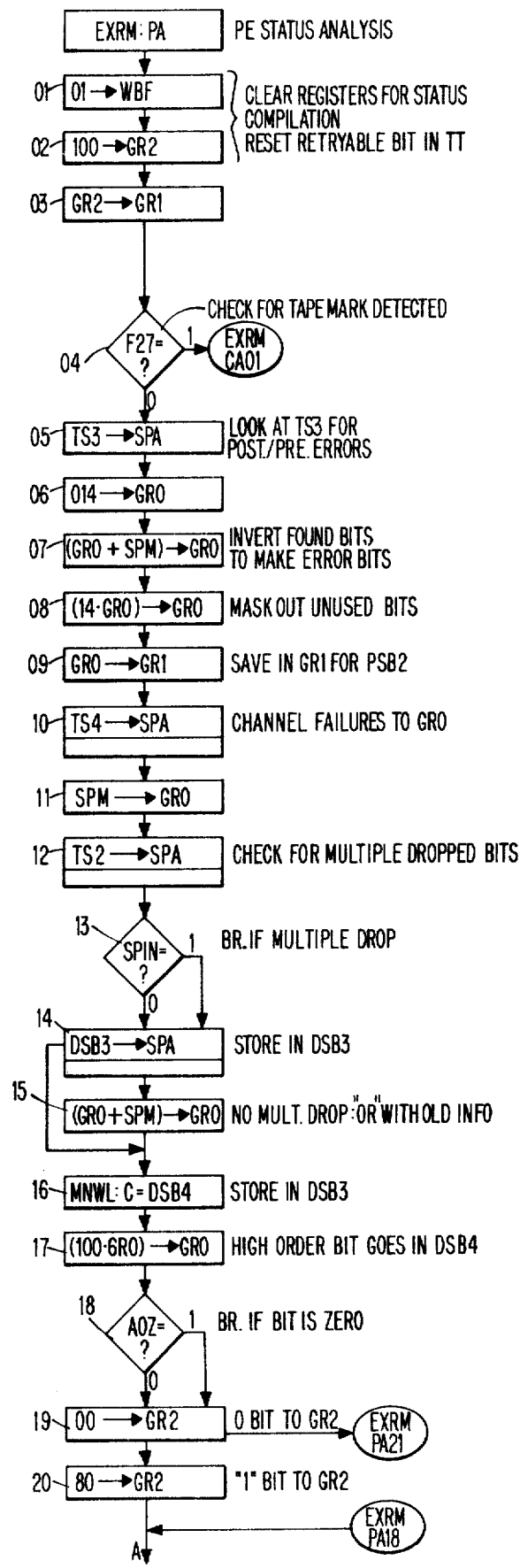
Fig. 13 (sheet 1 of 3).

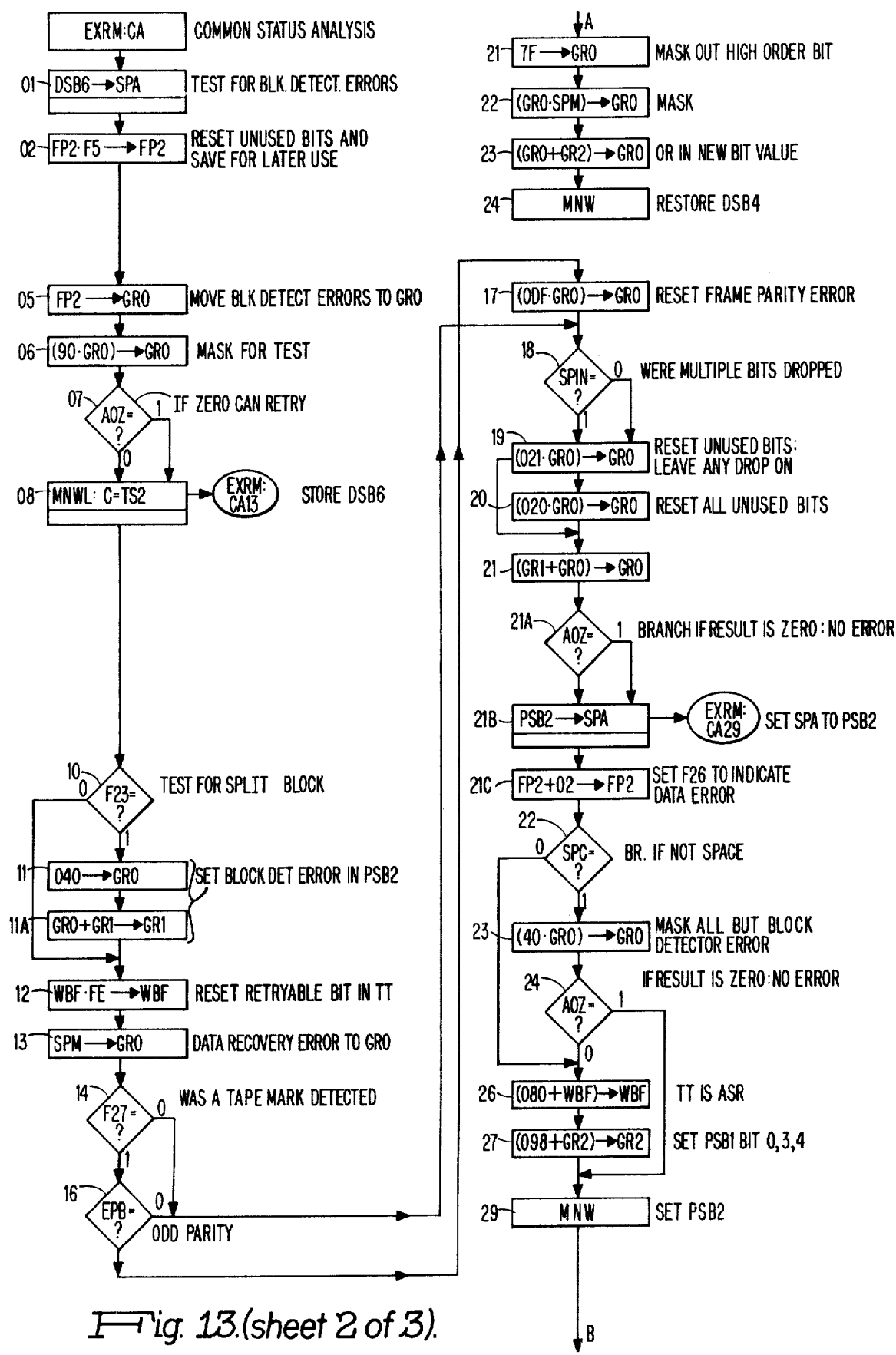
Fig. 13.(sheet 2 of 3).

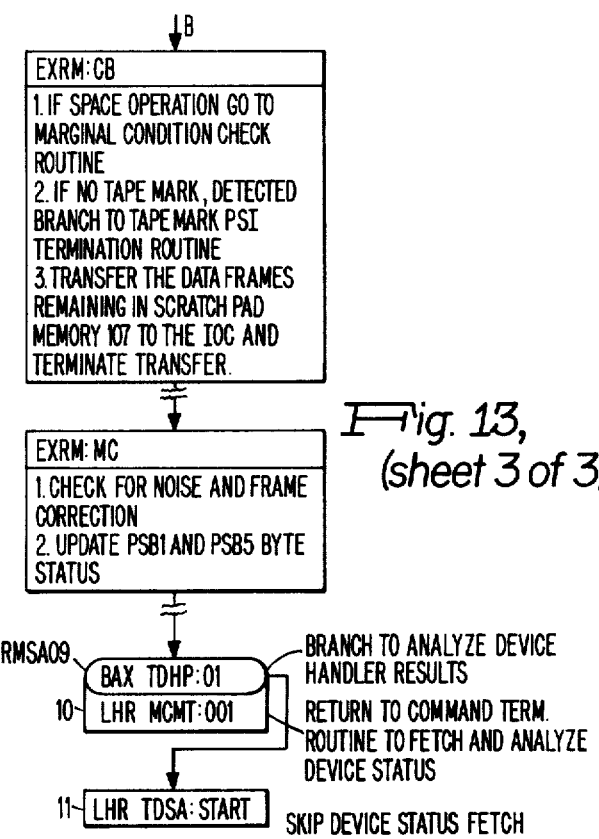
Fig. 13, (sheet 3 of 3).
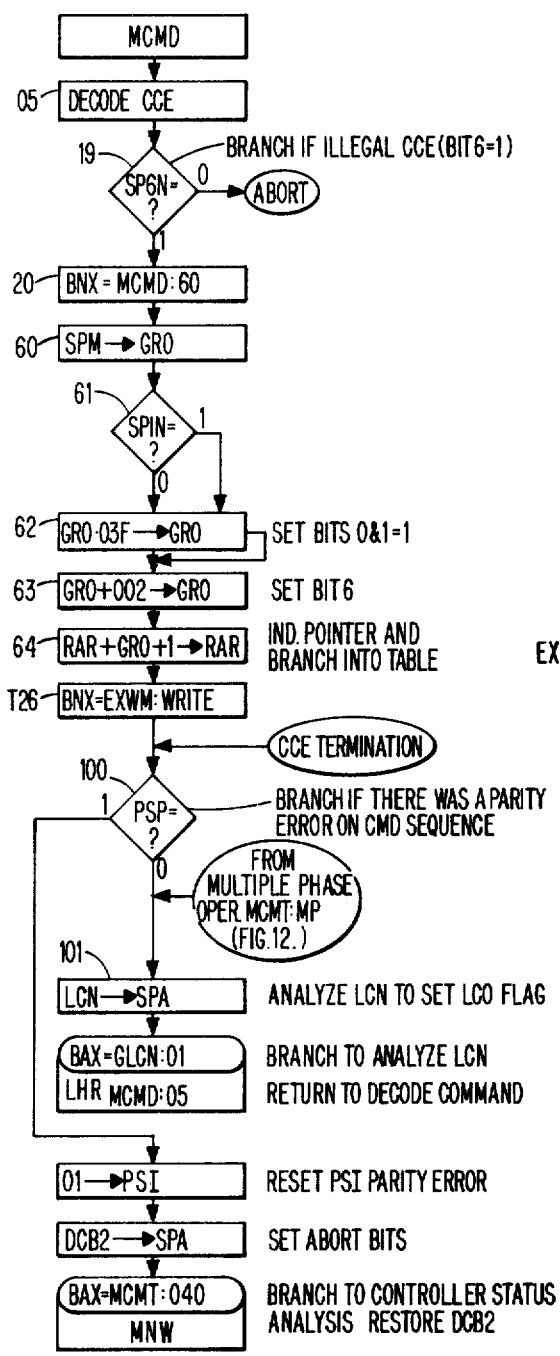
Fig. 14.

RETRY METHOD AND APPARATUS FOR USE IN A MAGNETIC RECORDING AND REPRODUCING SYSTEM

RELATED REFERENCES

1. U.S. Pat. No. 3,792,436 titled "Deskewing Buffer Arrangement Which Includes Means for Detecting and Correcting Channel Errors" invented by David D. DeVoy, George J. Barlow and John A. Klashka and assigned to the assignee named herein.

2. U.S. Pat. No. 3,803,552 titled "Error Detection and Correction Apparatus For Use In A Magnetic Tape System" invented by George J. Barlow and John A. Klashka and assigned to the assignee named herein.

3. U.S. Pat. No. 3,810,231 titled "Noise Record Processing For Phase Encoded Data" invented by David D. DeVoy, George J. Barlow and John A. Klashka and assigned to the assignee named herein.

4. U.S. Pat. application Ser. No. 466,438 titled "Improved Deadtracking System" invented by George J. Barlow and Donald R. Taylor and assigned to the assignee named herein, now issued U.S. Pat. No. 3,882,459.

BACKGROUND OF THE INVENTION

The present invention relates to an improved diagnostic method and apparatus and more particularly to a method and apparatus for initiating the retrying of commands executed by a peripheral controller of a data processing system without interrupting the operation of the central processing unit of a data processing system.

Prior Art

In general, peripheral controllers are provided to operate and control input/output devices of a data processing system. Normally, the peripheral controller is required to respond to commands received from a "channel" which controls the flow of information between the input/output devices and the main storage unit of the data processing system. In general, an input/output processing unit of the data processing system in response to an instruction in the main program of the data processing system is operative to fetch and execute an input/output operation via a "channel program" independently of the central processing unit. The channel program is normally made up of a number of channel command words or channel command entries related to one another which appear in a sequence specifying operations to be performed by a peripheral controller. A channel command entry or channel command word specifies the command to be executed by the controller, the storage area to or from which the data character is to be transferred and information indicating the number of data characters or bytes to be transferred.

Certain prior art systems retry channel commands upon the occurrence of a certain class of input/output errors without having to interrupt the program being executed by the central processing unit. However, in such systems, the decision of retrying a command is made by the channel or equivalent apparatus included in the system based upon status information received from the input/output device or peripheral controller under the control of the channel. Also, in such arrangements, the channel program selectively inhibits for allowing input/output devices or peripheral controllers to initiate retry of commands in accordance with the setting of a predetermined bit position within a channel command word.

The disadvantage of the above arrangements resides in the fact that command retry is controlled by the supervisory capability such as the operation system software or channel apparatus. Normally, such software or apparatus determines to retry commands based upon a limited amount of status information received from the device or the controller. In order to minimize the amount of information being transferred between the channel and the input/output device or controller, the indications of certain conditions occurring during the execution of a given command are normally synthesized. Therefore, in the case of such error conditions, retrying of the commands under those circumstances could result in aggravation of the error condition to the point where the original condition becomes almost undetectable. For example, where the input/output device of the controller is executing a write command in which a block of bytes are written on a magnetic tape medium under marginal conditions resulting in an error condition, retrying the command could result in mispositioning the read/write heads relative to the tape resulting in the destruction of a good block of data.

Accordingly, it is a primary object of the present invention to provide a technique which allows for retrying of channel commands without interrupting the operation of the data processing system.

It is a further object of the present invention to provide an improved peripheral control apparatus for peripheral devices to initiate selectively the re-execution of a channel command upon the occurrence of errors.

It is a still further object of the present invention to provide an improved peripheral controller which eliminates the need for requiring channel control apparatus to examine status information for determining whether or not command retry takes place.

SUMMARY OF THE INVENTION

Briefly, the above objects are accomplished in accordance with the present invention by including within a subsystem a peripheral controller operative to detect and store signals indicative of the characteristics of a block read or written during the controller's execution of read and write commands issued to the subsystem by a data processing system. The signal indications detected by the controller are grouped into at least first and second classes. The peripheral controller further includes means for initiating the retrying of the command when the errors detected are only within a predetermined one of the classes.

By having the peripheral controller store certain types of indications during the execution of the command, the controller can more accurately and reliably determine whether command retry should take place upon the occurrence of errors.

In the preferred embodiment of the present invention, a magnetic tape peripheral controller stores signals indicating the manner in which the command was performed by a magnetic tape device. The controller divides the operation performed in response to the command into a number of segments which are defined in terms of time intervals. The magnetic tape devices have separate read and write heads so that during a write operation, the information being written on the magnetic tape medium by the device is read back at a predetermined time interval following the writing of the frame and transferred to the data recovery unit of the controller during the performance of a read after write check operation. Thus, during the execution of a write command, the data recovery unit stores indications which the controller monitors to generate signals constituting a "profile" of the block of information which is being written. At the end of the write operation, the peripheral controller upon detection of an error condition is operative to examine the profile signals to determine the extent of damage of the block written. When there is minor damage to the block, signalled by the setting of the first group of profile indicators, the peripheral controller initiates command retry. By contrast, when the indicators signal that the amount of damage is major, the peripheral controller inhibits retry of the command notwithstanding the fact that the controller has an indication that command retry is allowable by the data processing system. Similarly, during a read command, the indications are stored which provide a profile of the block of information recovered from the magnetic medium. The indicators are used in the same manner by the peripheral controller to determine whether command retry takes place on the occurrence of an error condition.

The controller performs a retry of the command by having the magnetic tape device execute a backspace operation followed by another write operation with "extended gap" to ensure the writing takes place at a different position on tape or a space operation followed by another read operation. After the tape device has executed the space operation, the controller tests the profile signals stored during the space operation to determine whether the retry operation should continue, that is, whether the device should re-execute the command. Thus, the decision to continue retry is based upon the characteristics of the block read during the space operation. Only when the indicators signal that retry is to continue does the controller re-execute the command. In this way, the controller is able to establish more stringent conditions under which the space operation is to be terminated in contrast to space operations performed in response to commands normally issued to the controller by the data processing system.

By having the peripheral controller include apparatus for establishing retry, this allows all of the error detected information collected during the failing operation to be retained and used to establish whether retry should continue. This increases significantly the accuracy of the retry operation without increasing the complexity of the controller.

It should also be appreciated that in accordance with the preferred embodiment of the present invention "write retries" are given first priority because it has been found that the write error rate is higher than the read error rate even though the controller normally performs considerably more read operations than write operations. Furthermore, improving the write process will result in improving the read process during subsequent reading of the same blocks.

These and the other objects, advantages and features of the present invention will become readily apparent from the following description when considered in connection with the drawings.

BRIEF DESCRIPTION OF THE DRAWINGS

FIG. 5 illustrates the different routines used during the execution of a write command.

FIGS. 6a and 6b illustrate the sequence of routines used during the execution of a write command.

FIG. 7a illustrates the intervals established for monitoring block waveforms during the execution of write commands in accordance with the present invention.

FIG. 7b illustrates the intervals established for monitoring waveforms during the execution of a read or space operation in accordance with the present invention.

FIGS. 10a through 10g illustrate in greater detail the abnormal read after write monitoring routines of FIG. 5.

FIGS. 11a through 11e illustrate in greater detail the phase encoded routines of FIG. 11.

FIG. 12 illustrates in greater detail the retry routines of FIG. 4.

FIG. 13 illustrates in greater detail the main read routines of FIG. 4.

FIG. 14 illustrates a portion of the command decode routine of FIG. 4.

DESCRIPTION OF THE PREFERRED EMBODIMENT

Figure 1:
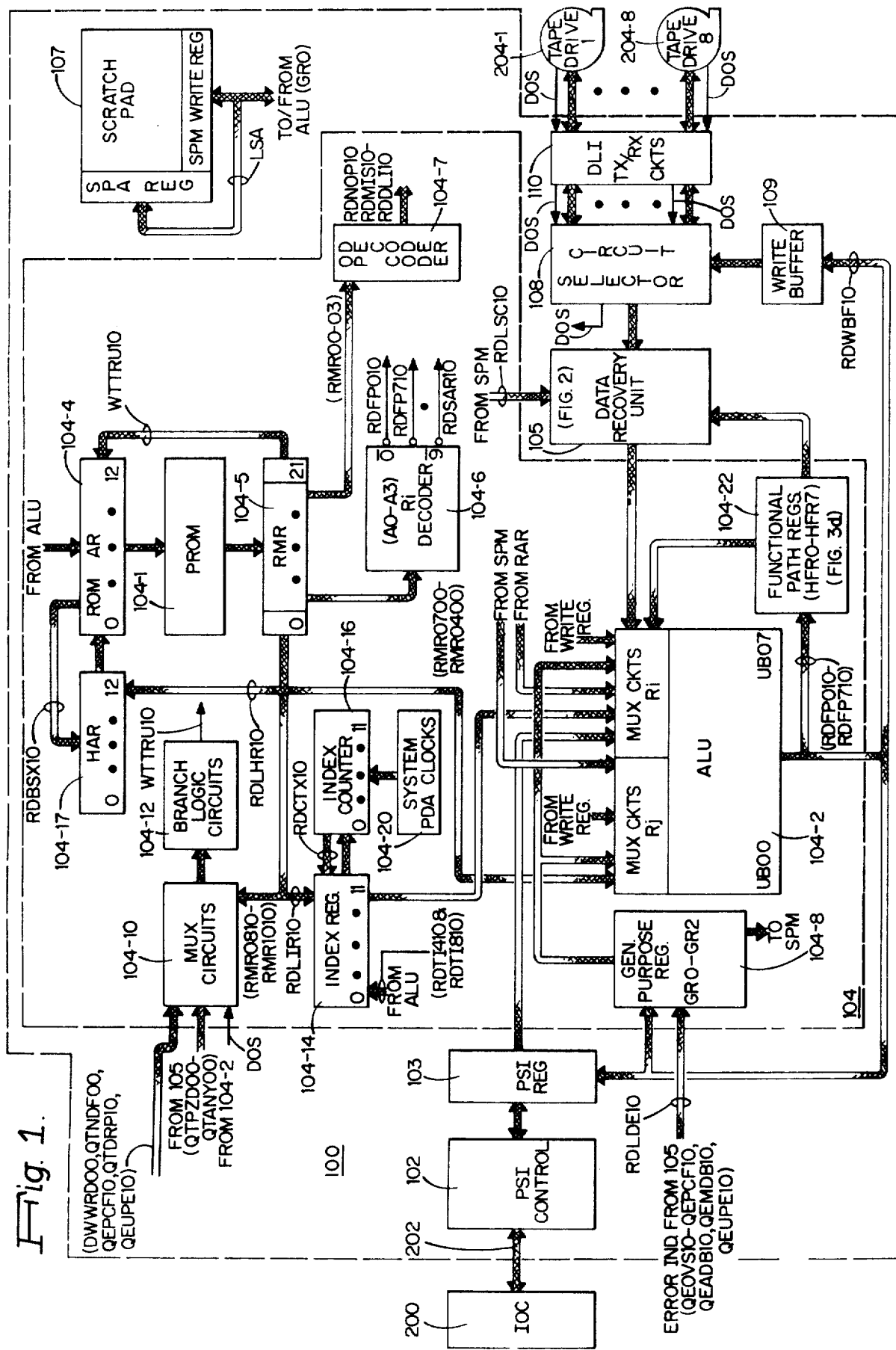
FIG. 1 shows in block form a system which utilizes the teachings of the present invention.

FIG. 1 shows a peripheral processor or peripheral controller 100 which couples to a central processing unit of a data processing system via an input/output processor (IOC) 200. The peripheral controller 100 in response to commands received from the IOC 200 processes data characters received from any one of a number of magnetic tape devices/drives 204-1 through 204-8 via a selector circuit 108. The information characters or frames read from a selected magnetic tape device are processed by a data recovery unit 105 as explained herein. Information to be written on the magnetic tape device is transferred via the ALU 104-2 to a write buffer 109 and thereafter applied to the selected drive via selector circuit 108.

Commands and data are transferred between the IOC 200 and the peripheral controller 100 via a peripheral subsystem interface (PSI) 202. Such transfers are made in response to control signals generated by circuits included within the IOC 200 and the PSI control 102. For the purpose of the present invention, the circuits can be considered conventional in design. For example, the circuits may take the form of the circuits described in a copending patent application titled "Microprogrammable Peripheral Processing System" invented by John A. Recks, et al. bearing Ser. No. 425,760, filed Dec. 18, 1973, now U.S. Pat. No. 3,909,799 and is assigned to the same assignee as named herein.

The PSI 202 includes an OPERATIONAL IN (OPI) line which is normally set to a binary ONE state whenever the peripheral controller is powered up and operational. The state of the OPI line signals the IOC 200 that the controller 100 is capable of accepting commands.

Similar to the PSI, commands and data are transferred between the tape devices and peripheral controller 100 via a device level interface (DLI). In addition to various control lines and data lines used in connection with transferring and receiving information, the DLI includes a delay operation start (DOS) line which is used by the device to signal that it is at operating speed. The tape devices can be considered conventional in design and include circuits to perform read and write operations. As part of a write operation, the device under proper conditions performs an extended gap operation automatically as part of a write operation by delaying the signal applied to the DOS line, when the last command was not a write command (e.g. space or backspace).

As seen from FIG. 1, the controller 100 includes a microprogram processing unit 104 which under the control of microinstructions stored in a programmable read only memory 104-1 performs the necessary operations for transferring information between a selected magnetic tape drive and the IOC 200. For example, in response to command code bytes received from the IOC 200, applied via the PSI control 102, PSI register 103 and an arithmetic and logic unit (ALU) 104-2, microinstructions are read out into a memory register 104-5 and decoded by decoder circuits 104-6 and 104-7. The decoder circuits cause a generation of various control signals which condition certain other portions of the controller 100 to perform operations necessary for executing the type of command specified.

Additionally, as seen from FIG. 1, signals from the memory register 104-5 are also applied to multiplexer circuits 104-10, conventional in design, which additionally receive control and status signals from other portions of the system such as the data recovery unit 105 and a device (e.g. DOS) for testing the results or the progress of the particular operation as explained herein. Actual testing is accomplished by the branch logic circuits 104-12 which for the purposes of the present invention can be considered conventional in design. Also, signals representative of addresses contained within various types of microinstructions are applied from register 104-5 to a register 104-14 and a counter 104-16. The register 104-14 is an index register which is loaded via register 104-5 in response to a subcommand signal RDLIR10 or via the ALU 104-2 in response to subcommand signal RDTI410. The register 104-14 couples to an index counter 104-16 and is used to provide the required timing strobe signals necessary for writing or reading information characters to and from the write buffer 109 and the data recovery unit 105 respectively as explained further herein. The index counter 104-16 is decremented in response to PDA clocking signals generated by multi frequency system clock circuits 104-20. For the purpose of the present invention, these circuits can be considered conventional in design.

The register 104-17 is used as a history address register which allows proper sequencing through microinstructions stored in memory 104-1. For example, the history register 104-17 is operative to store a return branch address from the memory local register 104-5 until such time that the address is to be transferred to the read only memory address register 104-4. This address when transferred causes the register 104-4 to condition the memory 104-1 to select again a previous location within the memory allowing the continuance of a particular operation as explained herein.

As seen from FIG. 1, the ALU 104-2 receives and delivers signals to the registers shown. The signals which are to be applied as operand inputs to the ALU 104-2 are selected via multiplexer circuits included therein. The ALU 104-2 and multiplexer circuits can be considered conventional in design and may for example take the form of circuits disclosed in a text titled "The Integrated Circuits Catalog for Design Engineers", published by Texas Instrument, Inc., dated 1972.

The ALU 104-2 is connected to provide output signals to a plurality of functional path registers 104-22 which are used for control purposes such as for providing control signals to the data recovery unit 105 and storing hardware error conditions as explained herein. Each bit in each of the individual registers is used to indicate or to initiate a specific event or operation. The contents of these registers are examined by the microprogram processing unit via branch circuits in order to ascertain the state of the controller during an operation as well as being used for internal timing and for enabling the execution of commands.

Additionally, the ALU 104-2 is also connected to transmit and receive signals to and from a plurality of general registers 104-8 (i.e. registers GR0 through GR2) which are used for storage of certain record processing information. More specifically, register GR0 is used to control the transfer of input and output data signals to and from a scratch pad memory 107. Hence, it serves as a memory local register for scratch pad memory 107. Register GR1 serves as an input buffer register for the scratch pad memory 107. Also, register GR2, similar to register GR0, provides temporary storage of information to be stored in the scratch pad memory 107.

The scratch pad memory 107 provides temporary storage for data, various control information and parameters required for executing read and write operations. As seen from FIG. 1 and mentioned above, both address and data are transmitted to and from the scratch pad memory 107 via the ALU 104-2 and general registers. The scratch pad memory 107 is of solid state construction and has 512 storage locations each containing 10 bit positions. The first 32 storage locations serve as a data buffer when the controller 100 is operating in a data mode (i.e. transferring or receiving data characters of a block). When in this mode, addressing of the scratch pad memory 107 takes place via a pair of address counters, write and read counters, not shown. The contents of the read address counter are used to read out information from the locations of the scratch pad memory while the contents of the write address counter are used to write information into the scratch pad memory. For the purposes of the present invention, the operation of these counters for addressing the scratch pad memory 107 can be considered conventional in design.

The remaining storage locations of the scratch pad memory 107 are used for storage of device constants, control parameters for control of the controller and associated tape drives. More specifically, storage locations 020-03F hexidecimal are reserved, storage locations OEO-1FF serve as a device control block and are used to store control parameters in the form of device control block bytes including a retry count received from the data processing system, storage locations 080-OAF store as a program block, storage locations OBO-OCF serve as register storage including temporary storage locations TS1, TS2, TS3 etc., and storage locations 06B-07F are used to store device constants (e.g. device 25 foot timer).

Additionally, the scratch pad memory can be addressed by a scratch pad address register which receives information from the ALU 104-2 and the register is used when either control constants and parameters are to be sent to portions of the controller 100 or used for updating certain status information previously stored in scratch pad memory 107.

Figure 2:
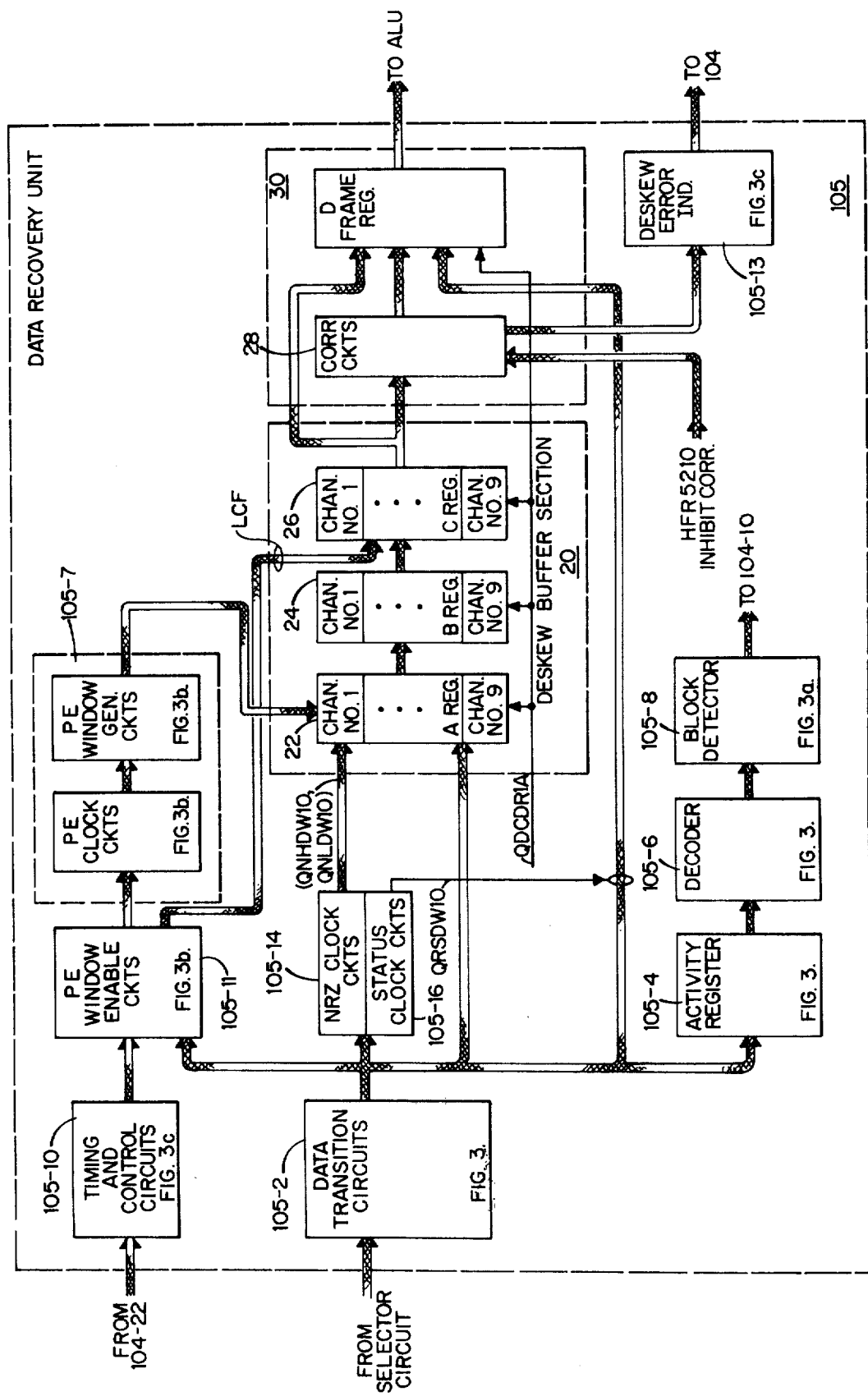
FIG. 2 shows in block form the data recovery unit of FIG. 1.

Data Recovery Unit 105 — FIG. 2

Referring to FIG. 2, it is seen that the data recovery unit 105 includes a deskew buffer section 20 including series coupled registers 22, 24, and 26. These registers are operative to deskew different types of encoded signals (e.g. phase encoded and non return to zero (NRZ) signals) representative of binary ONE and binary ZERO information into data characters assembled in register 26. The characters are then transferred to register 30 and the ALU 104-2 of FIG. 1. Each of the channel sections of each of the registers of the section 20 includes a pair of synchronous or clocked flip-flops which derive their timing from the system PDA clock circuits 104-20.

When processing phase encoded signals, certain ones of the flip-flops included within registers 22, 24 and 26 receive clocking signals from individual pseudo clock and logic circuits of block 105-8. The clocking signals define intervals or "windows" during which the transitions representative of binary ONE and binary ZERO phase encoded information are to be sampled. The circuits for both the pseudo clock and window generation circuits are shown in greater detail in FIG. 3b and will be described in connection with that Figure.

It will be noted from FIG. 2 that all data transitions are applied through the transition detector circuits 105-2. Accordingly, these circuits detect the edges of data signals resulting from the recovery of non-return to zero (NRZ) recorded data. The data signal applied to the inputs of the transition circuits are asynchronous, that is, they are not synchronized to the controller timing. The synchronous flip-flops of the transition circuits 105-2 provide synchronous output signals to various portions of the controller and all other portions of the data recovery unit. As mentioned previously, the output signals from the circuits 105-2 feed the phase encoded window enable circuits which are operative to condition or enable the phase encoded clock circuits of block 105-4.

The transition circuits 105-2 also generate signals which are applied to the NRZ clock circuits and status clock circuits 105-14 and 105-16 respectively. By utilizing the edge of the pulses, the NRZ clock circuits establish timing signals or windows for detecting the low and high data signals. The NRZ clock circuits essentially include gating circuits conditioned by a mode control signal which is "ANDED" with the logical OR of the data transition detector output signals so as to have the leading edge of the earliest data transition signal produce a signal defining a window during which all of the nine channel output signals are sampled. For the purpose of the present invention, these circuits can be considered conventional in design.

Similarly, the status clock circuits develop window signals for transferring signals stored in the hardware status registers included within the tape devices. Normally, the transfer of these signals occurs a byte at a time and since there are no redundant groups of signals present (i.e. no low or high groups of signals characteristic of NRZ encoded data), the signals are directly loaded into the D register 30 since they do not have to be deskewed.

It will be noted from FIG. 2 that both the NRZ encoded data signals as well as the phase encoded data signals pass through the deskew buffer section. The arrangement facilitates implementation for both modes of operation since both normally require a certain amount of checking and correction based upon parity bit information included within each of the assembled bytes or characters. It will also be seen from the Figure that correction circuits included within a block 28 are selectively enabled in response to various mode signals. For example, during a read after write operation, a signal HFR5210 is used to inhibit the operation of the correction circuits so that checking is performed upon uncorrected information bytes. Of course, the correction circuits are normally enabled during read operations when it is desirable to correct as much of the bytes as possible. This correction is done during the transfer of the information through the buffer section 20 just prior to loading of the assembled byte into the D register 30. As explained herein, the types of errors detected include single drop bit errors, uncorrectable parity errors, multiple drop bit errors, and overskew errors.

It will be noted from FIG. 2 that there is a plurality of registers which connect in parallel to the buffer section. These registers include a data recovery register 105-4 which is operative to store indications of the data transitions as they occur and apply them to the input of a decoder 105-6 which is operative to reduce the indications to a predetermined number of output signals, indications of which are stored within a block detector register 105-8. The output signals of the register 105-2 are applied to the processing unit 104 which is operative to detect the state of the signals as required. As explained in greater detail herein with reference to FIG. 3a, the block detector register 105-8 includes an any detector indicator circuit, a phase encoding zone detector indicator circuit, a phase encoding tape mark detector indicator circuit, a phase encoding identification burst detector indicator circuit, and phase encoding block detector indicator circuit. Each of these indicator circuits is testable during the execution of predetermined loops of microinstructions by the controller as explained herein.

Figure 3:
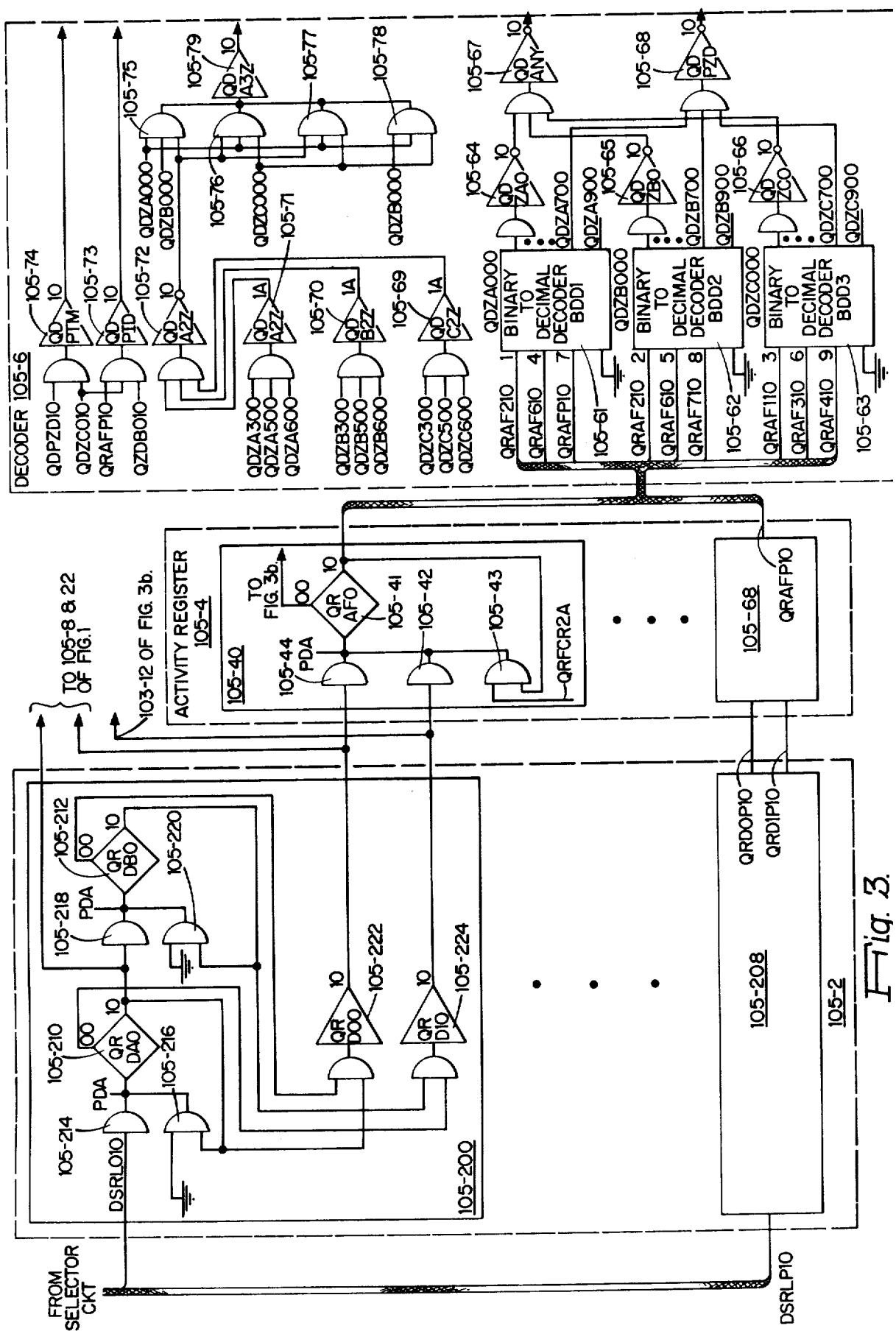
FIG. 3 shows in greater detail the transition circuits, the activity register and the decoder circuits of FIG. 2.
Figure 3A:
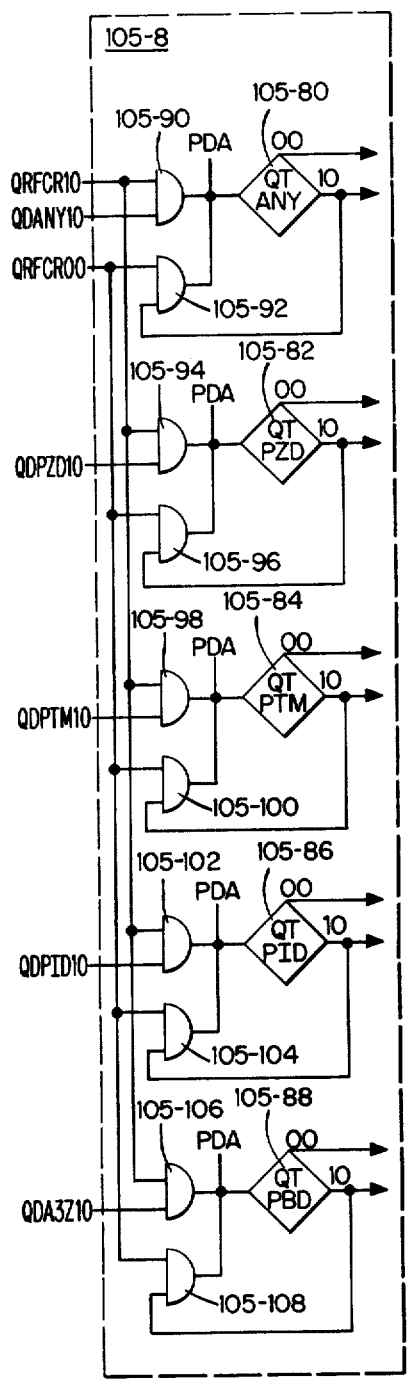
FIG. 3a shows in greater detail the block detector circuits of FIG. 2.

Activity Register and Detector Circuits - FIGS. 3 and 3a

The various portions of the above mentioned registers and circuits are shown in greater detail in FIGS. 3 and 3a. Referring to FIG. 3, it is seen that each channel includes a single activity flip-flop which is set in response to binary ONE and binary ZERO data pulses. Each of the flip-flops 105-40 through 105-48 includes a pair of input gates (e.g. 105-44 and 105-42) which are connected to receive binary ZERO and binary ONE data pulses respectively from the transition detector circuits 105-2. A hold AND gate (e.g. gate 105-43) of each activity flip-flop is held on during the processing of each data record by signal QRFCR2A. The outputs of the activity flip-flops 105-40 through 105-48 are selectively combined in decoder 105-6. The decoder 105-6 includes a plurality of binary to decimal decoder circuits 105-61 through 105-63 which receive input signals from selected ones of the activity register flip-flops.

When one of the input signals to any one of the decoder circuits 105-61 through 105-63 is forced to a binary ONE, that decoder circuit forces a corresponding one of the output signals QDZA000, QDZB000 or QDZC000 to a binary ONE. That is, signals QDZA000 through ZDZC000 are binary ZEROS only when all of the three input signals to the corresponding one of the decoders are zeros. Each of these signals is inverted by a corresponding one of the AND gate and inverter circuits 105-64, 105-65 and 105-66 as shown. The output signals from these circuits are in turn applied to a further AND gate and inverter circuit 105-67. Thus, when any one of the signals QDZA000 through QDZC000 is forced to a binary ONE indicating that one of the input signals to one of the decoder circuits is a binary ONE, this causes AND gate and inverter circuits 105-67 to be forced to a binary ONE. This in turn causes the any detector flip-flop 105-80 to be switched to the binary ONE state via an AND gate 105-90. When the flip-flop switches signal QTANY10 to a binary ONE, it signals that at least a minimum of one channel has received a transition and this normally signals the start of a record in the case of NRZI recorded information.

When all three input signals to any one of the decoder circuits 105-61 through 105-63 are binary ONES, that decoder circuit forces a corresponding one of the output signals QDZA700, QDZB700 or QDZC700 to a binary ZERO. This in turn causes an AND gate inverter circuit 105-68 to be forced to a binary ONE. This causes the phase encoding zone detector flip-flip 105-82 of FIG. 3a to be switched to a binary ONE state via an AND gate 105-94. When this flip-flop switches signal QTPZD10 to a binary ONE, it signals that a minimum of three channels in one of the three groups of three non adjacent channels have received signals and that this may be the start of an actual record.

As explained herein, when the microprogrammed processing unit 104 detects that a predetermined number of successive frames has been detected, measured by sampling the state of signal QTPZD10, it switches one of the flip-flops of a specified functional path register (i.e. register HFR5) to a binary ONE indicating the start of an actual record. For additional information regarding the selection of criteria for determining when an actual record has been sensed, reference may be made to the related references and in particular, U.S. Pat. No. 3,810,231 titled "Noise Record Processing for Phase Encoded Data" which issued May 7, 1974.

When a minimum of three channels has received the signals as indicated by signal QDPZD10 being in a binary ONE state and signal QDZC010 being in a binary ONE state signaling that all of the input signals applied to decoder circuit 105-6 are binary ZEROS (i.e. channels 3, 6, and 9 are ZEROS), and AND gate and amplifier circuit 105-74 is operative to switch signal QDPTM10 to a binary ONE. This signals the detection of a tape mark binary coded frame which in turn causes the phase encoding tape mark detector flip-flop 105-84 of FIG. 3a to be switched to a binary ONE state via an AND gate 105-98.

It will also be seen that signal QDZC010 is applied as one input signal to an AND gate and amplifier circuit 105-73. The signals QRAPF10 and QDZB010 together with signal QDZC010 cause the AND amplifier circuit 105-73 to switch signal QDPID10 to a binary ONE when a special identification code termed a phase encoding identification burst is being received. These signals are identified as having all zeros in all channels except the parity channel (i.e. when signal QRAFP10 is a binary ONE). The PE identification burst signal QDPID10 causes the phase encodng I.D. burst detector flip-flop 105-86 of FIG. 3a to be switched to a binary ONE via an AND gate 105-102.

A plurality of AND gate and amplifier circuits 105-69 through 105-71 are operative to switch corresponding ones of their output signals QDA2Z1A through QDC2Z1A respectively when any two channels are receiving signals defined by the decoder circuit generated signals. The output signals from each of these AND gates are in turn applied to AND gate and inverter circuit 105-72 which in turn applies an output signal to a group of AND gates 105-75 through 105-78 which also receive predetermined ones of the output signals from the decoder circuits. The AND gates 105-75 through 105-78 are operative to cause an amplifier circuit 105-79 to force signal QDA3Z10 to a binary ONE when there is at least a binary ONE in each grouping or zone of channels. Signal QDA3Z10 in turn switches block detector flip-flop 105-88 of FIG. 3a to a binary ONE state via an AND gate 105-106. The signal QTPBD10 when a binary ONE indicates that any three channels are "active" (i.e. receiving transition signals).

Figure 3E:
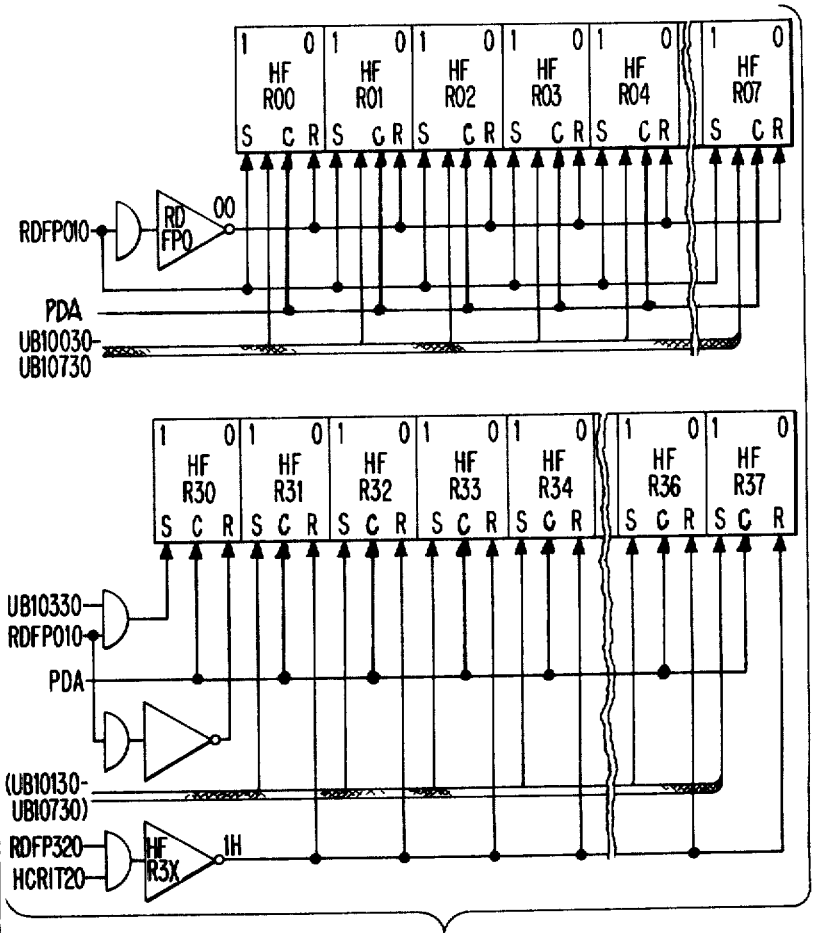
FIGS. 3d and 3e show in greater detail the functional path registers of FIG. 1.
Figure 3B:
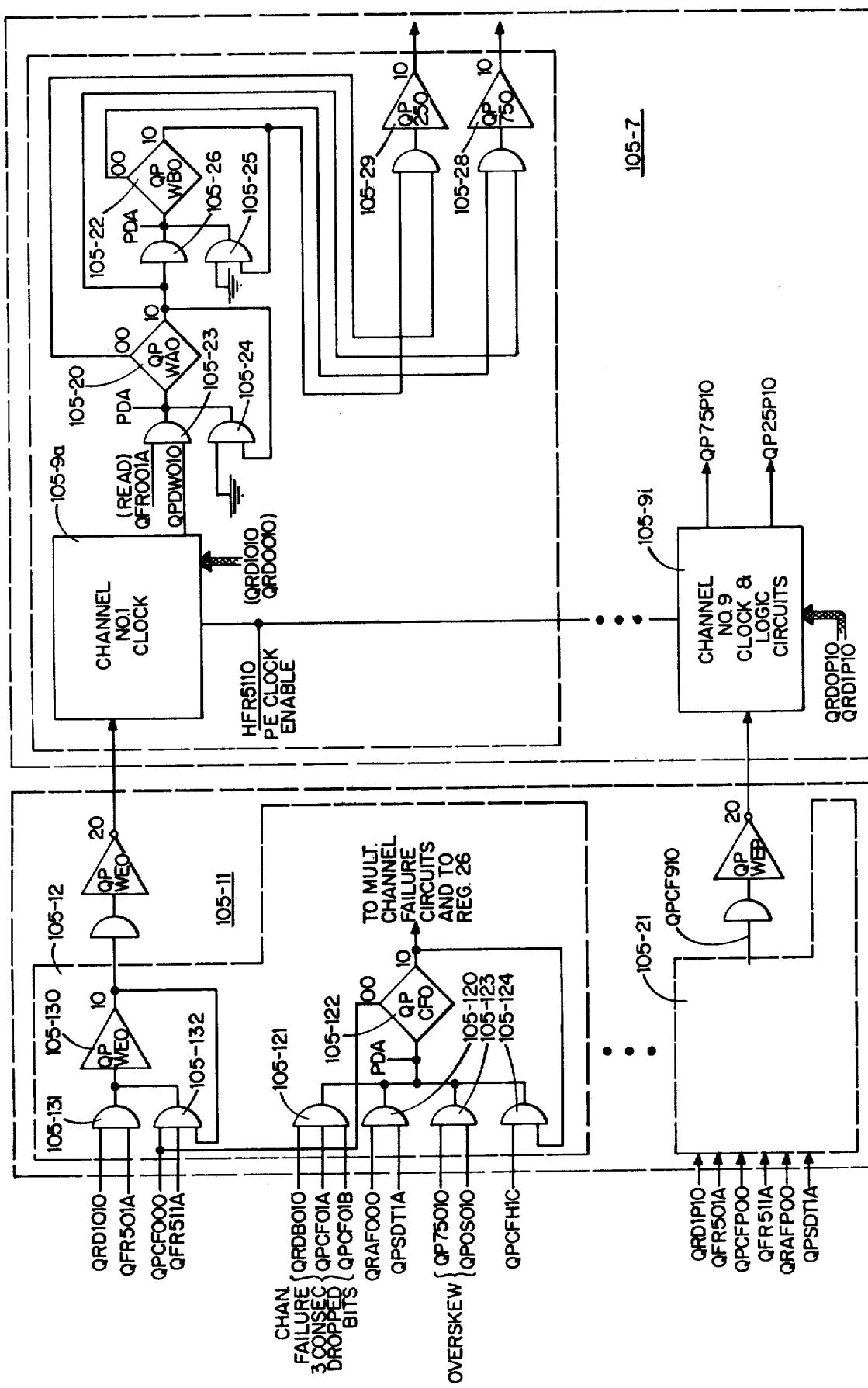
FIG. 3b shows in greater detail the pseudo clock circuits and channel failure circuits of FIG. 2.

Referring to FIG. 3b, it is seen that the pseudo clocks and circuits 105-8 include a pseudo clock circuit for each channel which can for the purpose of the present invention be considered conventional in design. For example, the clock circuit may include a voltage controlled oscillator circuit whose frequency is adjusted in accordance with the input data rate. Each pseudo clock circuit includes circuits which define a "window pulse interval signal" (e.g. signal QPDW010) which in turn is used to drive a pair of series connected flip-flops 105-20 and 105-22 set and reset by AND gates 105-23 through 105-26 arranged as shown. A pair of AND gates and amplifier circuits 105-29 and 105-28 convert the window pulse signals into a set of pulses which define the 25% point and 75% point of a bit cell interval. Specifically, signal QP25010 and QP25P10 respectively define the 25% points for the channels 1 and 9 buffer circuits. Similarly, signals QP75010 and QP75P10 respectively define the 75% points for channels 1 and 9 buffer circuits.

Each of the clock circuits is enabled by a corresponding one of the circuits 105-12 through 105-21. The enabling and channel failure circuits of each channel include a channel failure flip-flop (e.g. flip-flop 105-120) with associated AND gates coupled for receiving signals representative of channel failure conditions, indications of which are applied to AND gates 105-121 through 105-124. More particularly, the AND gate 105-121 is enabled when error detection circuits, not shown, included in a channel detect that a predetermined number (i.e. 3) of bits have been "dropped" by the channel. These circuits force a signal QRDB010 to a binary ONE each time the channel storage circuits fail to store a bit during a bit interval. A pair of signals QPCF01A and QPCF01B are forced to binary ONES to signal when the channel has dropped 3 consecutive bits. The AND gate 105-122 is enabled by signals QRAF000 and QPSDT1A being forced to ONES signaling the channel is inactive. The AND gate 105-123 is enabled by signals QP75010 and QPOS010 being forced to ONES signaling an overskew condition in the channel (e.g. signals arriving too early as compared to the other channels). Each of the gates when enabled switch the channel failure flip-flop to a binary ONE. For further information regarding the error detection circuits, reference may be made to the list of related references.

The binary ONE output of the channel failure flip-flop is applied to the corresponding pair of flip-flops which comprise register 26 of FIG. 2. Additionally, the signal is forwarded to multiple channel failure circuits included in a block 32 shown in greater detail in FIG. 3c. These circuits decode the number of channel failures and signal the detection of multiple failures to determine the extent of correction which can be made to characters or frames assembled in register 26. The binary ZERO output signal of the channel failure flip-flop is applied as a hold input to an enabling amplifier circuit 105-130 which includes a pair of AND gates 105-131 and 105-132 arranged as shown. The enabling circuit of each channel (e.g. 105-130) forces its output to a binary ONE state in response to a pulse from one of the transition detector circuits (e.g. signal QRD1010) when the peripheral processor 100 forces a signal QFR501A to a binary ONE. When this occurs, the enabling circuit causes a further inverter circuit (e.g. inverter circuit 105-140) to switch its output to a binary ZERO which in turn allows the clock circuits to generate "window timing signals" (e.g. signal QPDW010). Of course when the enabling circuits are inhibited from forcing the corresponding inverter output signals to binary ZEROS, the channel clocking circuits are inhibited from generating the window signals. It is only in response to these window signals that the 25% and 75% set of pulse signals are generated thereby allowing the channel to transfer data signals through the pairs of flip-flops comprising the deskew buffer section 20. For further information regarding the details of the buffer section 20, register and correction circuits 30 and error detection circuits 32, reference may be made to the previously cited references and in particular U.S. Pat. No. 3,792,436.

Continuing on with the description of the data recovery unit 105, it is seen from FIG. 3 that the data transition detector circuits 105-2 for each channel comprise a plurality of flip-flops (e.g. flip-flops 105-210 and 105-212) connected in series which are set and reset via pairs of AND gates (e.g. AND gates 105-214 through 105-220). The first flip-flop of each pair of flip-flops is set in response to change in state of signals representative of binary ONE and binary ZERO phase encoded information received from a selected tape device via selector circuit 108. The output signals from these pair of flip-flops are combined in a pair of AND gates which convert the input signal levels to pulses corresponding to a binary ONE and binary ZERO phase encoded data pulses. These gates correspond to AND gate and amplifier circuits 105-222 and 105-224. The output pulse signals are applied to the register 22 of FIG. 2, the pseudo clock circuits 105-8 and appropriate flip-flops which comprise the activity register 105-4.

Figure 3C:
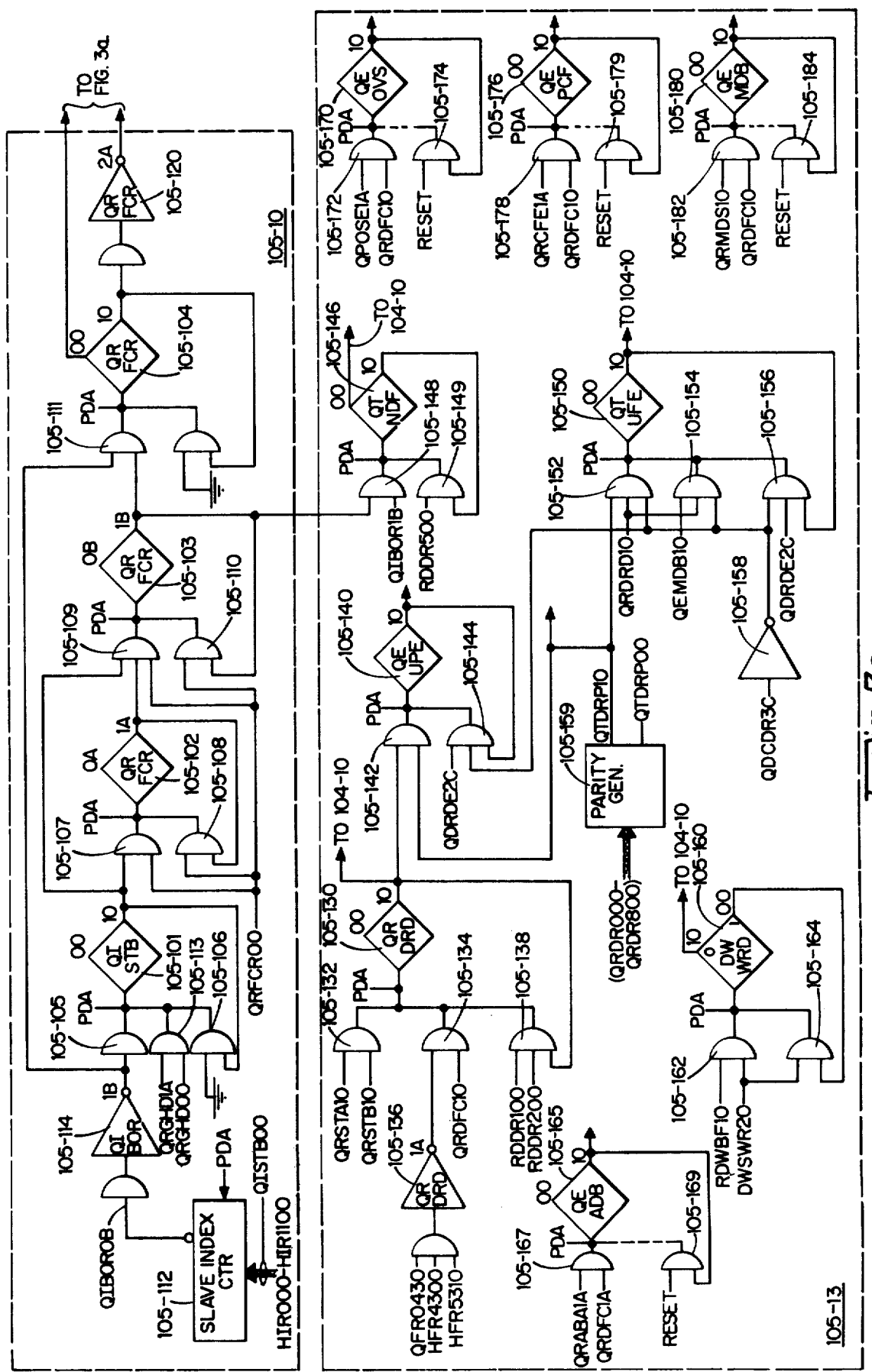
FIG. 3c shows in greater detail the timing and control circuits of FIG. 2.

Timing and Control Circuits - FIG. 3c

In the present peripheral processor 100, the timing and control circuits of FIG. 105-10 of FIG. 3c provide timing signals used in measuring certain time intervals for processing record frames of information. Referring to FIG. 3c, it is seen that these circuits include a pair of series connected clocked flip-flops 105-101 through 105-104 which include a plurality of gates 105-105 through 105-112 arranged as shown. The flip-flops 105-101 through 105-104, operate as a shift counter generating pulses at designated time intervals in response to signals from a slave index counter 105-112 included in the recovery unit 105 which establishes the time duration for the intervals. Specifically, the first flip-flop 105-101 operates as a 0.5 frame timer which is set via a signal QIBOROB applied via a gate and inverter circuit 105-114 each time the index counter 105-112 decrements to zero and after each frame interval as explained herein. The flip-flop 105-104 serves as a 1.5 frame timer and is operative to generate one PDA with pulses at 1.5 frame time intervals. The time intervals are established by presetting the slave index counter 105-112 with a count obtained from index register 104-14 in response to signal QISTB00 each time the counter 105-112 decrements to zero. Additionally, during the processing of NRZ signals, an AND gate 105-113 in response to a pair of signals QRGHD1A and QRGHD00 from the block 105-14 of FIG. 2 also presets the slave index counter 105-112 after each frame interval. That is, upon the positive going edge of each NRZI high data pulse, the signals QRGHD1A and QRGHD00 derived from the transition detector circuits of FIG. 3a switches flip-flop 105-101 to a binary ONE which in turn presets the slave counter 105-112 to the count stored in index register 104-14.

Initially, the processing unit 104 loads index register 104-14 with a count via the ALU 104-2. The count loaded into the register 104-14 has a value 2 less than one half the frame time divided by the PDA clock rate. The value of two allows proper operation of the counter overflow logic circuits (i.e. requires 2 PDA clock pulses).

Various ones of these signals as for example, signals QRFCR10 and QRFCR00 are applied various portions of the system including the flip-flops of block register 105-8 of FIG. 3a. This means that these various flip-flops are set and reset at 1.5 frame intervals.

FIG. 3c further includes a plurality of control test and error indicator circuits 105-130 through 105-184 arranged as shown. The flip-flop 105-130 when set to a binary ONE via gates 105-132 through 105-136 indicates that the D output register 30 contains an assembled character or frame. The flip-flop 105-140 when set to a binary ONE via signal QRDRD10 and parity error signal QTDRP10 indicates that the register 30 contains a character with a parity error (i.e. correction was inhibited or the error had not been corrected by the correction circuits 28). The flip-flop 105-146 when set to a binary ONE via AND gate 105-148 indicates the occurrence of a dropped frame for NRZI recorded information.

Similar to flip-flop 105-130, the flip-flop 105-160 when set to a binary ONE via AND gate 105-162 indicates when the write buffer 109 is storing a character or frame. The signal DWWRD10 when a binary ONE indicates that the buffer 109 has been loaded with a character. The flip-flop 105-150 when set to a binary ONE via gates 105-152 through 105-154 indicates that the D register 30 stores a character with an uncorrectable frame error. This results from the fact that the character has a parity error or contains more than one dropped bit. The multiple dropped bit condition is indicated when flip-flop 105-180 is switched to a binary ONE via AND gate 105-182. The parity generator-check circuit 105-159 generates a parity error signal for the character contained in the D register 30. Other error conditions corresponding to any dropped bit condition, an overskew condition and a channel failure are indicated by the binary ONE states of flip-flops 105-165, 105-170 and 105-176 respectively. These flip-flops are switched to binary ONES, for example, when signals from the circuits of block 105-11 are binary ONES (e.g. QRDB010, QPOS010 and QPCF010).

Figure 3D:
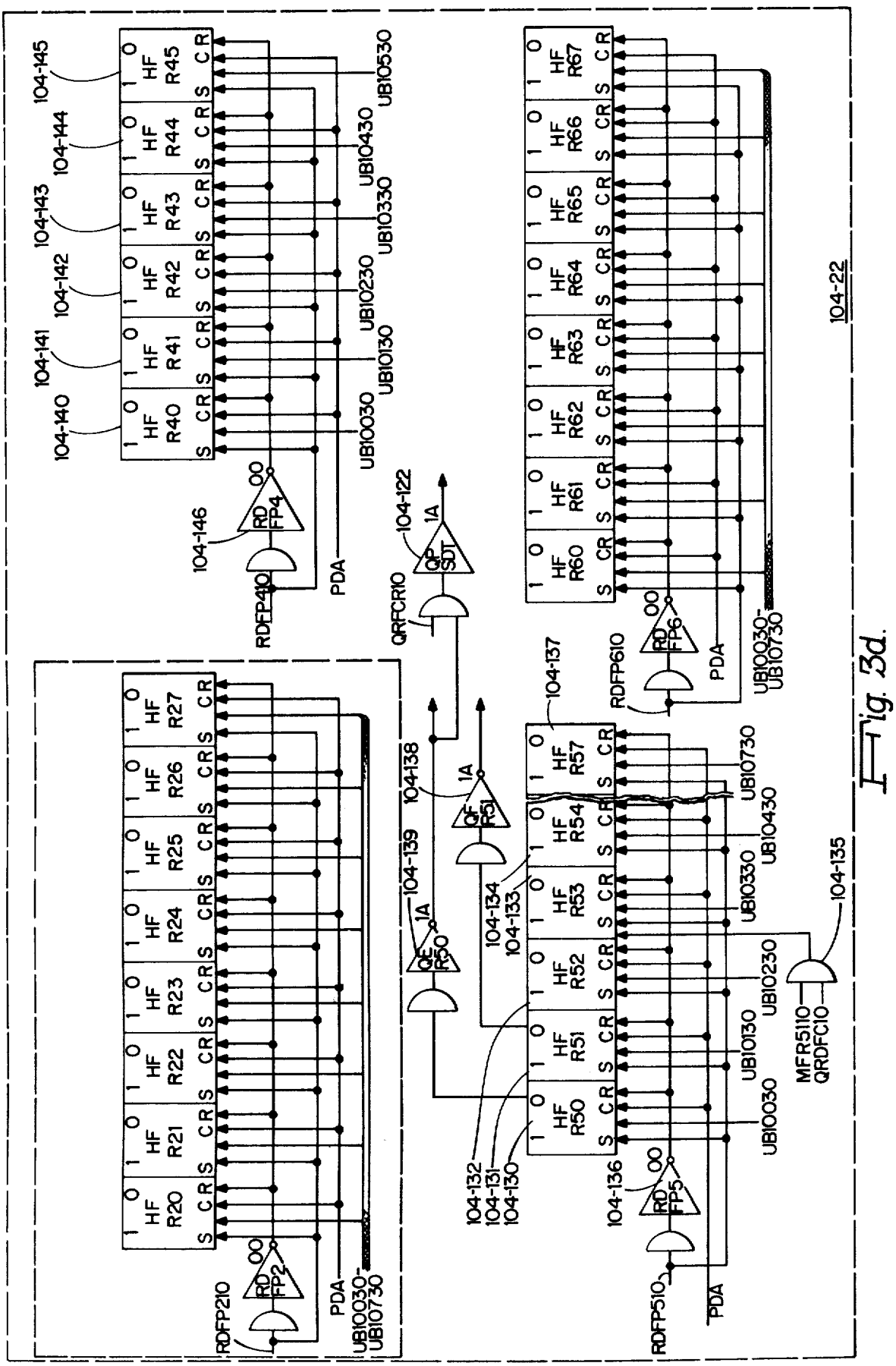

Functional Path Registers - FIGS. 3d and 3e

FIGS. 3d and 3e shown in greater detail certain ones of the functional path registers included within block 104-22. Referring to these figures, it is seen that each register includes 8 flip-flops which are set to binary ONES in response to signals UB10030 through UB10530 via the ALU 104-2. For example, register HFR4 is forced to the state defined by signals UB10030 through UB10530 in response to a control signal RDFP410 generated by decoder circuit 104-6. As discussed herein, flip-flops HRF40 through HFR45 contains status information relative to the operation of a one second timer, one frame timer, status, and NRZI mode of operation, a communication tag and beginning of tape condition respectively.

Similarly, functional path register HFR5 which includes flip-flops 104-131 through 104-135 and circuits 104-122, 104-136 through 140-138 is loaded with signals from the ALU 104-2 in response to a control signal RDFP510 generated by decoder circuit 104-6. As explained herein, the processing unit 104 switches flip-flip 104-131 to a binary ONE for enabling the PE clock circuits when it detects that five consecutive frames of a block have been processed signaling the presence of an actual data block. The processing unit 104 switches flip-flop 104-130 to a binary ONE indicating PE preamble mode operation when it detects that approximately 20 additional frames for characters have been processed. At this time, the clock circuits of the data recovery unit 104 which should be properly synchronized with the incoming channel signals are enabled for processing as explained herein. The flip-flop 104-132 is switched to a binary ONE by the processing unit 104 to inhibit correction of "bad frames" by correction circuits 28 of FIG. 2. When an all ONES frame is detected, an AND gate 104-135 switches flip-flop 104-133 to a binary ONE indicating PE data mode of operation. The flip-flop 104-137 is used only for test operations not relevant to the present invention. In these instances, the processing unit 104 accomplishes the switching of the functional path register flip-flops by executing microinstructions which cause constants to be delivered to the registers HFR4 and HFR5 via the ALU 104-2.

As seen from FIGS. 3d and 3e, the binary ZERO output signals from flip-flops 140-130 and 140-131 are inverted by gate and inverter circuits 104-137 and 104-138 respectively. Also, the inverted signal QE50-11A is applied to an AND gate and amplifier circuit 104-122 along with timing signals QRFCR10 for generating a set dead track signal QPSDT1A which is applied to the channel failure circuits of FIG. 3b.

The flip-flops of registers HFR2 and HFR6 store status information for testing the results of various operations as explained herein.

The flip-flops of register HFR0 and HFR3 store control information and status information during the execution of a command. For example, flip-flops HFR00 through HFR02 and HFR04 store status information relative to a read operation, reverse operation, write operation and write pulse enable operation respectively. Flip-flops HFR30, HFR33 and HFR34 store status information relative to 7 channel operation, a space operation, detection of a tape mark and actuation of a 2 millisecond timer respectively. These registers are set in a fashion similar to that described in connection with the other registers.

Monitoring Intervals - FIG. 7a

Before referring specifically to FIG. 3d for a discussion of the indicators used to establish a "profile" for block of information being written on magnetic tape medium, it is desirable to briefly discuss the monitor intervals or time period used for defining a block. There are four time intervals or time periods defined for the block. These correspond to intervals I through IV in FIG. 7a. There are two time intervals estabished at the beginning of the block and they are defined as a function of when the controller begins the operation. There are two time intervals occurring at the end of a block which are defined in terms of when the controller stops writing. The extent to which the intervals overlap or are exclusive is a function of the length of the block written on the magnetic tape medium.

In greater detail, the first interval is an initial gap period and this period for the magnetic tape device of the preferred embodiment corresponds to a distance of "0.12" inches on the magnetic tape medium from the start of the operation which as explained herein in the case of a write operation corresponds to the leading edge of the write pulse enable signal. In the magnetic tape device of the preferred embodiment, the delay between the time information is recorded or written by the write head and read back or recovered by the read head corresponds to a distance of "0.15" inches on the medium. Therefore, in the case of a write operation, there should be a period of at least "0.12" inches on the tape medium during which no information is recovered or reproduced. The next interval is the beginning of block interval during which information should be recovered from the recording medium. This interval corresponds to a distance of "0.08" inches on the medium following the initial gap interval. Similarly, there are two intervals occurring at the end of the block. The first of these is the end of block interval which corresponds to a distance of "0.12" inches on the medium following the completion of writing which is signalled by the trailing edge of the write pulse enabling signal. The last interval corresponds to a drop-off window interval which is a distance of 0.08 inches on the medium following the preceding window interval. During this inverval, the information being written should discontinue. The interpretation and occurrence of various combination of these conditions will be discussed in greater detail with reference to the flow charts of FIGS. 8a through 8l, 9a through 9b and 10a through 10g.

Read After Write (RAW) Block Detector Error Indicators - FIG. 3d

Different ones of the stages of function path register HFR2 serve as read after write block detector error indicators during write operations. More specifically, flip-flop HFR20 serves as a "no block detected" indicator. This flip-flop is set to its binary ONE state when no block is detected by the data recovery unit. Stated differently, the flip-flop is in a binary ONE state when a valid beginning of block indication is not detected during an interval corresponding to the end of the initial gap interval to the start of the drop-off window interval established from the changes in state of the write pulse enable signal. A block as mentioned is defined as the occurrence of five consecutive frames detected by the zone detector activity circuits of FIG. 3a.

The flip-flop HFR21 serves as a multiple block indicator and is set to a binary ONE state when a block is detected and when the zone detector flip-flop of FIG. 3a resets for an interval corresponding to a distance greater than "0.08" inches. The flip-flop HFR22 serves as a noise in the initial gap indicator. This flip-flop is set to a binary ONE state when noise as defined in accordance with the preferred embodiment is detected during an interval corresponding to the initial gap interval. As mentioned, noise is defined as the occurrence of less than five consecutive frames detected by the zone detector activity circuits of FIG. 3a.

Flip-flop HFR23 serves as a late block indicator. This flip-flop is set to a binary ONE when the beginning of a block is detected after the end of the beginning of block window interval. Flip-flop HFR24 serves as a short block indicator. This flip-flop is set to a binary ONE state when a block was detected but that the block ended or had terminated prior to the start of the drop-off window interval. Flip-flop HFR25 serves as a long block indicator. This flip-flop is set to a binary ONE when a block is detected and the block does not drop off or terminate prior to the beginning of the end of drop-off window interval. The last flip-flop HFR26 serves as a noise indicator. This flip-flop is set to a binary ONE state when noise defined as more than one frame but less than 5 consecutive frames is detected as having occurred in other than in the initial gap interval.

As explained herein with reference to FIG. 5, different ones of these detector error indicators are used by the controller 100 to establish whether the error is "fatal" and that command write retry will be inhibited or allowed. The first three flip-flops HFR20 through HFR22 define fatal error conditions. It will be noted that these indicators signal whether or not the peripheral controller 100 is able to space across the block of information. When any one of these indicators is set to a binary ONE, it will be appreciated that spacing across the block most likely would not be successful. For example, if no block has been detected, the controller 100 has no indication of what it is to space across. Similarly, if a multiple block was detected, there is a probability that the tape device may stop in the "hole" and not in the interrecord gap. Lastly, if noise was detected in the initial gap, there is a probability that the device will not stop in the gap but continue across the previous block thereby dropping a block.

The late block, short block, long block or noise indicators define error conditions which do not prevent spacing across a particular block. Thus, these four conditions defined by the states of flip-flops HFR23 through HFR26 will result in an error and enable command retry when retries are allowed by the system. It will be noted that in addition to treating the last four error conditions as "write errors", they are further used to define whether or not retry can be successfully accomplished.

Miscellaneous conditions are stored by different ones of the flip-flops of register HFR6 during a write operation. Specifically, flip-flops HFR60, HFR63, HFR64, and HFR65-HFR67 serve as a tape mark detected indicator, a preamble detected indicator, a postamble detected indicator and block initiation counter storage respectively.

During space and read operations, as explained herein, both registers HFR2 and HFR6 store error indications used by the controller to determine whether command write retry or read retry should continue. More specifically, flip-flops HFR20, HFR22, HFR23 and HFR27 serve as a noise before block indicator, a noise after block indicator, a split block indicator and tape mark detected indicator. Flip-flops HFR63, HFR64, HFR65 and HFR67 serve as a preamble found indicator, postamble found indicators and a final gap counting indicator.

DESCRIPTION OF OPERATION

Write Operation

With reference to FIGS. 1 through 14, the operation of the preferred embodiment of the present invention will be now described in processing a write command which results in a retryable error condition. It is assumed that the controller 100 has initiated a channel program in which it has obtained a logical channel number (LCN) and a first channel command entry (CCE). Also, the particular device specified will be seized and its status examined. Assuming that the device status is correct, the controller 100 begins execution of a command decoder routine as illustrated in FIG. 4.

The decode routine shown in greater detail in FIG. 15 utilizes six bits of the eight bit command code previously stored in scratch pad memory 107 to form an address which is loaded into ROS address register 104-4. This causes the read out of a branch microinstruction (i.e. T26) containing an address field which specifies the write routine as shown in FIG. 4.

The write routine is shown in greater detail in FIGS. 5, 8a through 8e. It is assumed that the controller is to write a data block (one or more records) received from the CPU block of data employing phase encoding. This means that the CPU had sent to the controller control bytes (i.e. function mask bytes) specifying that the controller was to operate in phase encoded mode. The block has a predetermined format. That is, it normally includes groups of synchronization signals bracketing constituting a preamble and postamble portion bracketing the data portion. The preamble portion includes approximately 40 frames of all ZERO bytes which terminate in an all ONES frame. The postamble portion includes another all ONES frame followed by 40 all ZERO frames followed by the interrecord gap or space.

For the purpose of this invention, it can be considered that the operations which condition the controller to operate in a certain mode take place in a conventional manner. However, for further details regarding this, reference may be made to the copending applications previously referenced. FIG. 8 shows the types of operations performed by the write routine before entering the phase encoded write routine of FIG. 8a.

As FIG. 8 shows, the controller initially stores flags indicating the type of command in location TS1 (OB1) of scratch pad memory 107. The various operating flags stored in TS1 control the setting of parameters used during the execution of various critical loops or routines. The bit positions of TS1 for execution of write operations are designated as follows: bit 0 = write block; bit 1 = erase; bit 2 = write tape mark and bit 3 = forward job erase. To maintain status of which operations the controller is executing, several status bits termed an "operation phase code" are stored and modified as required during command execution. For write and read operations, the operation phase code is stored in the 3 high order bit positions of a scratch pad memory location (e.g. 048). For a write operation, these bits are coded as follows:

000 = write; and,

001 = write; retry.

Also, as seen from FIG. 8, the controller makes various checks, sets up the device and control indicators specified by the function mask byte. For example, the register HFR0 has bit position 2 set to a binary ONE specifying a write operation. Registers HFR4, HFR6, HFR5, HFR7 and HFR2 are also reset. Because there is no "retry", previously to loading the indicators, a data transfer service code is transferred to the PSI control followed by execution of a sequence which applies to the code on the PSI bus 202. Also, bit 7 of the termination type byte stored in a scratch pad memory location (i.e. 093) is set to a binary ONE specifying that this type of operation is retryable. This byte is created by the execution routine and is updated by the detail status routines. The bit positions are designated as follows:

B0 Abnormal Software Recoverable;

B1 Abnormal Nonrecoverable;

B2 Abnormal Manual Intervention Required;

B3 Conditional Branch;

B4 Detailed Device Status Fetched;

B5 Detail Status Sent;

B6 Skip Device Status Analysis; and

B7 Retryable.

Following the storing of the termination type byte, the contents of TS1 are fetched and tested to determine if it is an erase operation, followed by the test of NRZ mode flip-flop. Since this is a phase encoded write operation, a branch is taken to routine PWIF as illustrated in FIG. 8.

Write Routines and Read After Write Routines

Figure 8A:
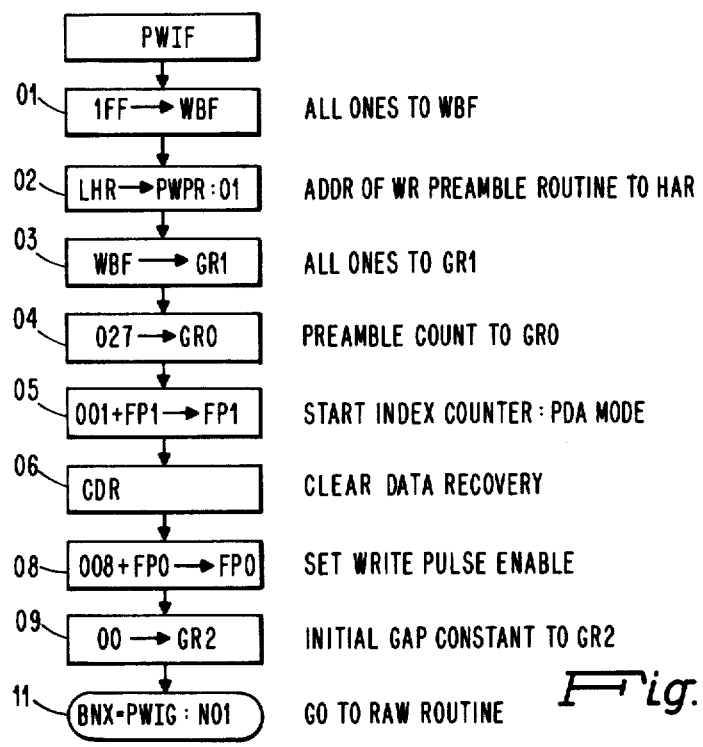
FIGS. 8a through 8i illustrate in greater detail the different write routines of FIG. 5.

As mentioned, the PWIF routine is shown in detail in FIG. 8a. This routine serves as an interface between the main write routine of FIG. 8 and the phase encoded write/read after write (RAW) routines of FIGS. 9a through 10g. When this routine is entered, the beginning of tape (BOT) or interrecord gap has been written, various timing circuits have been set (e.g. the index register 104-14 has been loaded with the frame period constant), the write enable flip-flop HFR04 is reset, the data recovery unit 105 has been initialized, the phase encoding clock enable flip-flop HFR51 is reset and frame correction is inhibited (i.e. HFR52=1).

As seen from FIG. 8a, the routine PWIF loads the address of the first microinstruction of the next write preamble routine (PWPR) to be sequenced into the history register 104-17 by means of microinstruction PWIF02. It also sets the various registers and clock circuits to write the preamble frames of the block (i.e. loads preamble counter, sets index counter 104-16 to PDA mode, sets HFR04 to a binary ONE etc). The routine then loads an initial gap constant "CO" into general register GR2 and branches to a first microinstruction in the first read after write routine PWIG upon execution of branch microinstruction PWIF11.

Figure 9A:
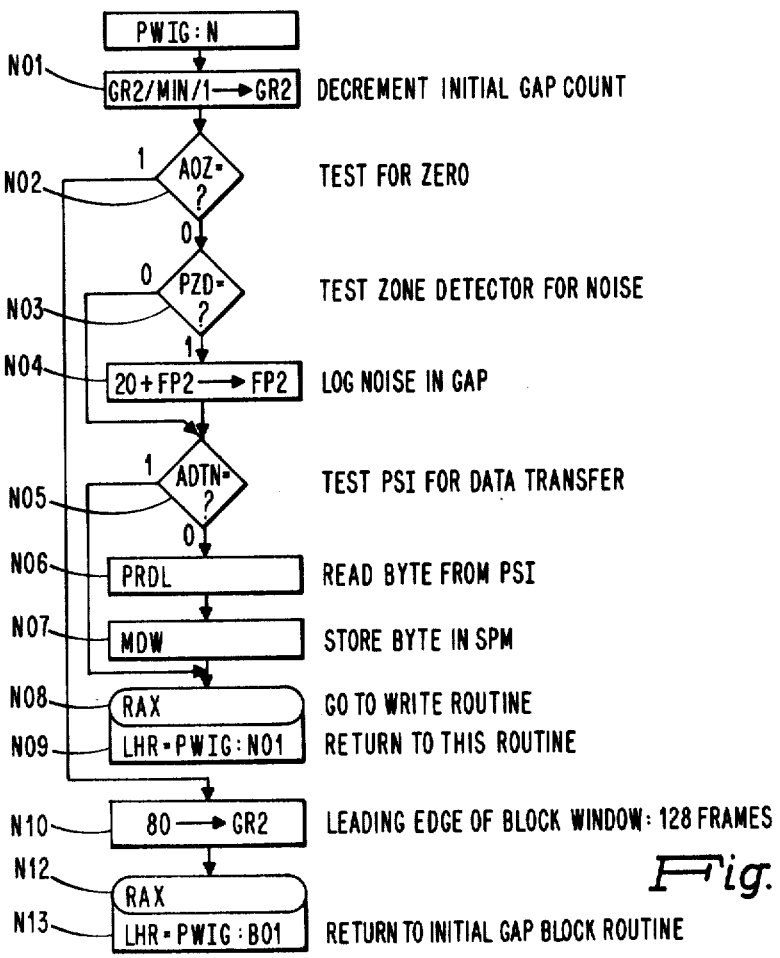
FIGS. 9a and 9k illustrate in greater detail the normal read after write monitoring routines of FIG. 5.

The routine PWIG, shown in detail in FIG. 9a, monitors the initial gap area for noise. This area is labeled interval I in the read block waveform of FIG. 7. In the case of a write operation, this interval or period is very accurately defined since it represents the information written and read back a short interval later by the read head of the tape device. In the preferred embodiment, this distance on tape corresponds to 0.15 inches, representative of the distance between the write and read heads. In accordance with the present invention, a period of 0.12 inches is established for the initial gap period as mentioned. During this period, no data should be detected.

Now referring to FIG. 9a, it is seen that the gap interval I is established by the predetermined count loaded into GR2. The routine during the interval decrements the count by 1 and tests to determine that the count is zero. If the count is not zero, the state of the zone detector flip-flop 105-82 of FIG. 3a is tested by microinstruction PWIG03. If the detector flip-flop is set, indicative of noise being detected, microinstruction PWIG04 is executed which forces bit position 2 (i.e. flip-flop HFR22) to a binary ONE. If the detector flip-flop is still reset, then bit position 2 remains a binary ZERO.

Next, microinstruction PWIG05 tests the state of an allow data transfer signal, generated by logic circuits, not shown, to determine whether to read in another byte from the PSI. This signal is a binary ONE when there is space to store additional bytes in scratch pad memory 107 (e.g. only 29 bytes stored) signaled by state of the difference counter included as part of the SPA register and the PSI control 102 is ready to transfer a byte (i.e. completed previous byte transfer and the IOC has not terminated transfer operation). If the count corresponds to the established number, microinstructions PWIG06 and PWIG07 transfer and store the byte in scratch pad memory 107. When the allow data transfer signal is a binary ZERO, the transfer of further bytes is inhibited.

As seen from FIG. 9a, microinstructions PWIG08 and PWIG09 are executed which causes the control store to branch back to the write preamble routine PWPR of the write routine which corresponds to the location specified by the contents of the history register 104-17. That is, the contents of the history register 104-17 are loaded into the ROS address register 104-4 as the next microinstruction PWIG09 is being executed which loads the address specified by microinstruction PWIG13 read out into memory register 104-5 into history register 104-17. This allows the control store 104-1 to return to the next read after write routine which is the initial gap block routine PWIG:B.

In the event that the initial gap count has been decremented to zero indicating that the interval has ended, microinstruction PWIG10 is executed which loads another count (i.e. 80) into general register GR2. This count defines the next interval which corresponds to the beginning of the block window interval (II) in FIG. 7. It is during interval II that the circuits of the data recovery unit 105 should detect information. The duration of this interval as indicated in FIG. 7 corresponds to a distance of 0.08 inches.

Figure 8B:
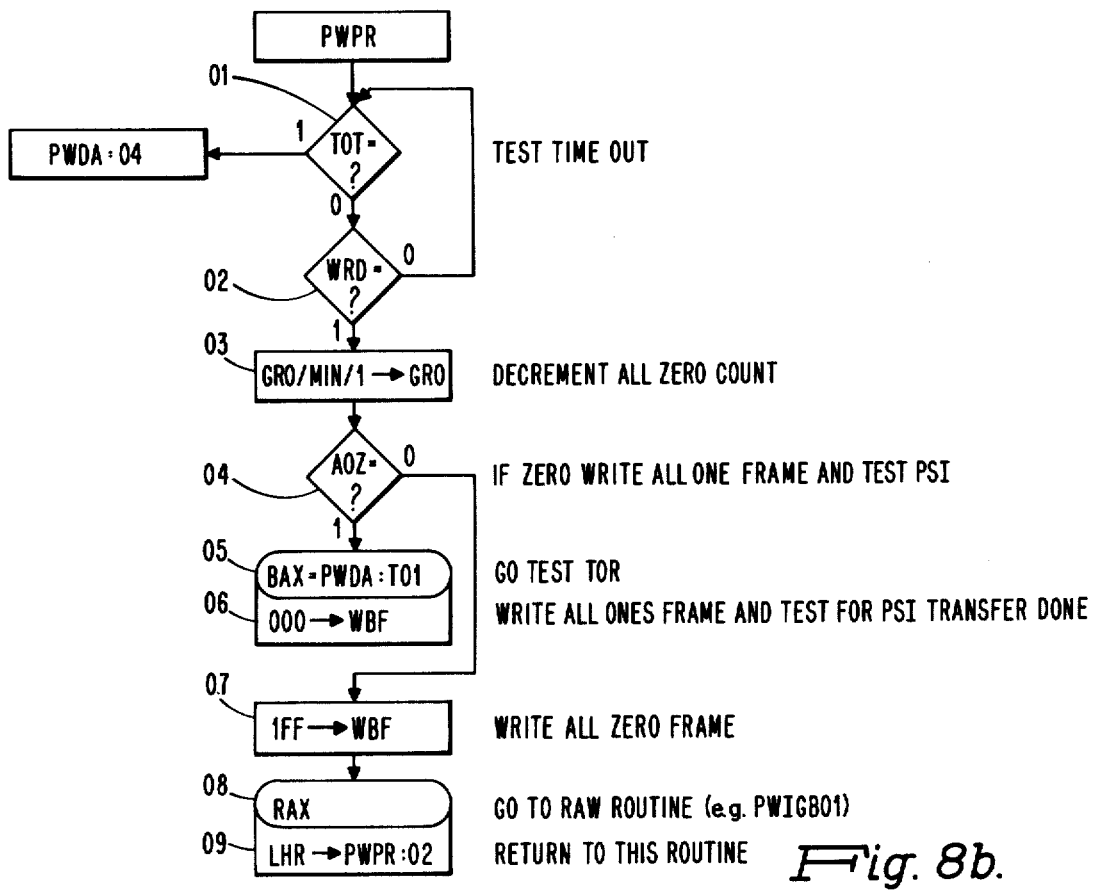

As mentioned, the control store branches to the write preamble routine PWPR shown in detail in FIG. 8b. This routine causes all ZERO preamble frames to be written on tape until the preamble count stored in general register GR0 decrements to zero. At that time, the routine causes an all ONES frame to be written and then the routine branches to the next write routine (data write routine PWDA) in order to determine that the IOC has not terminated the data transfer.

Referring to FIG. 8b, it is seen that microinstruction PWPR01 when executed determines if a time out condition occurred (i.e. indicates abnormal condition) by testing the state of flip-flop HFR04 of FIG. 3d. This flip-flop is set to a binary ONE when a timer indicates that an interval corresponding to a distance of 25 feet of tape has elapsed. The time duration is established by the main write routine. Assuming no time out, microinstruction PWPR02 tests the state of the ready flip-flop 105-160 which signals when a byte has been transferred to the selected device via write buffer 109 and DLI circuits 110. Thereafter, the count in general register GR0 is decremented by one and tested for zero in response to microinstructions PWPR03 and PWPR04 respectively. If not zero, another all ZERO frame is transferred via buffer 109 in response to microinstruction PWPR07. The branch microinstruction PWPR08 returns the control store 104-1 back to the next microinstruction of an appropriate one of the read after write routines (see FIG. 6b). Assuming interval I, this corresponds to the first microinstruction (i.e. PWIGN01) of the initial gap routine PWIG:N shown in detail in FIG. 9a. Also, during branching, the next microinstruction PWPR09 is executed which loads the address of microinstruction PWPR02 into the history register 104-7 enabling the control store 104-1 to return to this routine.

The above arrangement enables the controller to divide processor time and resources between a pair of routines. For further discussion of this arrangement, reference should be made to the copending application of Myrl Kennedy Bailey, Jr. titled "Improved Microprocessing Apparatus and Method" filed on even date herewith bearing Ser. No. 536,126.

As seen from FIGS. 6a and 8b, when the preamble count in general register GR0 decrements to zero, a branch microinstruction PWPR05 is executed which causes the control store to branch to address of microinstruction PWDAT01 in the write data routine PWDA as specified by the branch microinstruction. This microinstruction of the write data routine, shown in detail in FIG. 8c, tests the state of a PSI termination flip-flop TOR, not shown, included in PSI control 102 to determine whether the CPU has completed the transfer of the bytes.

Assuming no termination, next microinstruction PWDAT06 is executed which tests the state of an operational out OPO flip-flop, not shown, included in PSI control 102 to ensure that the IOC 200 is still operational. Next, branch microinstruction PWDAT07 is read out which causes the control store 104-1 to return to the address of microinstruction PWPR02 of read after write routine PWPR specified by the contents of history register 104-7. During branching, depending upon the state of the operational out flip-flop, either microinstruction PWDAT05 or PWDAT07 is executed. Specifically, when flip-flop OPO is a binary ZERO indicating the IOC 200 is not operational, microinstruction PWDAT05 is executed which loads the address of microinstruction PWEB01 into history register 104-7. However, when flip-flop OPO is a binary ONE, signaling further activity, microinstruction PWDAT07 is executed which loads the address of microinstruction PWDA01 of the write data loop routine (see FIG. 6a).

Figure 8C:
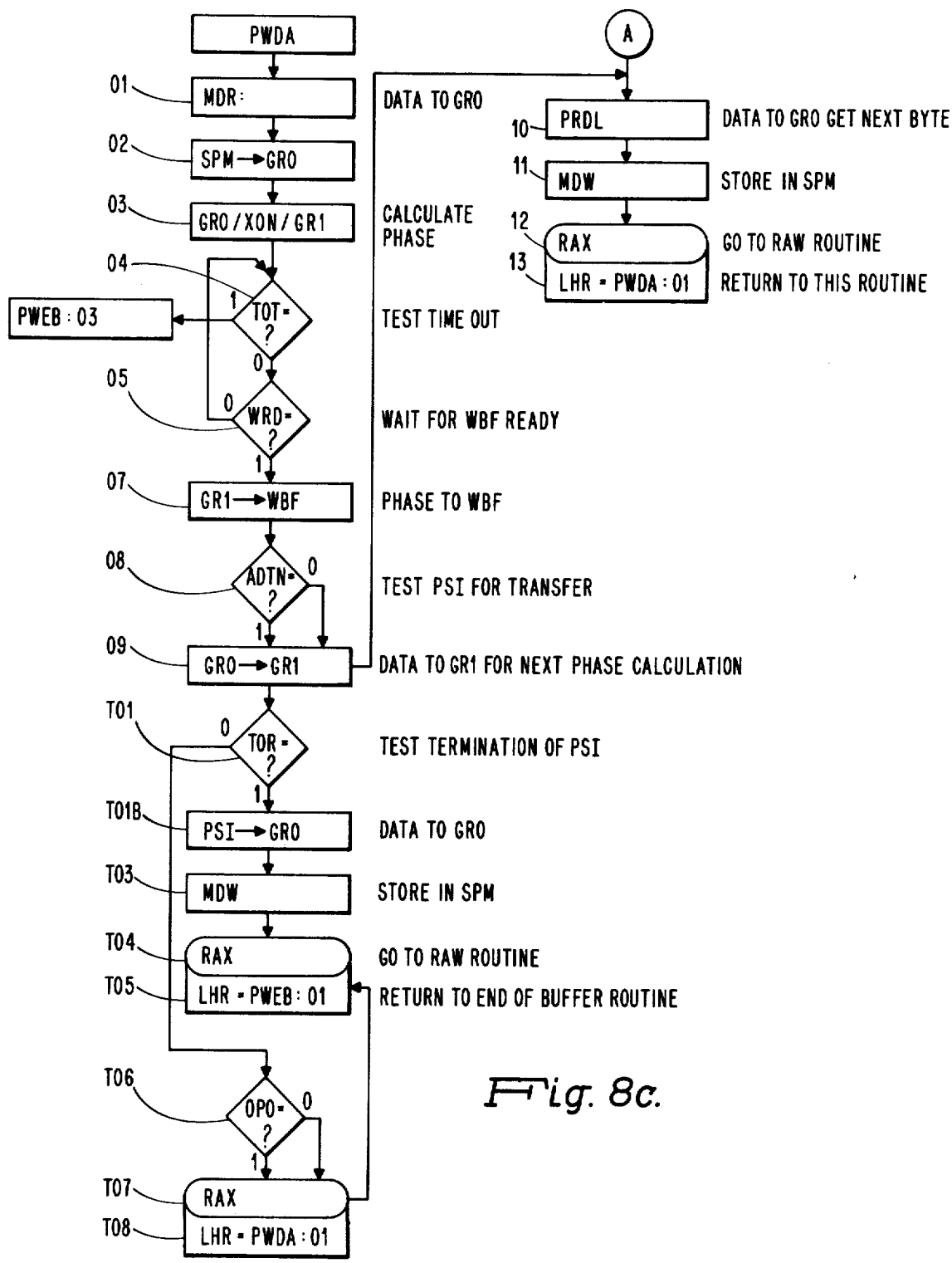

From the above explanation and FIG. 8c, it is seen that the write data routine PWDA writes frames on tape until the PSI control 102 signals termination of the transfer. When the PSI control 102 signals termination, the routine branches to the end of buffer routine PWEB while general register GR1 stores the last frame written for phase calculation (i.e. generate appropriate phase signals). As seen from FIGS. 6a, 6b and 5, during the writing of the preamble frames, the control store 104-1 alternates between the write preamble routine PWPR and the initial gap routine PWIG:N of FIG. 9a.

Figure 9B:
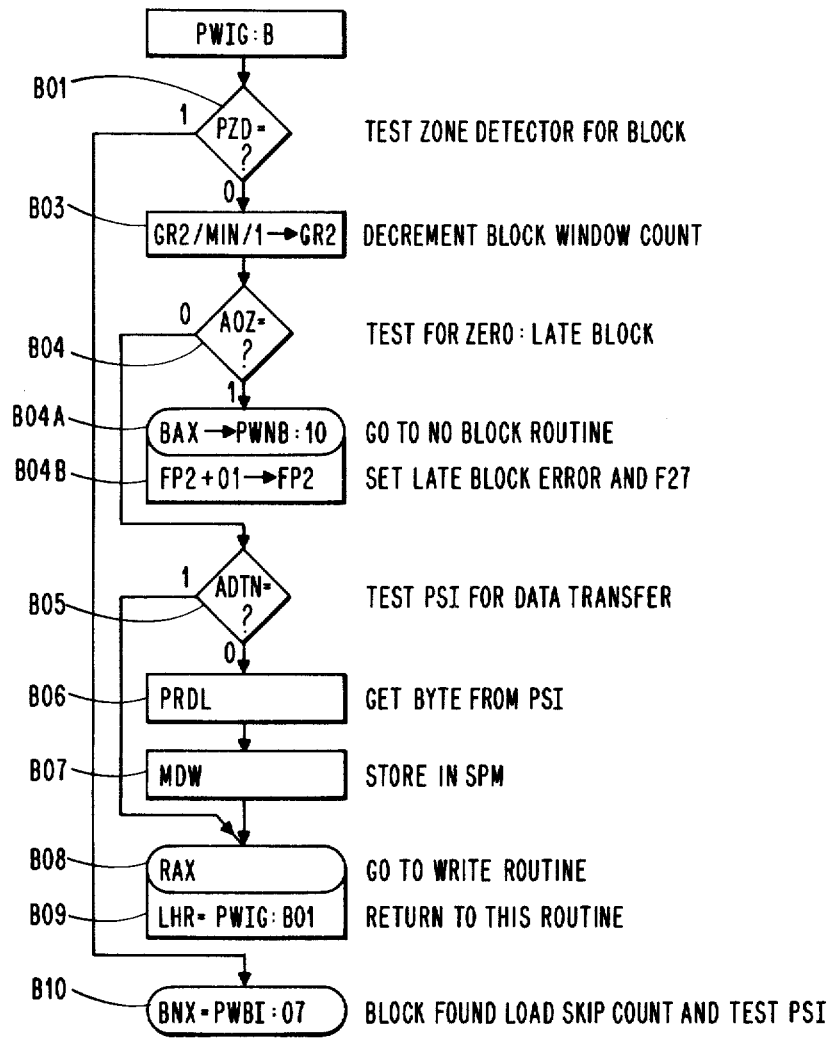

Referring to FIGS. 5 and 9b, it is seen that the routine PWIG:B during interval II monitors for the beginning of the block window interval III which corresponds to a distance of 0.08 inch from the end of the initial interval II (i.e. see FIG. 7). As mentioned, if no block is detected during this interval, the routine sets check bit 7 (i.e. flip-flop FP27) of register FP2 indicating the occurrence of a major error.

Figure 6B:
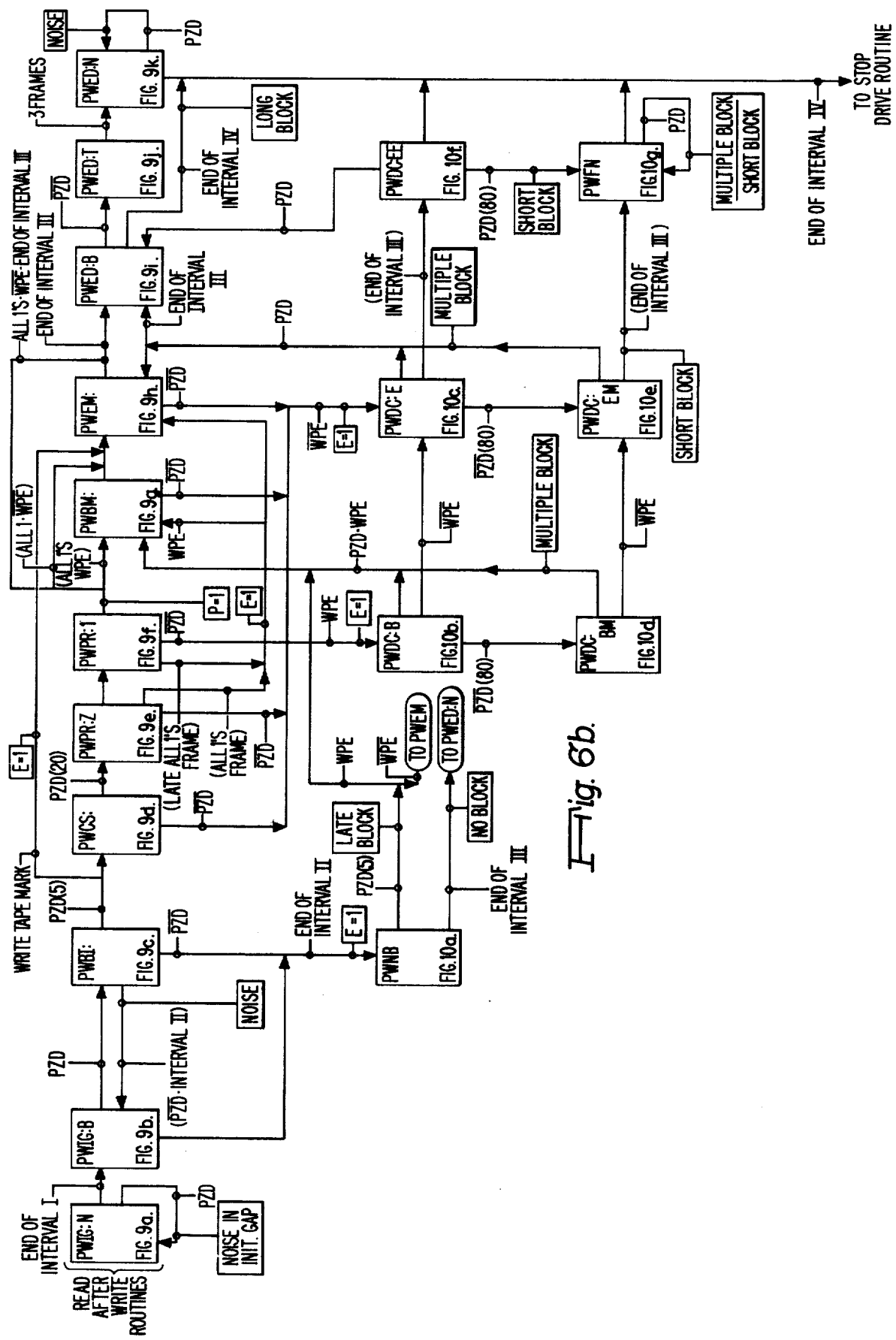

In greater detail, referring to FIG. 9b, it is seen that microinstruction PWIGB01 tests the state of the zone detector flip-flop 105-82 of FIG. 3a to detect the start of a block. When the flip-flop is set detection detecting of one transition, microinstruction PWIGB10 is executed which caues a branch to the block initiation routine of FIG. 9c. This routine handles the beginning of a valid block that was detected during the beginning of the block window interval. A block is defined as constituting 5 consecutive frames. Since the first frame signaled the start of the block, four additional frames are needed to meet the established requirements. As seen from FIG. 6b, if less than 5 consecutive frames are detected, the block is considered to be noise which results in the setting of flip-flop HFR26. Then control is returned to either the no block routine PWNB or to the beginning of block routine PWIG:B depending upon whether the block window count is zero. If this is a write tape mark operation, the tape mark indicator is tested and if it is a binary ONE, flip-flop HFR60 is set. Also, the flip-flop HFR27 is set to a binary ONE to bypass preamble/postamble checking and the routine passes control to the end of block monitor routine PWEM as shown in FIG. 6b.

Considering the above in greater detail, it is seen that microinstruction PWBI01 tests the state of the zone detector flip-flop PZD. When a binary ZERO, the routine branches to microinstructions PWBI18 through PWBI20 which reset the contents of register HFR6, set noise flip-flop HFR26 and decrement the block window count in general register GR2. Microinstruction PWBI21 tests the count and when not zero causes a branch to microinstruction PWBI25 to return control to routine PWIG:B. When the count is zero, the next microinstruction sets flip-flops HFR27 and HFR23 to binary ONES and the routine branches to the appropriate one of the write routines specified by the contents of the history register 104-17. Microinstruction PWBI120 causes the history register to be loaded with the starting address of the PWNB routine.

When the zone detector flip-flop PZD is still a binary ONE, microinstruction PWBI02 increments the block initiation count by one and when the count equals 4 indicative of a valid block, microinstruction PWBI03 causes a branch to microinstruction PWBI12 which resets the no block found flip-flop HFR20. Microinstructions PWBI13 through PWBI31 carry out the operations pertaining to the write tape mark operation. In the absence of such operation, microinstructions PWBI14-PWBI17 load a sync count into general register GR2 for synchronization of the data recovery clock circuits and set the clock enable flip-flop HFR51 and preamble mode flip-flop HFR50 to binary ONES in anticipated execution of the PE clock synchronization routine PWCS of FIG. 9d. Then the routine branches an appropriate one of the write routines specified by the contents of the history register 104-17.

When the block initiation count is less than 4, microinstruction PWBI04 decrements by one the block window count stored in general register GR2. The count is tested and if zero, indicative of the end of interval II, the routine executes microinstructions PWBI22-PWBI24. If the count is not zero, the next microinstruction tests the state of allow data transfer signal and depending upon its state reads and stores another byte into scratch pad memory 107 as shown in FIG. 9c. Finally, the routine branches to the appropriate one of the write routines.

Returning now to FIG. 9b, it is seen from this Figure and FIG. 6b that the routine decrements the block window count in general register GR2 by 1. Microinstruction PWIGB04 tests to see if the count is zero indicating whether the block is arriving late. This can be seen from FIG. 7. When the block is detected after the beginning of the block window interval II, this constitutes a late block.

Figure 10C:
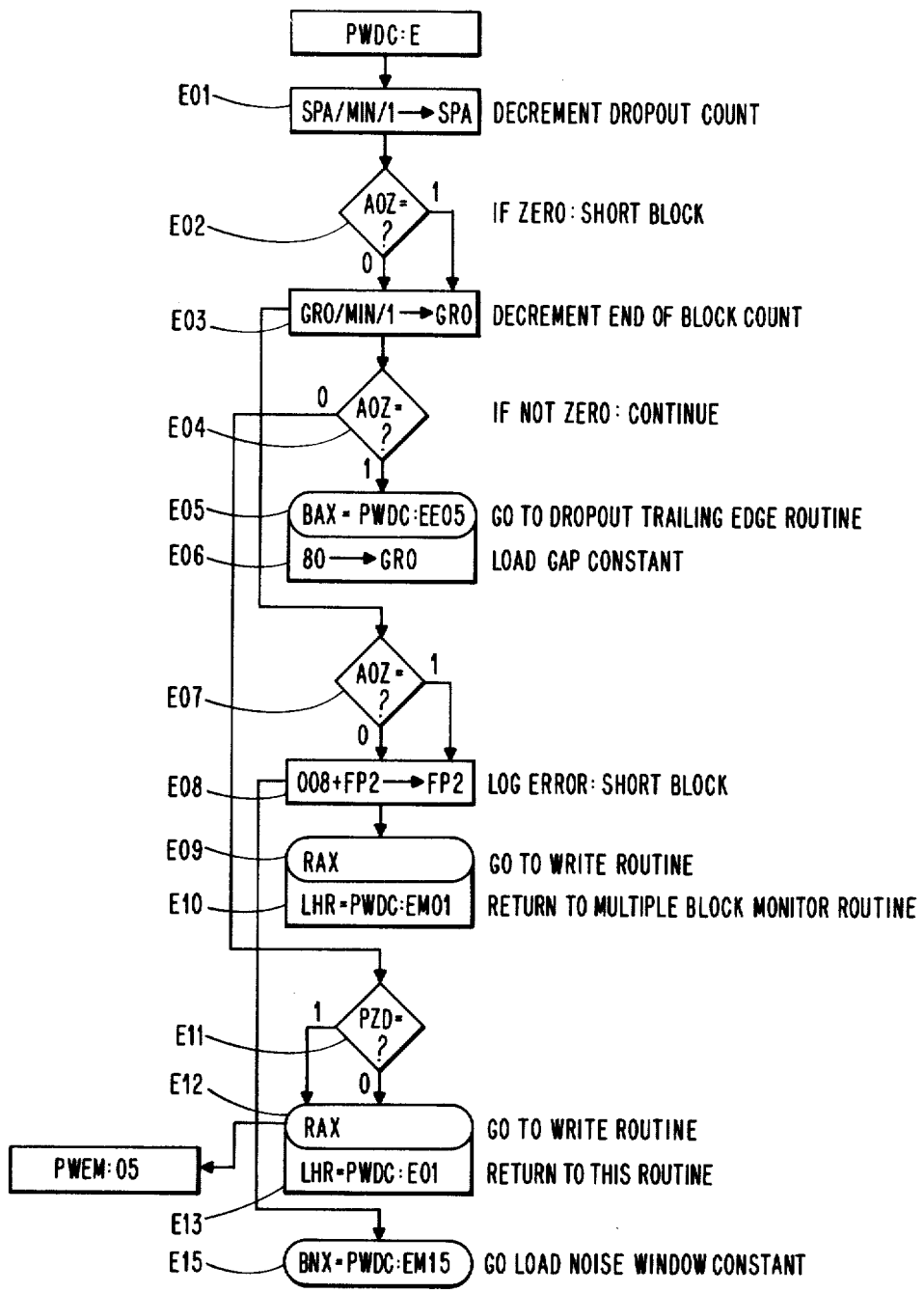
Figure 10D:
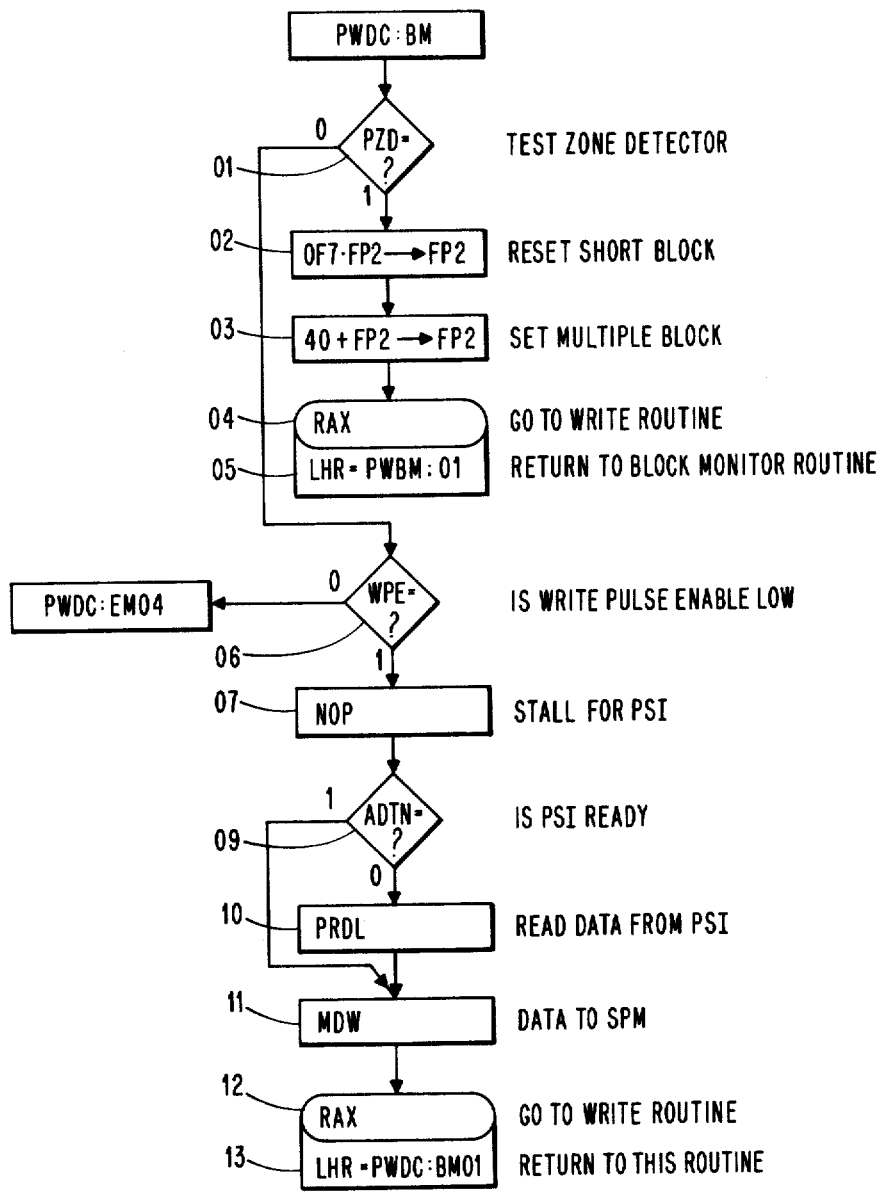
Figure 10A:
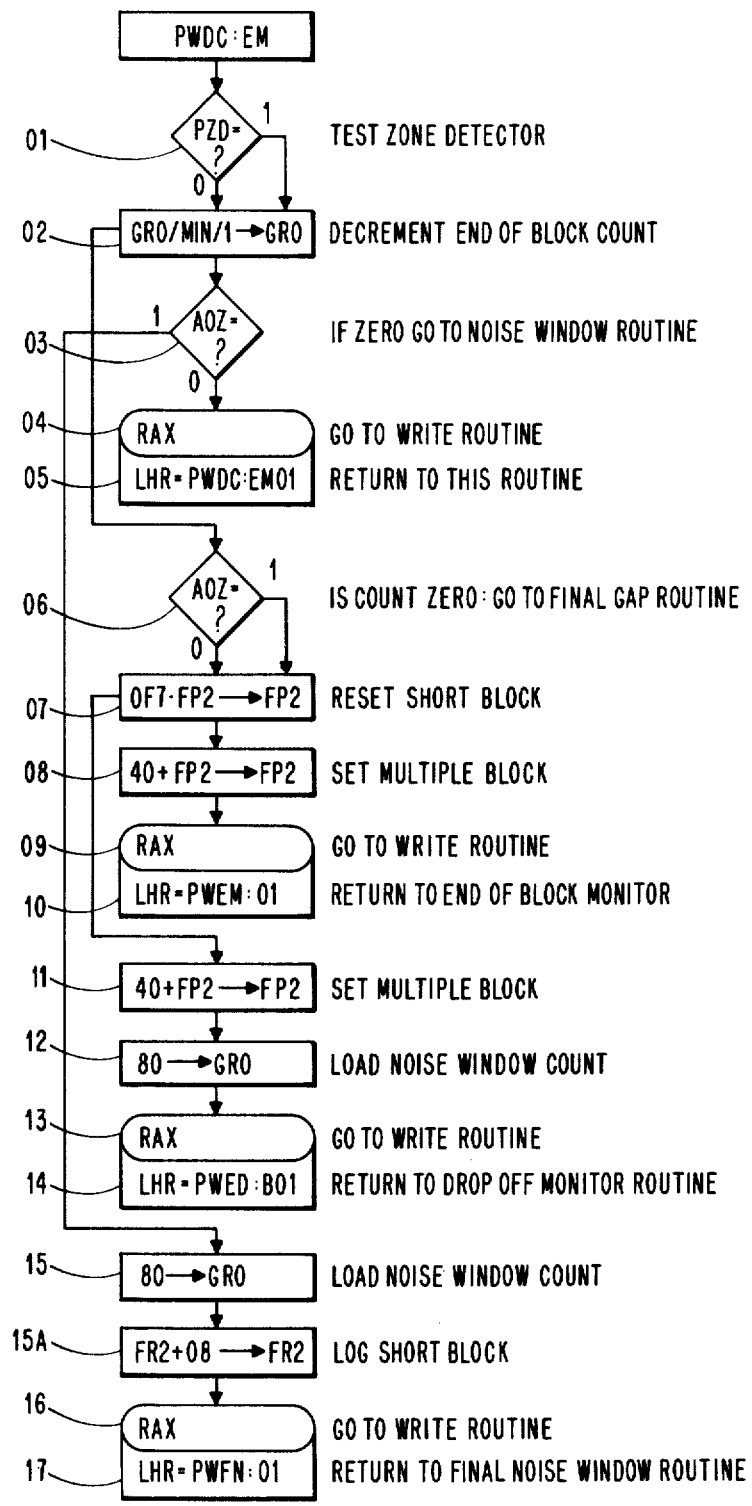

As seen from FIG. 6b, when no block is detected during interval II, branch microinstruction PWIGB04A is read out which causes a branch to the no block routine PWNB of FIG. 10a. However before the branch, microinstruction PWIGB04B is executed which sets flip flop HFR27 to a binary ONE.

The no block routine PWNB shown in detail in FIG. 10a handles the instance of no start of block being detected during the beginning of the block window interval II. If a start of block is subsequently detected, as seen from FIG. 6b, the late block flip-flop HFR23 is set and the no block flip-flop HFR20 is reset. If no block is detected by the end of interval III established by the block count stored in general register GR0, flip-flop HFR20 remains set. Once control is passed to the no block routine, no further checking of either preamble and/or postamble frames takes place.

In greater detail, referring to FIG. 10a, it is seen that the first microinstruction PWNB01 of the routine tests the state of the zone detector flip-flop QTPZD of FIG. 13a. If the zone detector flip-flop is a binary ONE indicating that a start of block was detected, microinstruction PWNB02 increments the contents of register HFR6 by one and microinstruction PWNB02 increments the contents of register HFR6 by one and microinstruction PWNB03 tests bit position 5 (i.e. HFR65) to check if the register stores a count of 4 (i.e. 5 frames counted). When the zone detector flip-flop remains a binary ONE for five successive frames (i.e. F65=1), microinstructions PWNB04A and PWNB04 set flip-flop HFR23 to a binary ONE and flip-flop HFR20 to a binary zero respectively.

Next, the state of flip-flop HFR04 (i.e. the write pulse enable signal) is tested by microinstruction PWNB05. Based upon the state of flip-flop HFR04, either of two sequences of microinstructions will be executed. If the test indicates that the flip-flop HFR04 is still a binary ONE (i.e. writing is still taking place), the control store branches to microinstruction PWNB06 which loads the contents of the history register 104-17 into the ROM address register and during the branch, microinstruction PWNB08 is executed which loads into the history register 104-17 the address of the return to block monitor routine PWBM01. When the flip-flop HFR04 is a binary ZERO indicating completion of writing of the block, microinstruction PWNB07 is executed in place of PWBM08. This loads the address of the block monitor end of block routine PWEM01 into history register 104-17.

As seen from FIG. 10a, when the zone detector flip-flop QTPZD of FIG. 3a is a binary ZERO indicating that the start of block has not been detected, then the routine branches to microinstruction PWNB09 which resets the contents of register HFR6 to ZERO. Also, when flip-flop HFR65 is a binary ZERO, the routine branches to microinstruction PWNB10. In both instances, microinstruction PWNB10 is executed next which tests the state of flip-flop HFR04 (i.e. write pulse enable). When the flip flop HFR04 signals that the writing of the block has been completed (i.e. WPE=0), the routine decrements the interval III count by one and tests it for zeros in response to microinstructions PWNB16 and PWNB17 respectively. When the count is not zero, microinstruction PWNB14 is executed which causes the routine to branch to a microinstruction in the write routine specified by the contents of history register 104-17 (e.g. PWPR02). During branching, microinstruction PWNB15 is executed which loads the address of microinstruction PWNB01 into history register 104-17 enabling return to routine PWNB.

When the interval III count is zero indicating that no block was found, the routine executes microinstruction PWNB19 which resets the late block flip-flop HFR23 followed by microinstructions PWNB20 and PWNB21. The routine branches to write routine PWTS of FIG. 8e after loading the history register 104-17 with an address of a first microinstruction in the time synchronization routine PWED shown in FIGS. 6b and 9i.

When writing is not completed, the PWNB routine executes branch and test microinstruction PWNB11. When the PSI control 102 signals that the allow data transfer signal is a binary ONE, microinstructions PWNB12 and PWNB13 respectively transfer a byte from the PSI register 103 to general register GR0 and writes the byte into scratch pad memory 107. When the allow data transfer signal is a binary ZERO, the microinstructions are bypassed and microinstructions PWNB14 and PWNB15 are executed resulting in the return to the appropriate one of the write routines of FIG. 6a.

As mentioned previously, when the IOC 200 terminates the data transfer, as signaled by the setting of a terminate out flip-flop included in the PSI control 102, control passes from the data routine PWDA to the write end of buffer routine PWEB as shown in FIG. 6a. This routine shown in detail in FIG. 8d writes the last frames of data stored in scratch pad memory 107 on tape. The last frame is detected by means of the read and write counters included in the memory 107. Upon writing the last frame on tape, the routine loads history register 104-17 with the address of the next routine which is the write all one frame routine PWA1 as shown in FIG. 6a.

Figure 8D:
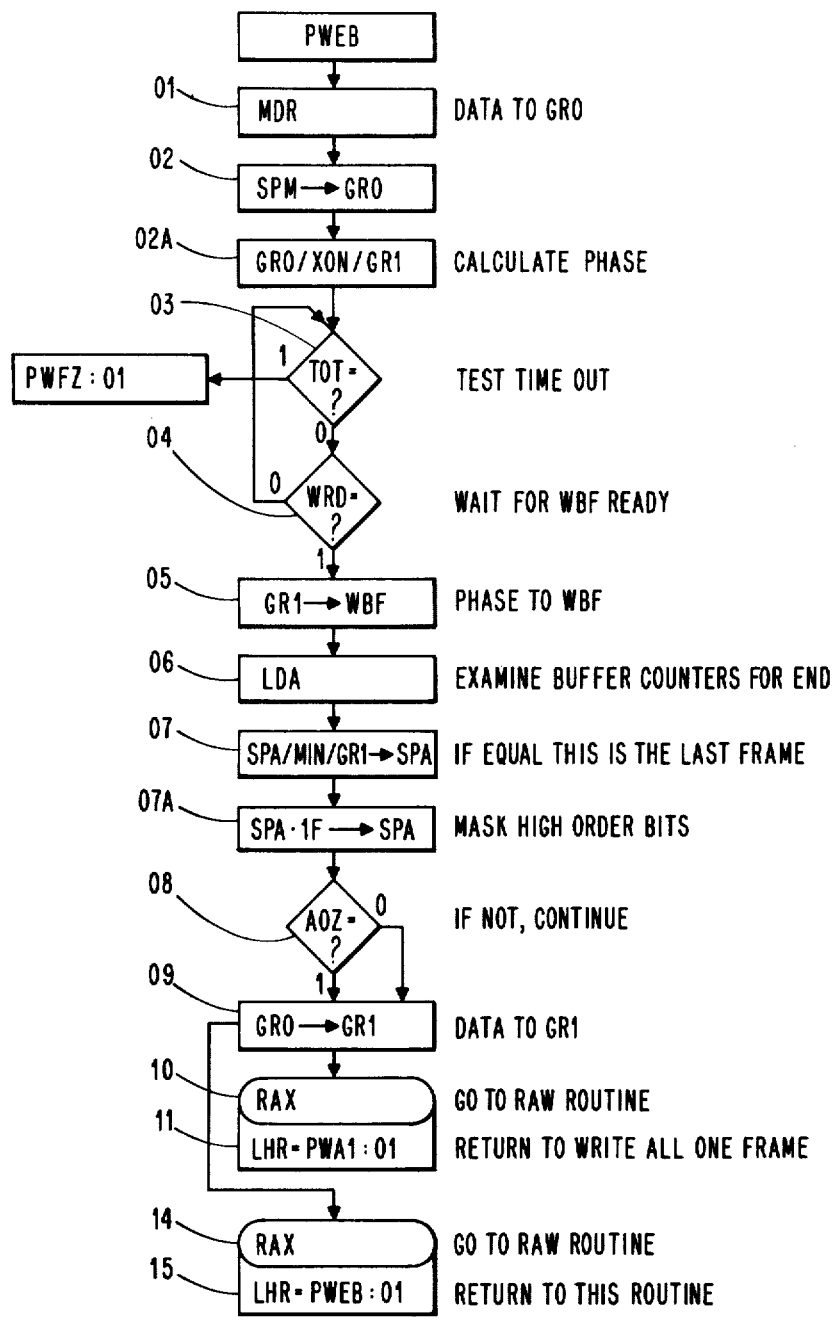

In greater detail, referring to FIG. 8d, it is seen that microinstructions PWEB01-PWEB05 cause a byte to be transferred from scratch pad memory 107 to write buffer 104. Microinstructions PWEB06-PWEB07 compare the counts in the pair of counters and if equal, there is a return to the next routine PWA1 during a next cycle to write the all ONES frame. If not equal, the routine returns to this routine to write another byte.

Figure 9K:
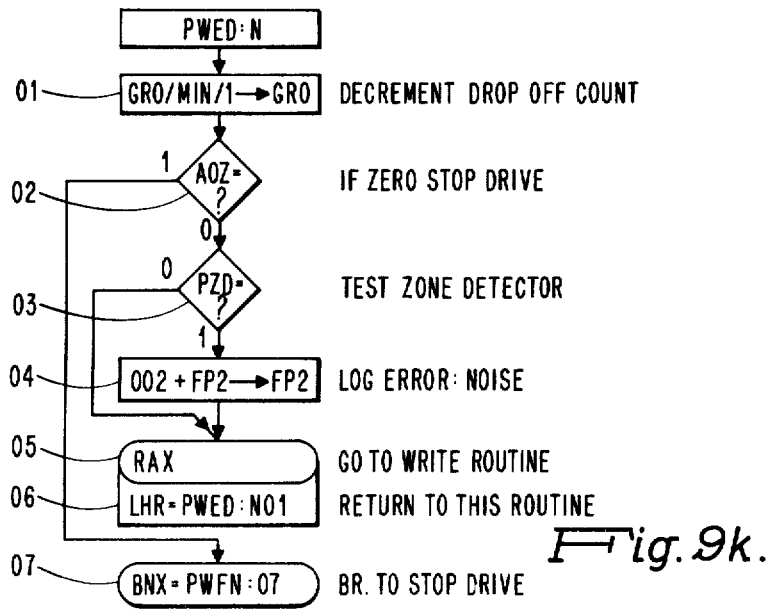
Figure 9D:
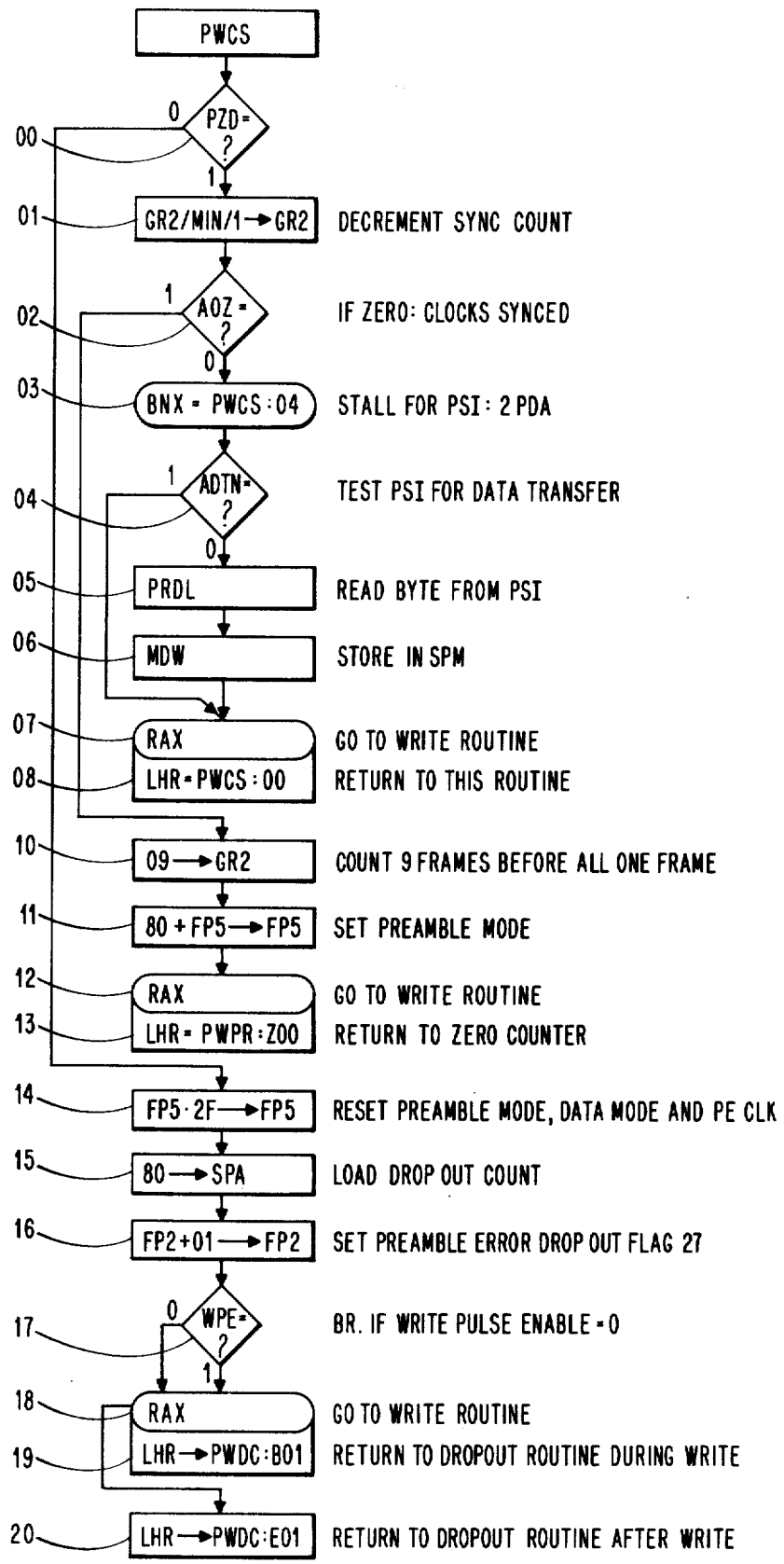
Figure 9A:
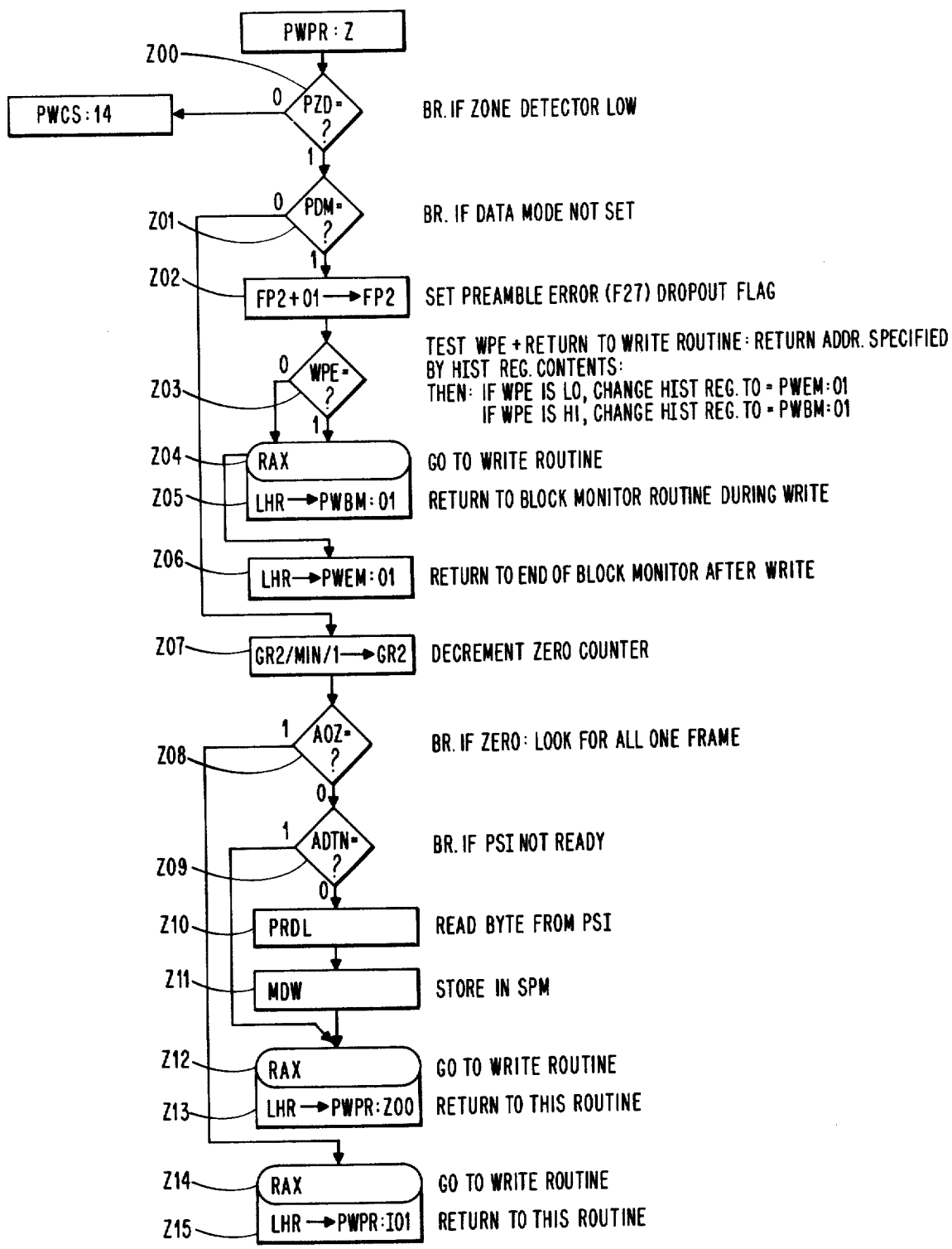

From FIG. 6b, it is seen that upon completion of routine PWBI, the controller 100 begins execution of PE clock synchronization routine PWCS of FIG. 9d. As mentioned above, this routine is begun after a valid beginning of block has been detected by the data recovery unit circuits 105. This routine times out the nominal 20 frames necessary for synchronizing the clock circuits of the data recovery unit 105. If during the routine should the zone detector flip-flop reset, control is transferred to the appropriate dropout routine (e.g. PWDC:E or PWDC:B) as shown in FIG. 6b and flip-flop HFR27 is set to a binary ONE (i.e. this corresponds to condition E=1 in FIG. 6b).

Referring to FIG. 9b, it is seen that microinstructions PWCS00-PWCS13 test the zone detector flip-flop and when set by decrement the sync count by one which when zero causes the routine to count 9 additional frames in the following routine PWPR:Z by loading a count of 9 into general register GR2. The microinstructions set preamble mode flip-flop HFR50 to a binary ONE and cause a branch to the appropriate one of the write routines. Also, at the same time, history register 104-17 is loaded with the address of the first microinstruction in the next RAW routine PWPR as shown.

When the clock circuits are not synchronized (i.e. A0Z=0), microinstructions PWCS03-PWCS08 are executed which cause another byte to be stored in scratch pad memory 107. Microinstructions PWCS14-PWCS16 are executed when the zone detector flip-flop PZD resets. These microinstructions reset the preamble mode flip-flop HFR50, the data mode flip-flop HFR53 and the PE clock enable flip-flop HFR51 to binary ZEROS, load a drop out counter of 80 into the scratch pad address register for use by the appropriate one of two dropout routines PWDC:B or PWDC:E and set flip-flop HFR27 to a binary ONE.

The results of testing write pulse enable flip-flop HFR04 selects the dropout routine. As shown, when the flip-flop is a binary ONE indicating that the block is still being written, the routine executes microinstructions PWCS18-PWCS19 which return control to the appropriate write routine and load history register with the address of the first microinstruction of dropout routine PWDC:B. When HFRO4 is a binary ZERO, indicating the end of writing, the routine returns to dropout routine PWDC:E.

Figure 8E:
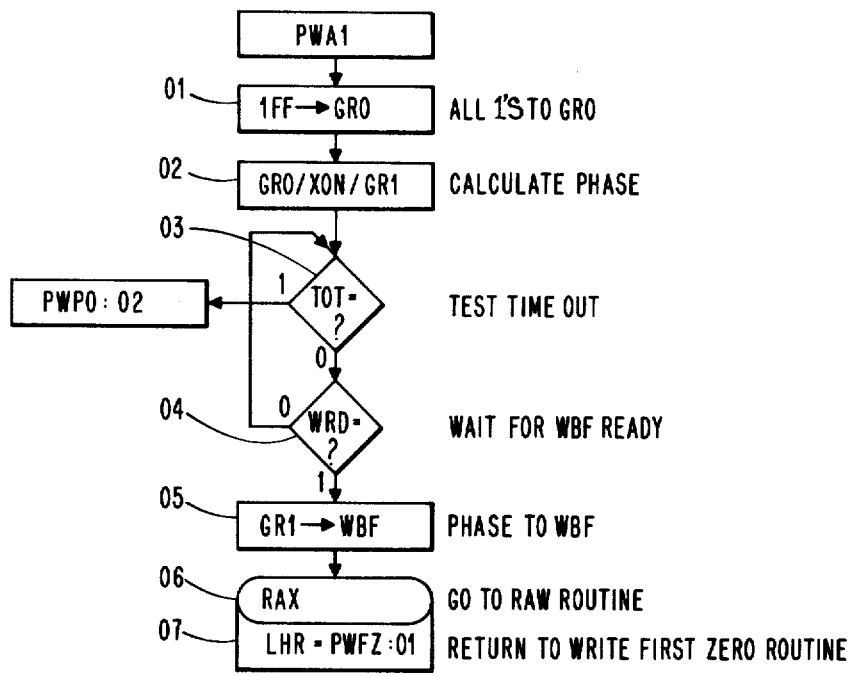

From FIG. 6a, it is seen that following the writing of the last data frame, the controller begins execution of routine PWA1 shown in detail in FIG. 8e. Referring to FIG. 8e, it is seen that microinstructions PWA101-PWA107 load general register GR0 with the all ONES frame and transfer it to the write buffer 109. The routine then branches to the appropriate RAW routine and loads history register 104-17 with an address of the first microinstruction of the write first all zero frame routine PWFZ.

Figure 8F:
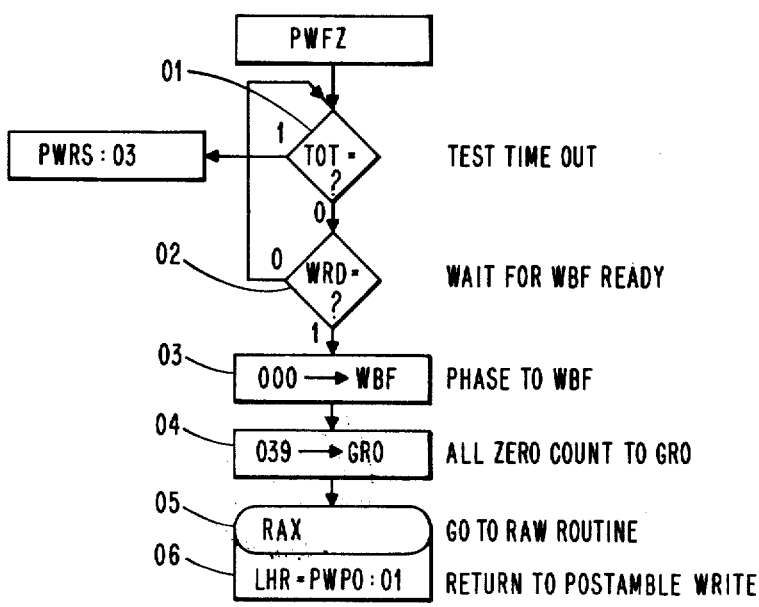

Still considering FIG. 6a, the next write routine PWFZ shown in detail in FIG. 8f writes the first all ZERO postamble frame on tape and loads general register GR0 with a count of successive frames to be written (i.e. 39 frames). Microinstructions PWFZ01-PWFZ06 write the first ZERO frame, load the count and cause a branch to the appropriate RAW routine loading the history register 104-17 with an address to return to the postamble write routine PWPO.

Figure 8G:
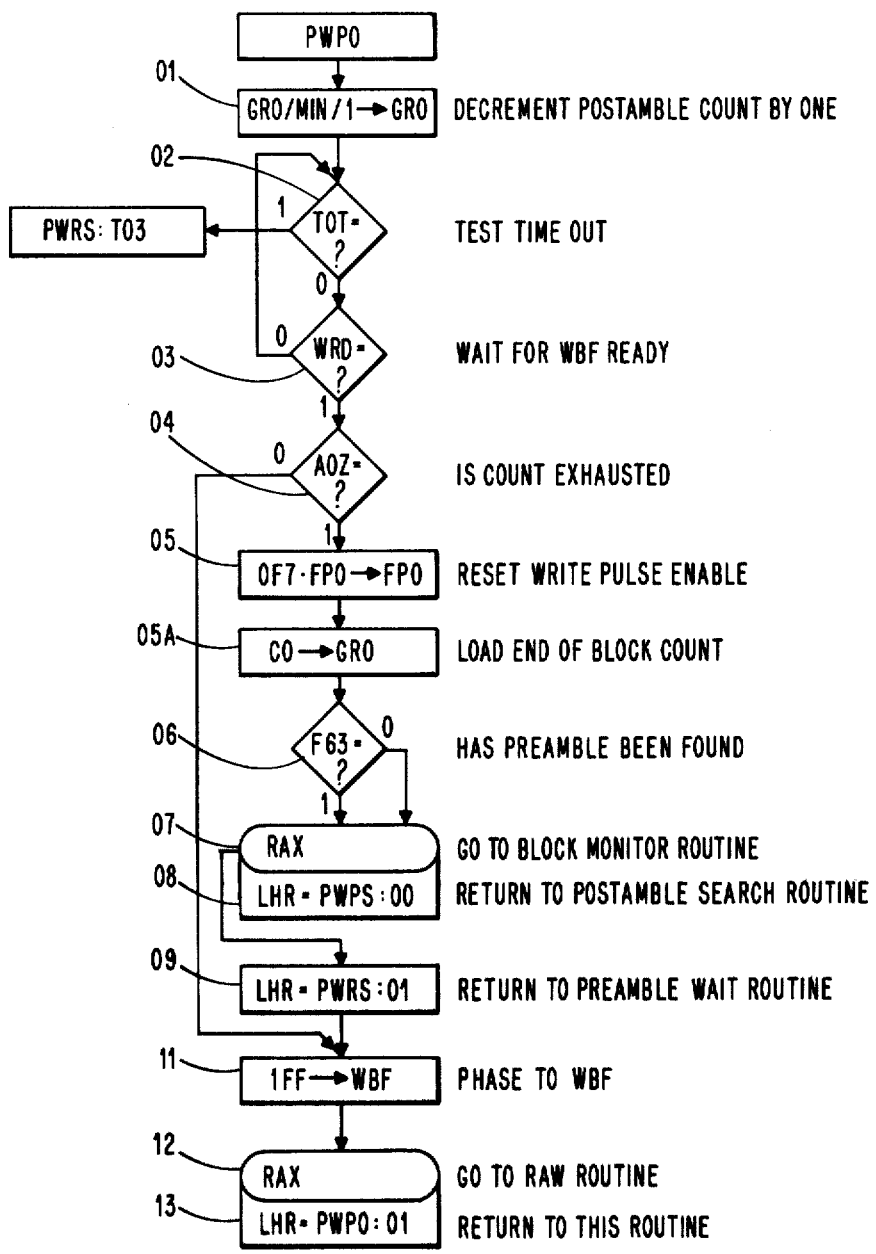

Upon return to the postamble routine PWPO, shown in detail in FIG. 8g, the controller 100 writes the remaining all ZERO frames of the block postamble (i.e. until GR0 decrements to zero), then resets write pulse enable flip-flop HFR04 signaling the end of writing and loads an end of block count into general register GR0. As seen from FIGS. 6b and 8g, if the preamble has been found, signaled by flip-flop HFR63 being set to a binary ONE as explained herein, the routine returns control to an appropriate one of the RAW routines loads the history register 104-17 with an address of the postamble search routine PWPS of FIG. 8a.

Figure 8H:
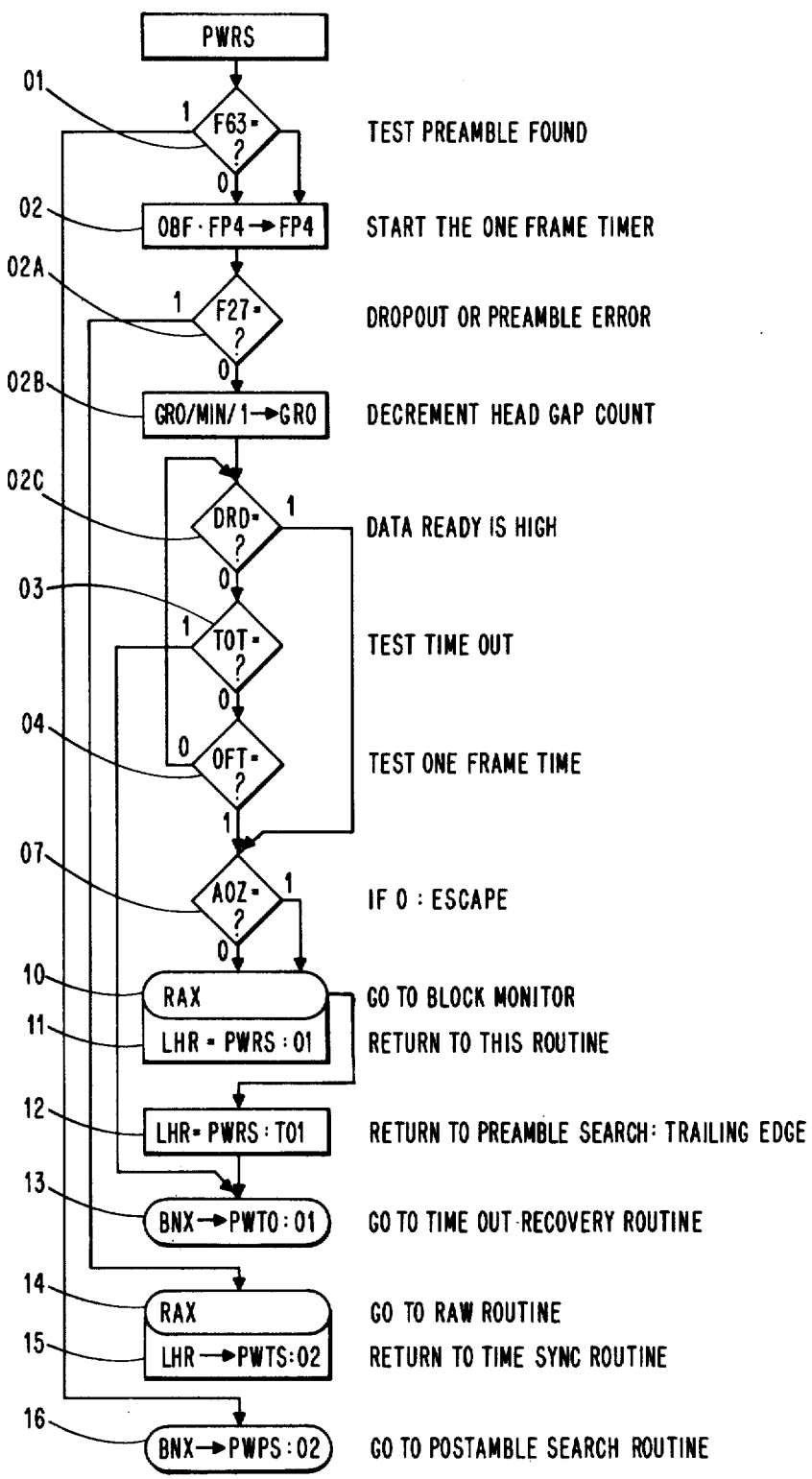
Figure 8I:
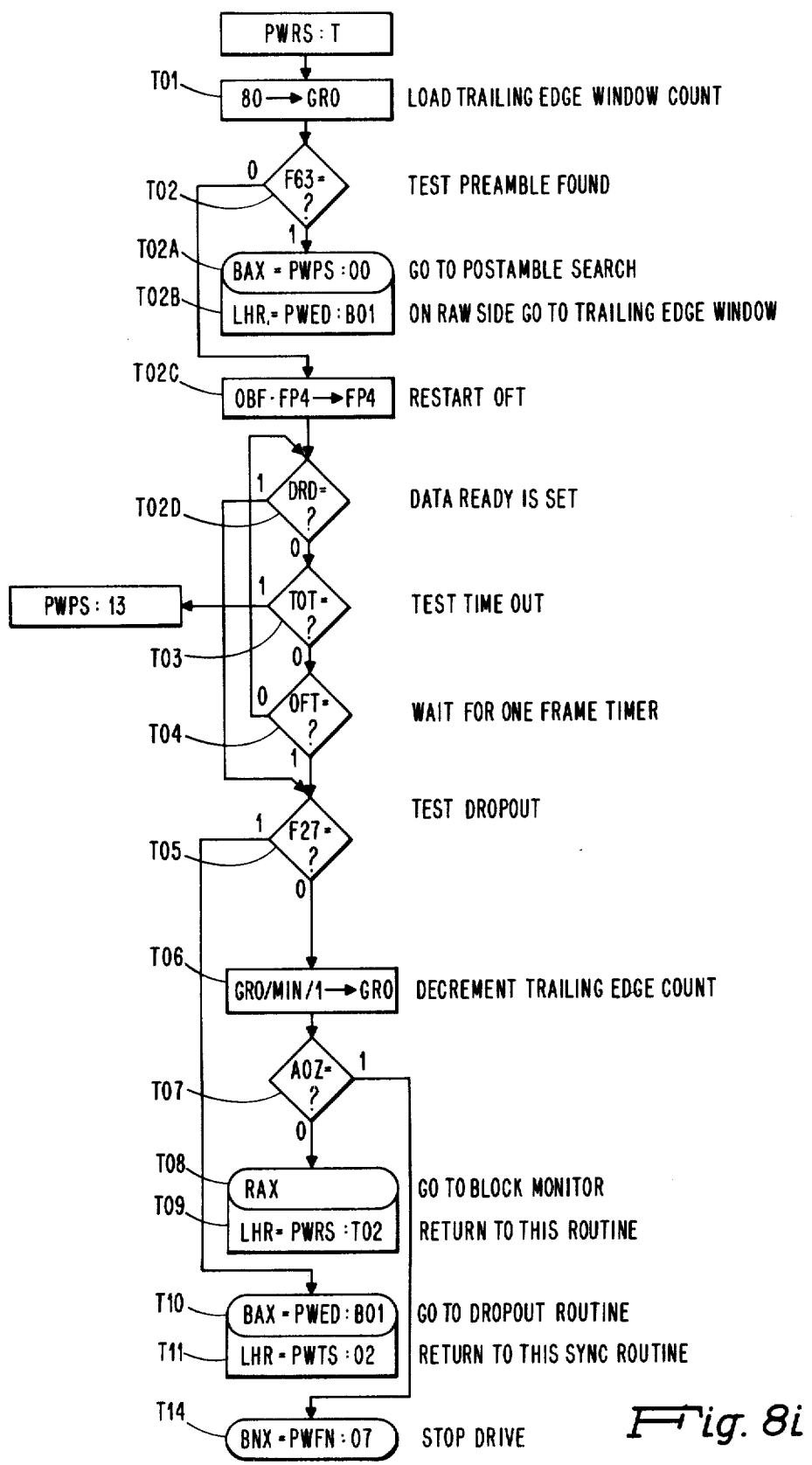

If the preamble has not been found (i.e. HFR63 is a binary ZERO), the routine returns to the preamble wait routine PWRS:T of FIG. 8i via the preamble search routine PWRS of FIG. 8h. Microinstructions PWP001-PWP013 carry out the operations just described as shown in FIG. 8g.

Assuming that routine PWPO has completed writing the postamble frames and that the preamble was detected, it is seen from FIG. 5 and FIG. 6a that write routines PWPS, PWZC and PWTS are then executed in succession concurrently with the RAW routines performing the operations indicated in FIG. 5. It will be noted from FIG. 5 that this sequence of write routines is executed for a block designated as a "type 1" block (i.e. typical case).

The type 1 block begins prior to the start of interval III. Stated differently, the preamble is detected by the data recovery unit 105 during the writing operation (i.e. prior to the start of interval III). A type 2 block starts during interval III. That is, the preamble is detected after the writing operation has stopped (i.e. during interval III). Lastly, a type 3 block starts during interval IV after the writing operation has stopped. Type 2 and type 3 blocks represent typical cases when the number of bytes in the block is small. FIG. 7 illustrates the waveform for a type 2 block.

Figure 8J:
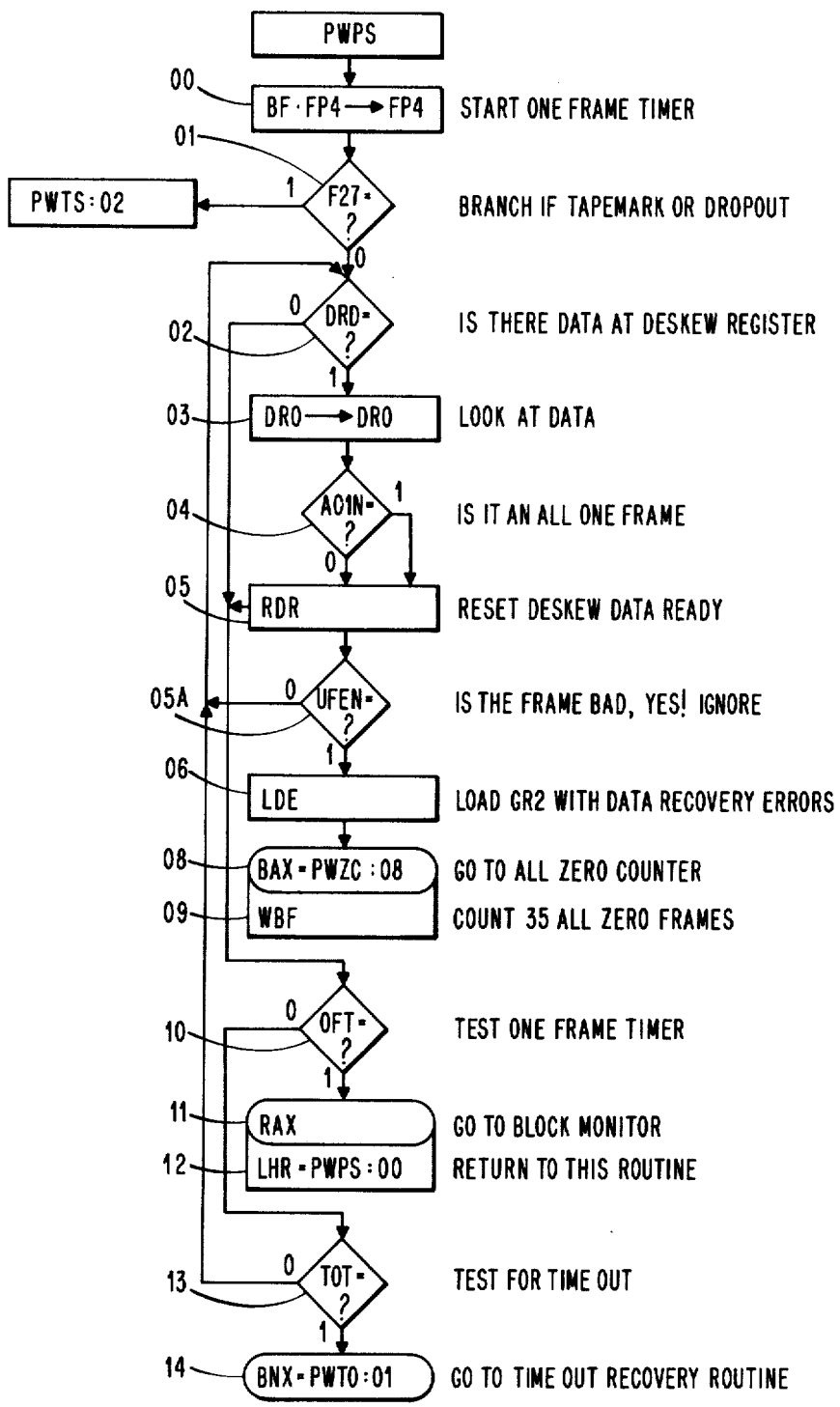
FIG. 8 illustrates in greater detail the main write routine of FIGS. 4a and 4b.

Now considering the remaining routines, write routine PWPS as seen from FIGS. 5, 6a and 8j monitors the transfer of deskewed frames from register D of FIG. 2. Initially, the routine starts the one frame timer (i.e. flip-flop HFR41) and tests the state of error flip-flop HFR27. If set to a binary ONE, the routine branches to write time sync routine PWTS as shown by FIG. 6a. Assuming that HFR27 is not set, the routine sequences to microinstruction PWPS02.

When there is a frame stored in the D register (i.e. flip-flop DRD=1), the frame is transferred to the processing unit 104 and tested to detect whether it is an all ONES frame. Microinstruction PWPS05 resets the data ready flip-flop for receipt of a next frame. Each frame is tested for errors by microinstruction PWPS05A which tests the state of the uncorrectable frame flip-flop. When the frame is an all ONES frame which tests good, the routine stops processing frames, loads general register GR2 with the state of the data recovery error indicator flip-flops and branches to the postamble zero counter routine PWZC. At the same time, microinstruction PWPS09 loads the write buffer 109 with a count of 35.

When the frame tests bad, it is ignored and the routine returns to microinstruction PWPS02. When the data ready flip-flop is not set (i.e. no frame stored) or the frame is not an all ONES frame, the routine tests the one frame timer flip-flop HFR41 via microinstruction PWPS10 and if set branches to the block monitor routine. At the same time, it loads the history register 104-17 with an address to return to this routine.

When the timer is not set, microinstruction PWPS13 tests the state of the one second timer flip-flop HFR40 for a time out. Assuming no time out, the routine returns to microinstruction PWPS02. However, a time out results in a branch to a time out recovery routine, not shown, which resets the write pulse enable flip-flop HF04 signaling the end of the write operation and the resetting of the data recovery unit 105.

Figure 8K:
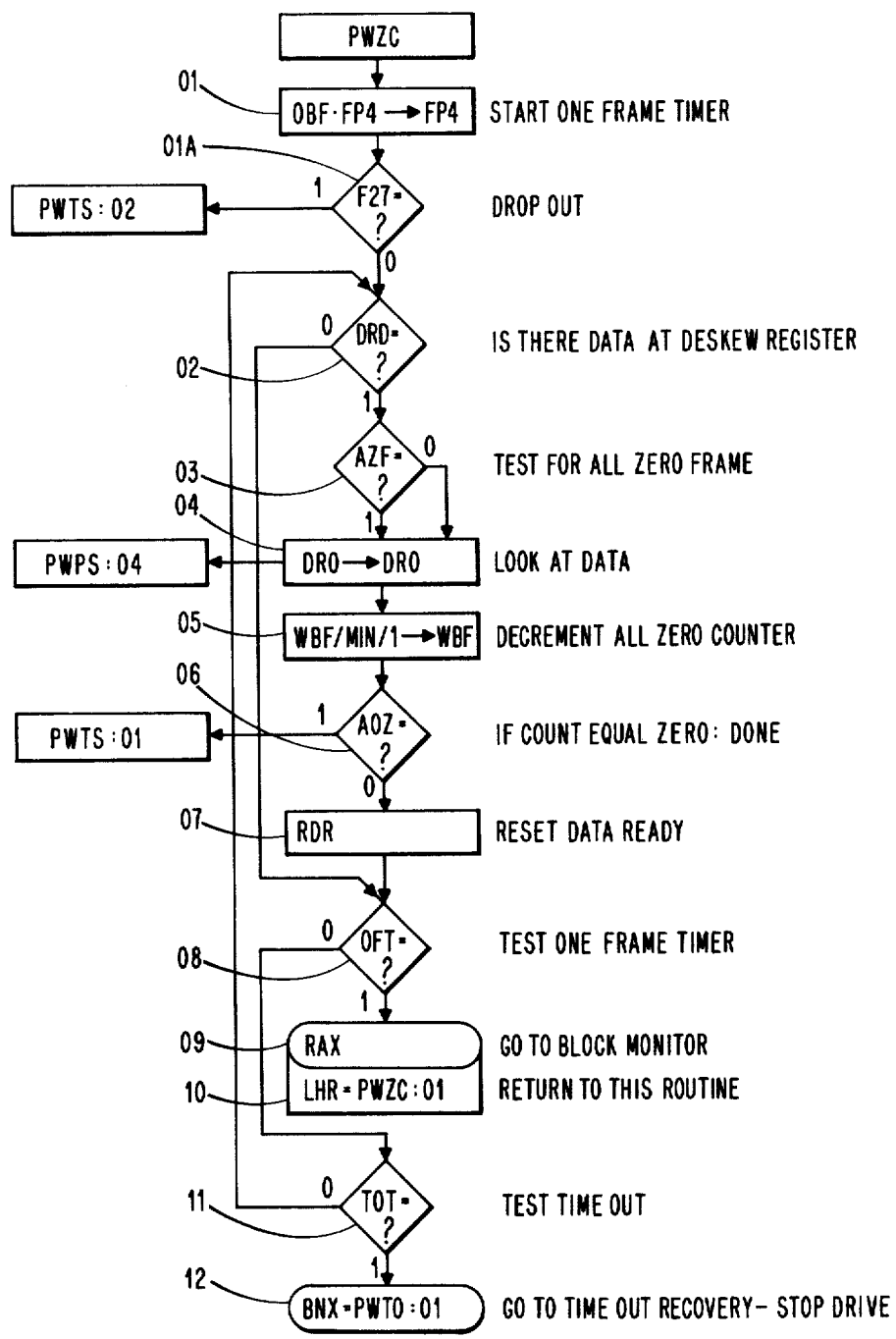
Figure 8L:
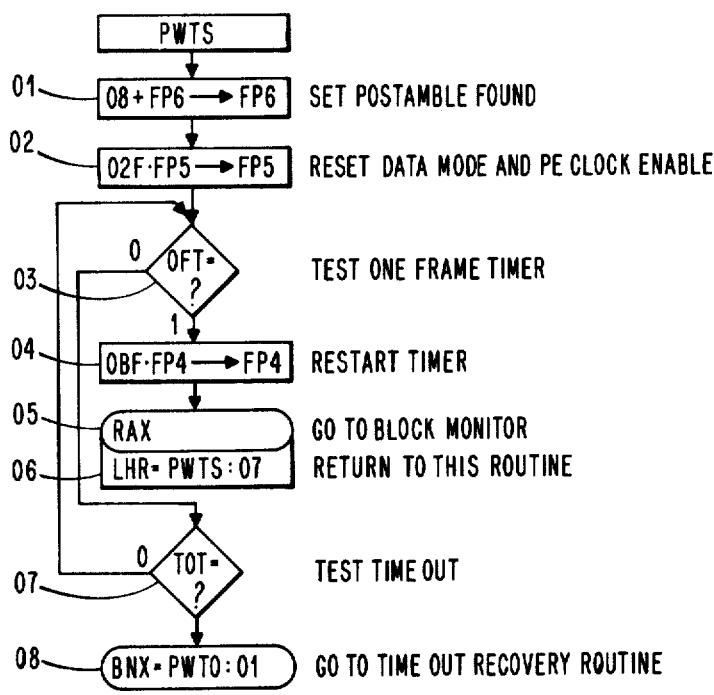

The postamble all zero counter routine PWZC shown in detail in FIG. 8k counts 35 postamble all ZERO frames via microinstruction PWZC01-PWZC05. Microinstructions PWZC06 tests for a count of 35 signaling that the end of the routine is completed. When the count stored in write buffer 107 is zero, the routine branches to routine PWTS as shown in FIGS. 6a and 8k. When the count is not zero, microinstructions PWZC07-PWZC12 perform operations similar to those described in connection with routine PWPS which either cause a branch to the block monitor routine with return to this routine or a branch to the time out recovery routine.

When the frame is not an all ZERO frame, the routine returns to the preamble search routine PWPS to look for another all ONES frame. As in routine PWPS, an error signalled by HFR27 causes a branch to routine PWTS as indicated in FIGS. 6a and 8k.

The last routine PWTS in the sequence under discussion maintains synchronization to the one frame timer flip-flop HFR41 until the write/RAW operation is completed. This routine shown in detail in FIG. 81 sets the postamble found flip-flop HFR64 to a binary ONE, resets the data mode flip-flop HFR53 and clock enable flip-flop HFR51 to binary ONES via microinstructions PWTS01-PWTS02. After testing the one frame timer flip-flop HFR41, the flip-flop is reset and the routine branches to the block monitor routine with a return to this routine as shown in FIG. 81.

As shown in FIG. 5, the same routines are executed during the processing of type 2 and type 3 blocks. However, additional routines are also executed. That is, in the case of a type 2 block, the preamble search routine PWRS of FIG. 8h is executed during time interval III. For a type 3 block, the preamble wait routine PWRS:T is executed during interval IV.

Referring to FIGS. 6a and 8i, it is seen that the preamble search routine PWRS decrements the block count stored in general register GR0 until one of the following conditions is detected by the routine:

1. flip-flop HFR27 is set to a binary ONE which causes transfer to routine PWTS;
2. the preamble is detected as signaled by the setting of flip-flop HFR63 to a binary ONE which causes a branch to the postamble search routine PWPS; or
3. the start of the block window interval IV is detected by an all zero count in general register GR0 which causes a branch to the preamble wait routine PWRS:T.

As seen from FIG. 8h when the block count tested is not zero, the routine branches to the block monitor routine and loads an address into history register 104-17 to return to this routine. The operations mentioned are carried out by microinstructions PWRS01-PWRS16 as indicated in FIG. 8h.

The preamble wait routine of FIG. 8i decrements the end of the block window count loaded into general register GR0 via microinstruction PWRST01 until one of the following conditions is detected by the routine:

1. the preamble is found as indicated by the state of flip-flop HFR63 which causes a branch to the postamble search routine PWPS;
2. flip-flop HFR27 sets to binary ONE which causes a branch to routine PWTS; or
3. the end of interval IV is detected by an all zero count in general register GR0 which causes a branch to a routine to stop the selected device.

As seen from FIG. 8i, as long as the count in general register GR0 is not ZERO, the routine continues to transfer control to the block monitor routine and a return to this routine via history register 104-17 as shown. The operations just described are carried out by the microinstructions PWPST01-PWPST14 as indicated in FIG. 8i.

Normal Block Monitor/Preamble Routines

Referring to FIG. 5, the operations carried out by the block monitor routines of FIGS. 9a-9c and 10a described previously resulted in detection of either a valid block or no block. Assuming first that a valid block has been detected by routine PWBI, the controller 100 begins execution of the preamble zero counter routine PWPR:Z of FIG. 9e. This routine is the first of two routines which check the validity of the preamble and ensures that there are at least nine preamble frames following the time of clock synchronization before the data mode flip-flop HFR53 sets. When the data mode flip-flop is set before the contents of general register GR2 decrements to zero, the routine causes flip-flop HFR27 to be set to a binary ONE signalling the occurrence of an error condition. Microinstruction PWPRZ03 tests to determine if the write operation is completed and if it is not causes a branch to the appropriate write routine with a return to the block monitor routine PWBM specified via microinstruction PWPRZ05. When the write operation is completed, the routine branches to the write routine with a return to the end of the block monitor routine PWEM specified via microinstruction PWPRZ06.

When the contents of general register GR2 decrement to zero, the routine branches to an appropriate write routine to search for the all ONES frame with a return to this routine specified by microinstruction PWPRZ15. When the count is not zero, the routine performs when possible a PSI data transfer operation which writes a byte into scratch memory 107. If the transfer is not possible (i.e. ADTN=1), then the routine branches to the appropriate write routine bypassing microinstructions PWPRZ10-PWPRZ11.

Figure 9F:
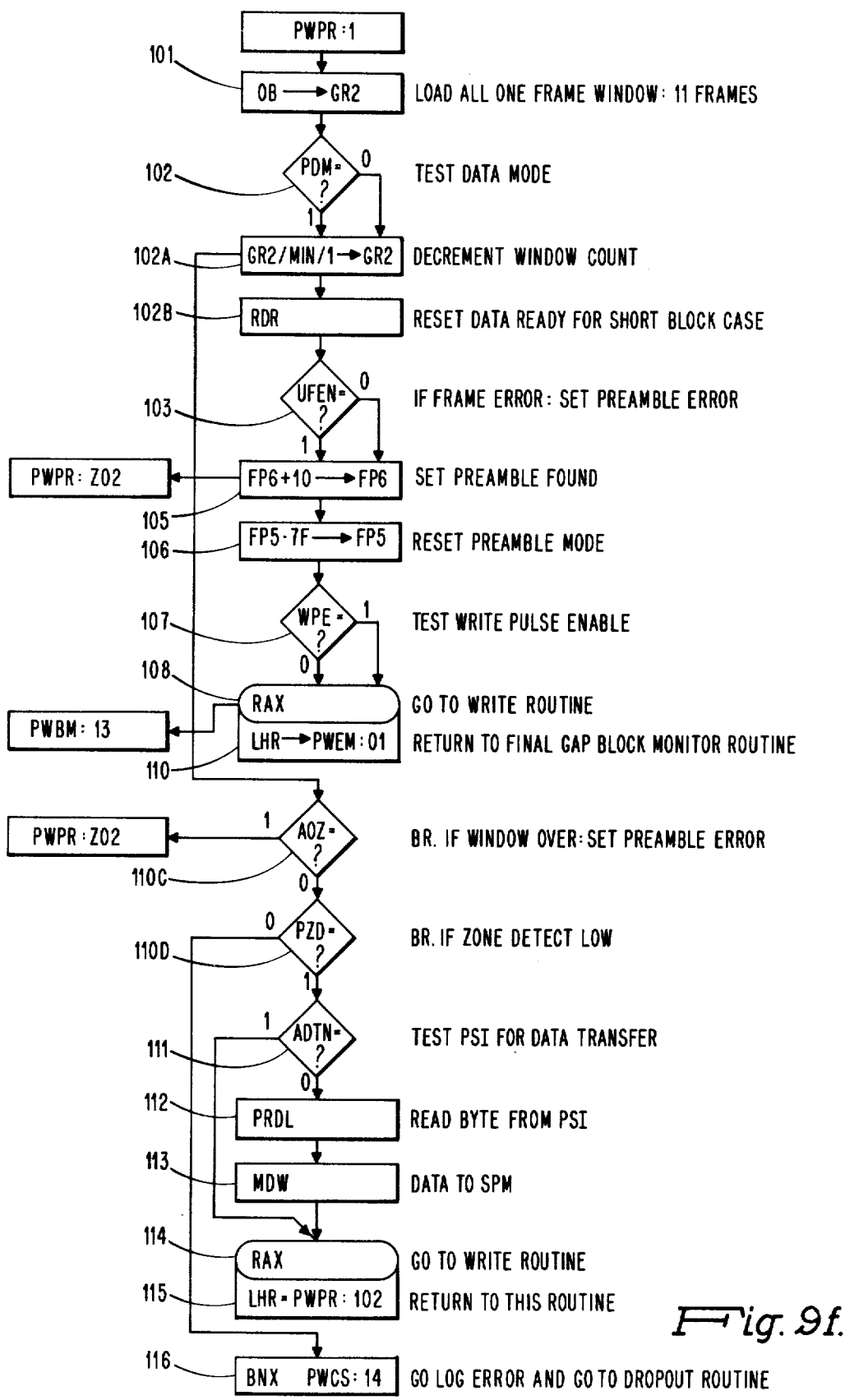

As seen from FIGS. 5 and 6b, next the controller 100 executes the preamble all ONES search routine PWPR:1 of FIG. 9f. This routine constitutes a second preamble check routine which ensures that the preamble all ONES frame sets the data mode flip-flop HFR53 to a binary ONE within 11 frame times established by loading general register GR2 via microinstruction PWPR101.

If the flip-flop HFR53 sets before the contents of general register GR2 decrements to zero and microinstruction PWPR103 detects no uncorrectable frame error (i.e. flip-flop 105-150=1), then microinstructions PWPR105 and PWPR106 set flip-flop HFR63 to a binary ONE signaling detection of the preamble and flip-flop HFR50 to a binary ZERO. If there is an uncorrectable frame error, the routine branches back to the preamble zero counter routine PWPR:Z which sets error flip-flop HFR27.

Similar to the previous routine, the state of the write pulse enable flip-flop HFR04 designates the address of which routine PWBM or PWEM to return to following branching to the appropriate write routine subsequent to resetting the preamble mode flip-flop HFR50.

When the flip-flop HFR53 is not set and the contents of general register GR2 are not zero, microinstruction PWPR110D is executed to detect for the loss of zone detector activity. If the zone detector flip-flop PZD is a binary ONE, the next microinstruction tests whether a PSI transfer can be carried out before branching to the appropriate write routine. If the zone detector flip-flop is a binary ZERO indicative of a frame drop out, the routine branches to routine PWCS which sets flip-flop HFR27 to a binary ONE and causes a branch to the appropriate write routine with a return to either routine PWDC:B or PWDC:E in accordance with the state of write pulse enable flip-flop HFR04.

Figure 9G:
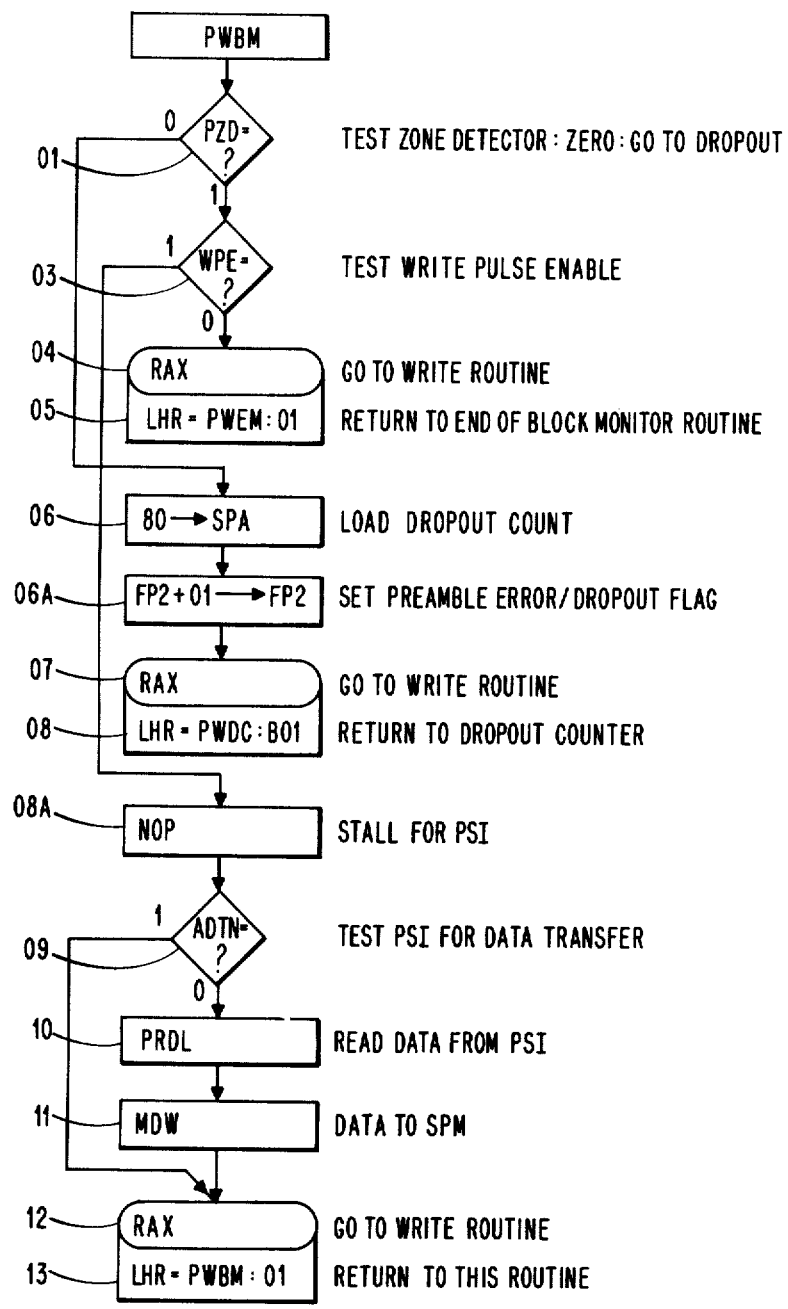

As seen from FIG. 6b, the controller 100 then executes the block monitor routine PWBM of FIG. 9g. This routine monitors the envelope of the block while writing is taking place. That is, the routine via microinstruction PWBM01 tests the state of the block detector flip-flop 105-88 of FIG. 3a and when it resets indicative of a dropout, microinstruction PWBM06 loads a count of 80 into the scratch pad address. The next microinstruction sets flip-flop HFR27 and the routine branches to the appropriate write routine concurrent with loading the return address of dropout routine PWDC:B. As explained herein, routine PWDC:B begins monitoring the length of the dropout condition.

When the block detector flip-flop 105-88 is a binary ONE, the next microinstruction tests the state of write pulse enable flip-flop HFR04. If it is a binary ONE, the routine determines whether it can perform a PSI byte transfer in the manner previously described. Following execution of microinstructions PWBM08A-PWBM11, the routine branches to the appropriate write routine concurrent with loading the return address of this routine.

Figure 9H:
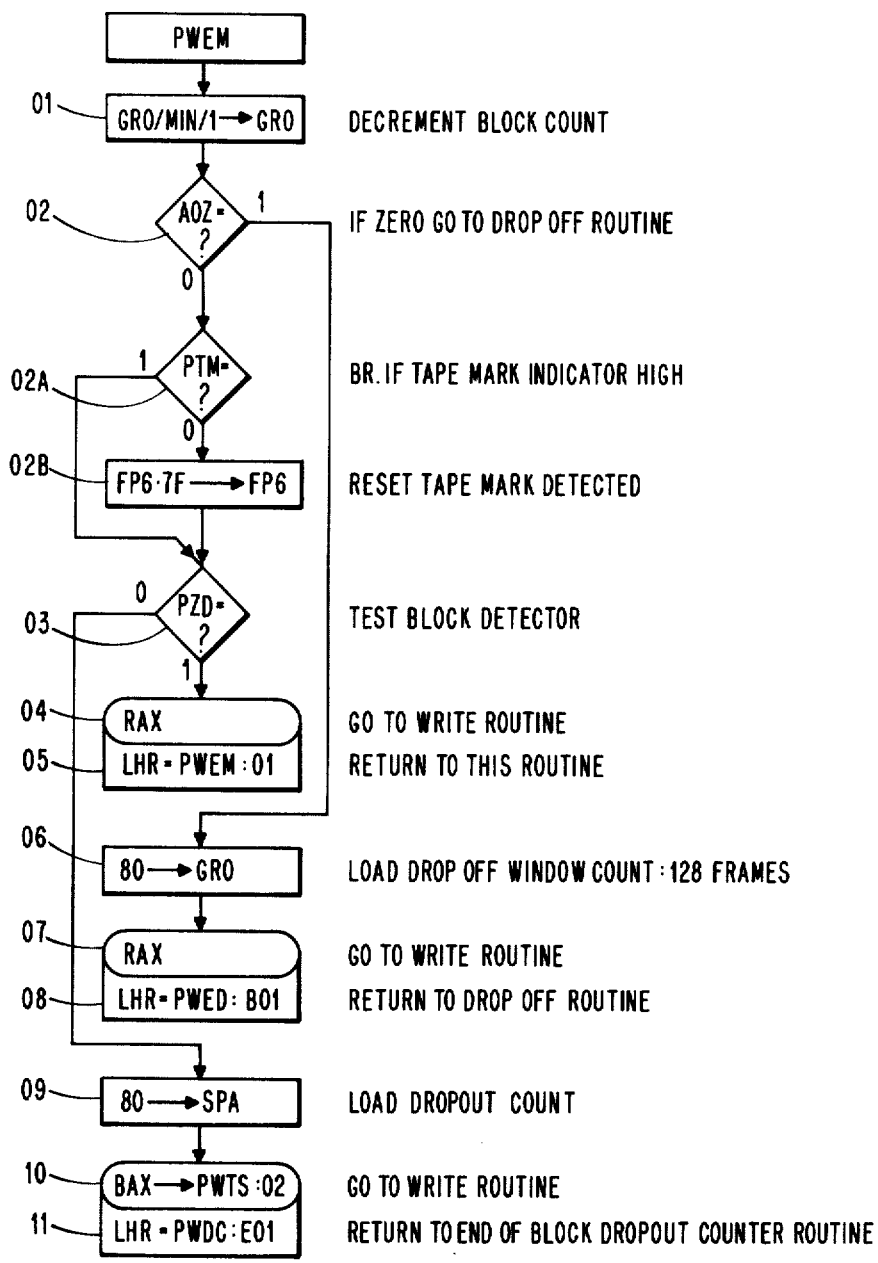

Assuming no dropout, next the end of block monitor routine of FIG. 9h is executed as shown in FIG. 6b. This routine performs operations similar to those performed by routine PWBM except that it does not provide for a PSI data transfer and includes microinstructions for decrementing the interval III count stored in general register GR0 and testing it for zero. In this manner, the routine continues monitoring the envelope of the block during the final head delay interval. The routine via microinstruction PWEM02A tests the state of the tap mark indicator flip-flop 105-84 of FIG. 3a and resets flip-flop HFR60 when the flip-flop 105-84 resets.

As seen from FIG. 9h, when the block count decrements to zero indicative of the end of interval III, microinstruction PWEM06 loads another drop off window count into general register GR0 and then the routine returns to the appropriate write routine concurrent with loading the return address of the next routine PWED:B. If the block detector flip-flop 105-88 of FIG. 3a resets, the microinstructions PWEM09-PWEM11 load the dropout count into the scratch pad address register and branch to the appropriate write routine concurrent with loading the return address of routine PWDC:E as shown in FIG. 9h.

Figure 9I:
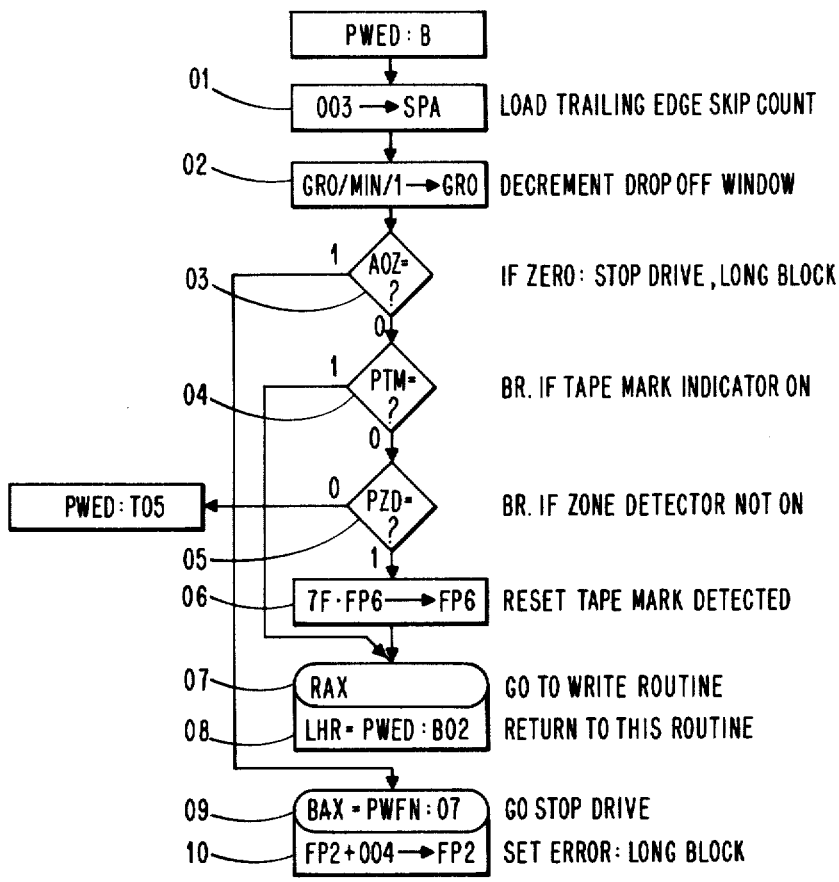
Figure 9J:
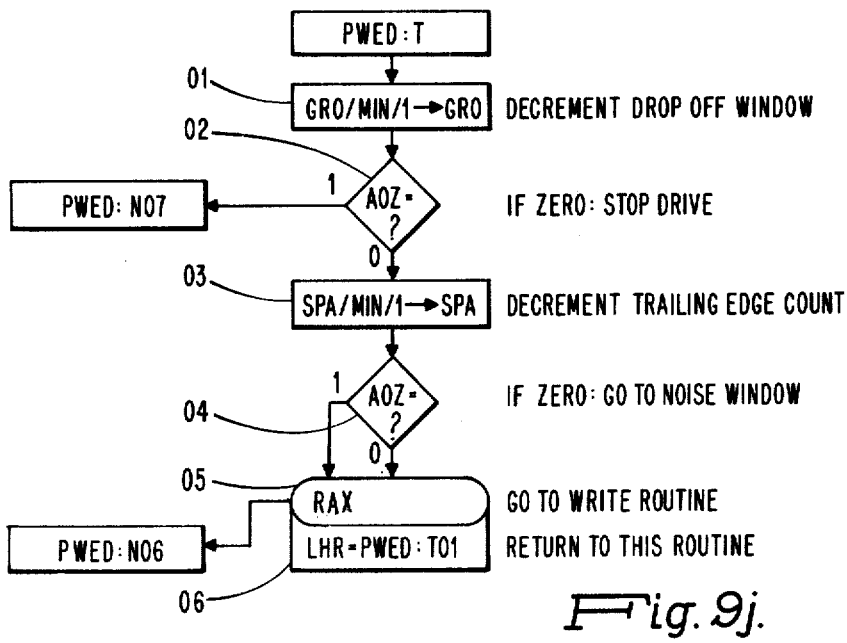

As seen from FIG. 6b, next the controller 100 begins executing the end of block drop off window routine PWED:B of FIG. 9i. This routine checks that the block drops out during the drop off window interval which corresponds to a distance of 0.08 inch from the end of the final head delay interval as shown in FIG. 7. The routine also monitors the state of the tape mark indicator flip-flop 105-84 of FIG. 3a.

When the block does not dropoff as signaled when the count stored in general register GR0 decrements to zero indicative of the end of interval IV, the routine branches to a stop drive concurrent with setting long block flip-flop HFR25 to a binary ONE. Also, the routine branches to routine PWED:T when the zone detector flip-flop 105-85 resets if the drop off window count is not zero. If the flip-flop remains set, the routine branches to the appropriate write routine concurrent with loading the return address of this routine.

Next, routine PWED:T is executed which counts out a three frame skip to eliminate the effects of possible noise occurring during the fall off or drop of the block. As seen from FIG. 9j, a first microinstruction of the routine decrements the drop off window count in general register zero and when zero microinstruction PWEDT02 causes a branch to the end of block noise check routine PWED which stops the tape device. If not zero, microinstruction PWEDT03 decrements by one the skip count stored in the scratch pad address register. When this count is zero, the routine branches to the appropriate write routine concurrent with loading the return address of routine PWED:N. If the count is not zero, the return address of this routine replaces the address of routine PWED:N.

The last routine executed in this sequence of routines is PWED:N shown in FIG. 9k. This routine monitors the remainder of the block drop off window interval for noise. Similar to the previous routines, when the drop off count in general register GR0 decrements to zero, a branch is made to stop the tape device. Also, microinstruction PWEDN03 tests the state of the zone detector flip-flop 105-85 and if it resets, the routine sets flip-flop HFR26 to a binary ONE indicating noise via microinstruction PWEDN04. In the event of no noise during this interval, the routine branches to the appropriate write routine concurrent with loading the return address of this routine into history register 104-17.

As seen from FIG. 5, the routines just described are executed when processing a normal block of information. However, the next group of routines are executed when the controller detects an abnormal block. As mentioned, control is passed to these routines when a dropout was detected.

A first of these routines is the dropout counter block monitor routine PWDC:B of FIG. 10b. This routine measures the length of dropout by testing the state of the zone detector flip-flop 105-82 of FIG. 3a. First, the routine tests the state of write pulse enable flip-flop HFR04 to determine whether to branch to dropout routine PWDC:E. If the flip-flop HFR04 is a binary ONE, after decrementing by one, the dropout count previously loaded into the scratch pad address register is tested for zero. If zero, microinstruction PWDC:B sets the short block flip-flop HFR24 to a binary ONE and the routine branches to an appropriate write routine concurrent with loading the return address of multiple block routine PWDC:BM.

When the dropout count is not zero, the routine determines whether it can perform a PSI transfer in the manner explained previously and then tests the state of the zone detector flip-flop 105-82. If it is a binary ONE, the routine branches to the appropriate write routine concurrent with loading the return address of routine PWBM as shown. If ZERO, the return address of this routine replaces the address of routine PWBM.

From FIG. 6b, it is seen that upon the completion of writing, routine PWDC:E is executed. Referring to FIG. 10c, it is seen that this routine also monitors the dropout of the zone detector flip-flop 105-82 of FIG. 3a. A first microinstruction of the routine decrements the dropout count and the count is tested for zero. If the dropout count is zero, microinstruction PWDCE08 sets the short block flip-flop HFR24 to a binary ONE and then branches to the write routine concurrent with loading the return address of routine PWDC:EM. If the count is not zero, the routine branches to routine PWDC:EM.

A next microinstruction decrements by one the interval III count and tested for zero. If zero, indicative of the end of interval III, the routine branches to the dropout trailing edge routine PWDC:EE concurrent with loading a constant into general register GR0.

When the block count is not zero, the routine tests the zone detector flip-flop 105-82 and if a binary ONE, the routine branches to an appropriate write routine concurrent with loading the return address of routine PWEM. When the detector flip-flop is a binary ZERO, the return address of this routine replaces the return address of routine PWEM as shown in FIG. 10c.

Referring to FIG. 6b, it is seen that routine PWDC:B also passes control to routine PWDC:BM of FIG. 10d when the zone detector flip-flop has remained reset for an interval of 80 frame times (i.e. dropout count = 0). This routine checks for possible multiple blocks by testing the state of zone detector flip-flop 105-82 of FIG. 3a. If the flip-flop remains a binary ZERO and the write operation is continuing (i.e. flip-flop HFR04=1), the routine determines whether it can perform a PSI byte transfer. Thereafter, the routine branches to the appropriate write routine concurrent with loading the return address of this routine. If the write operation is completed, the routine branches to routine PWDC:EM.

If the zone detector flip-flop should switch to a binary ONE, microinstruction PWDCBM02 resets the short block flip-flop HFR24 and the next microinstruction sets the multiple block flip-flop HFR21. Thereafter, the routine branches to the appropriate write routine concurrent with loading the return address of the block monitor routine PWBM.

Assuming that the zone detector flip-flop remains reset and that the write operation is completed, the controller begins execution of the multiple block monitor routine PWDC:EM shown in FIG. 10e. This routine checks for the occurrence of possible multiple blocks during the final head delay interval. If the zone detector flip-flop does not set prior to the completion of the interval, the routine branches to routine PWFN.

From FIG. 10e, it is seen that the first microinstruction in the routine tests the state of the zone detector flip-flop and the next decrements by one the block count stored in general register GR0. If the count is zero indicating the end of interval III, the routine loads a noise window count into general register GR0, sets the short block flip-flop HFR24 to a binary ONE and branches to the appropriate write routine concurrent with loading the return address of routine PWFN. If the count is not zero, the routine loads the return address of this routine instead of the return address of routine PWFN.

Where the zone detector flip-flop switches to a binary ONE and the count is zero, the routine resets short block flip-flop HFR24, sets multiple block flip-flop HFR24, loads a noise window count into general register GR0 and branches to the appropriate write routine concurrent with loading the return address of routine PWED:B into history register 104-17. When the count is not zero, the return address of routine PWEM replaces the address of routine PWED:B as shown in FIG. 10e.

From FIG. 6b, it is seen that routine PWDC:EE is executed following routine PWDC:E. The routine PWDC:EE continues monitoring the occurrence of a drop in the block envelope which was detected prior to the start of the block dropoff window interval. When the routine detects that the dropout exceeds an interval corresponding to a distance of 0.08 inch, the routine passes control to the dropoff window multiple block monitor routine PWFN.

Figure 10F:
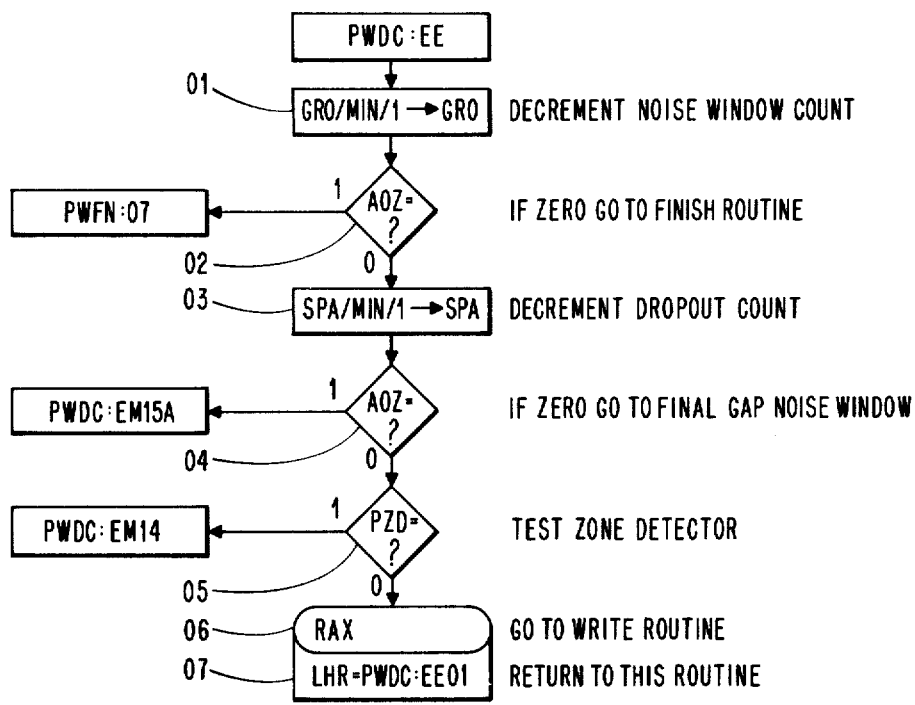

Referring to FIG. 10f, it is seen that the first microinstruction decrements by one the noise window count stored in general register GR0 and the next microinstruction tests this count for zero. If zero, the routine branches to routine PWFN. If not zero, the routine decrements by one the dropout count and tests it for zero. If the count is zero, the routine branches a final routine PWDC as shown. If the count is not zero, the routine tests the state of zone detector flip-flop 105-82. If the zone detector flip-flop is a binary ONE, the routine branches to an appropriate write routine concurrent with loading the return address of routine PWED:B. If the flip-flop is still a binary ZERO, the return address of this routine replaces the address of routine PWED:B.

Figure 10G:
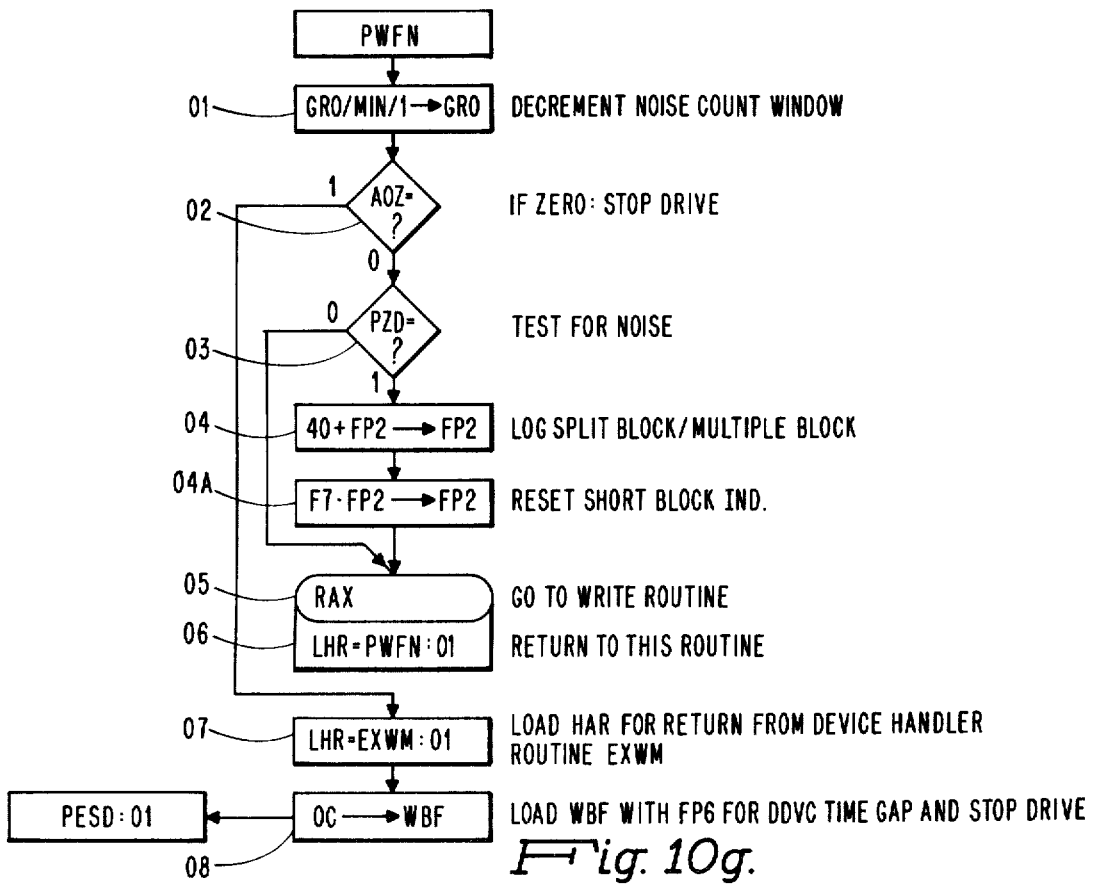
Figure 11:
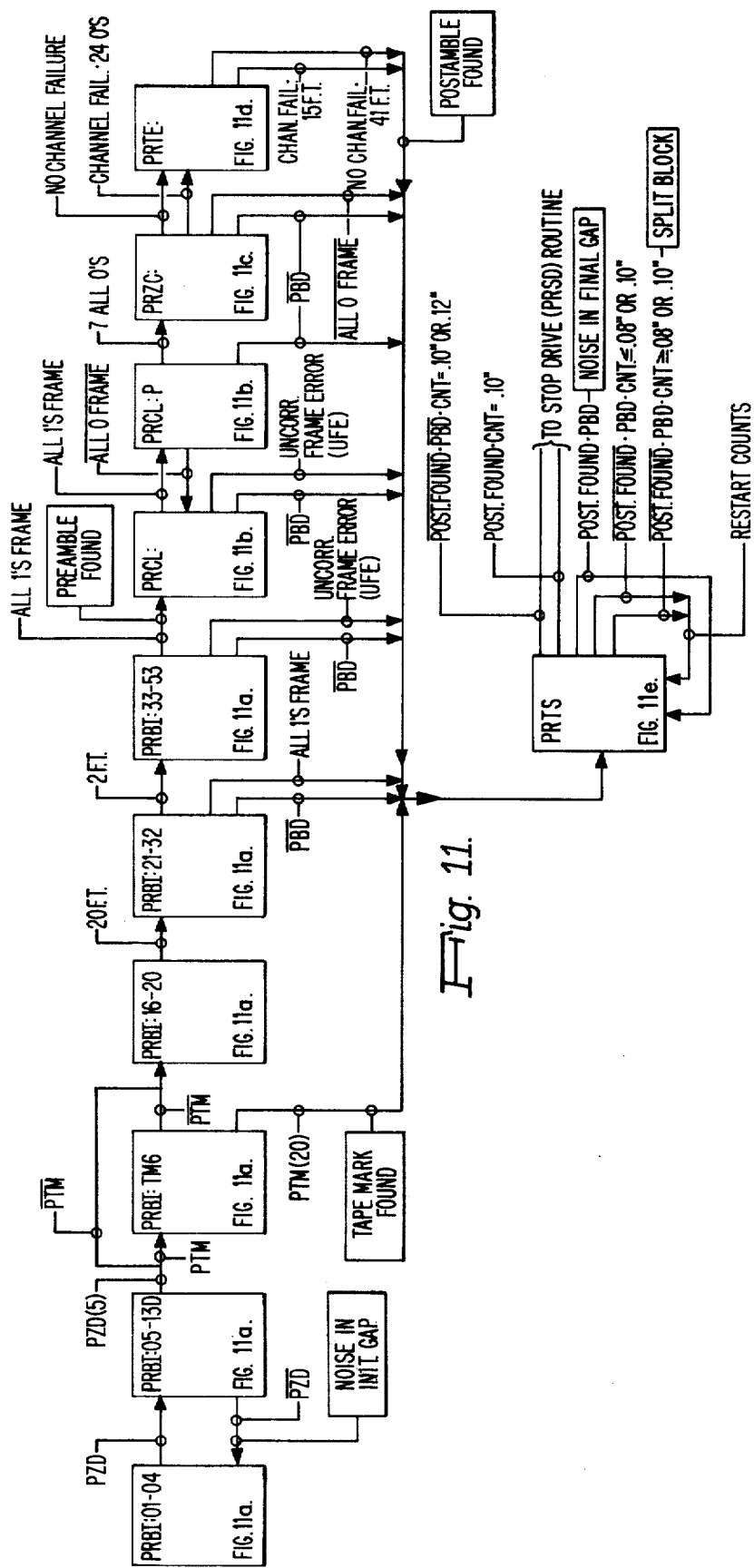
FIG. 11 illustrates the different phase encoded read routines of FIGS. 4a and 4b.

The last routine executed in this sequence is PWFN. This routine monitors the block dropoff window interval following detection of a multiple block. If the window count decrements to zero, the tape device is signaled to stop. Referring to FIG. 10g, it is seen that the first microinstruction in the routine decrements by one the count in general register GR0. If the count is zero, the routine loads the history register with the return address of routine EXWM:SA as shown and the write buffer 107 with information. Thereafter, the routine sequences to the stop drive routine PESD.

If the count is not zero, the zone detector flip-flop is tested. If the flip-flop switches to a binary ONE, the routine switches the multiple block flip-flop HFR21 to a binary ONE and resets the short block flip-flop HFR24 to a binary ZERO. Thereafter, the routine branches to an appropriate write routine concurrent with loading the return address of this routine. If the zone detector flip-flop remains a binary ZERO, the routine immediately branches to the appropriate write routine as shown in FIG. 11g.

Read Operation

The main or executive read routines are shown in FIG. 13. A first microinstruction of these routines loads the operating flags, shown below, which control the setting of parameters during the execution of critical routines. A retry consists of a space followed by a write operation or space followed by a read operation. It will be appreciated as explained herein that the space operation is performed differently than the normal space. For a write retry, the read, reverse, space, retry and write retry bit positions of the TS1 in scratch pad memory 107 are set to binary ONES. This is accomplished by microinstruction EXRMRT21 which loads an "E5" into the write buffer 107 and the routine branches to microinstruction EXRMRT14.

The bit positions of TS1 for the execution of a read or space operations are designated as follows:
  bit 0 = read;
  bit 1 = reverse;
  bit 2 = space;
  bit 3 = tape mark;
  bit 4 = low threshold;
  bit 5 = retry;
  bit 6 = bootload; and,
  bit 7 = write retry.

For a normal read forward operation, the controller loads a cod of "80" into the write buffer 109 while for a backspace into the tapemark operation, the controller loads a code of "F0" into the write buffer 109. For read operations, the operation phase bits discussed above are coded as:
  000 = read;
  011 = space: retry; and,
  001 = read: retry.

As seen from FIG. 13, in the case of a read retry operation, the controller must determine the direction of the operation (i.e. forward or backspace) before it can load the correct value into the write buffer 107. The direction for a write retry is always a backspace. Therefore, based upon the state of a direction bit in byte DSSB1, either a "0A4" or a "0E4" is loaded into write buffer 107.

For a retry space operation, the routine masks out the old phase bits in DSB8 and inserts the bit that indicates a space (i.e. op phase code "011"). The routine then stores the operating flags in TS1 and then branches to the activate device segment routine EXRM:AD of FIG. 15. A normal read or space operation sets the op phase code to "00X" where position "X" remains at its previous value.

The routine EXRM:AD sends a string of command bytes to the selected device necessary to perform a read operation. It also checks for device errors in the handling of the command bytes. This routine sequences to a hardware setup routine EXRM:HS which sets up the states of the registers HFR0-HFR5. Similar to the write routine, a routine EXRM:PS sets up the PSI control 102 for a transfer operation in the case of a read operation (i.e. no transfer for space). Next, device constants are generated by routine EXRM:DC and thereafter the main read routine waits for DOS and branches to a first of the phase encoded read routines (i.e. routine PRBI).

FIG. 9 illustrates the different phase encoded read routines which handle the read operation. In a fashion similar to the monitoring operations performed during the write operation, this routine monitors the envelope of the block during the backstage operation to establish a "profile" of the block which is used in determining whether to abort the read or retry operation.

The following PE read error/status are used:
  HFR20 = NOISE BEFORE BLOCK;
  HFR21 = 0
  HFR22 = NOISE AFTER BLOCK;
  HFR23 = SPLIT BLOCK;
  HFR24 = 0
  HFR25 = 0
  HFR26 = 0
  HFR27 = TAPE MARK DETECTED.

Referring to FIG. 9, it is seen that there are 6 main read routines: (1) the PRBI routine which performs the initial gap noise checking and processes preamble and marker frames; (2) the PRCL routine which handles the data transfer during the data segment of a block, monitors the block detector and checks for uncorrectable frame parity on data bytes; (3) routine PRCL:P which performs postamble recognition of an all ONES frame followed by 7 all ZERO frames; (4) routine PRPZ which performs additional postamble recognition when the data recovery unit 105 detects a failure; (5) routine PRTE which counts frame times to place the tape drive head in the gap when a postamble has been recognized; and (6) routine PRTS which monitors a distance of 0.1 inch for noise when the postamble has been detected or looks for 0.1 inch of gap to stop the tape device.

With reference to the waveforms of FIG. 7b, the manner in which controller 100 executes the routines of FIG. 9 will now be described. Referring to FIG. 7b, the waveform labeled DOS corresponds to the state of a delay operation start (DOS) signal generated by the tape device signaling that the device has reached its correct speed. The other waveform corresponds to the profile of the block read by the device read head during the backspace operation. It is seen that the read block waveform include two intervals, an initial gap interval I and a final gap interval II. The initial gap interval I begins at the time the tape device signals that it is up to speed (i.e. leading edge of DOS waveform) and ends at the start of the block (i.e. leading edge). The final gap interval II corresponds to the following:

1. for a normal or space operation with no error it equals a distance of 0.1 inch following the end of the postamble;
2. for a normal read or space operation with error it equals a distance of 0.1 inch of dropout where the zone detector flip-flop is reset (PZD=0); and
3. if a retry space operation, it equals a distance of 0.12 inch of dropout where the zone detector flip-flop is reset (PZD=0).

For retry space operations, because of the tape device speed variations, the 0.08 inch established as the dropout distance is increased to 0.1 inch and the 0.1 inch dropout requirement for clean or noise free interval is increased to 0.12 inch. The 0.12 inch requirement enables the controller 100 to have the tape device space across a block having up to an 0.08 inch hole or damage area.

It is seen from FIG. 9 that the controller 100 first executes the PE block initiation routine of FIG. 11a. This routine waits for the beginning of a valid block which is defined as mentioned previously as 5 consecutive frames being detected by the zone detector. Activity less than 5 frames causes the routine to set noise in initial gap flip-flop HFR20. It is seen from FIG. 11a that this routine performs operations quite similar to those performed by the read after write routines of FIG. 6b and hence this routine as well as the other routines will only be discussed to the extent necessary for a complete understanding of the present invention.

The routine tests zone detector flip-flop 105-82 and when a binary ONE, the routine resets the one frame timer flip-flop HFR41 and transfers a frame count to general register GR0. The routine again tests the zone detector flip-flop and when a binary ONE, it decrements the frame count by 1. When the count decrements to zero, and the tape mark flip-flop HFR33 is not set, the controller sends a set low threshold command to the tape device to establish a low threshold in the tape drive sense amp circuits.

The routine next starts the PE clock circuits by setting clock enable flip-flop HFR51 to a binary ONE. Next a sync count having a value of hexidecimal 14 is loaded into general register GR0. The tape mark flip-flop HFR33 is tested and if set, the routine decrements the sync count until it is zero. This signals the detection of a tape mark which causes the routine to reset flip-flop HFR41 to a binary ONE and branch to time stop routine PRTS concurrent with the setting of the tape mark detected flip-flop HFR27.

When the zone detector flip-flop resets to zero before 7 frame times, the routine resets one frame timer flip-flop HFR41 to a binary ZERO and branches to the beginning of the routine concurrent with setting noise flip-flop HFR22 to a binary ONE.

When the tape mark flip-flop does not remain a binary ONE for 20 frames, the routine continues decrementing the sync count stored in general register GR0 in response to signals from the one frame timer flip-flop HFR41 completing the synchronization of the clock circuits. When the sync count decrements to zero, the routine resets the one frame timer flip-flop HFR41 and sets the preamble mode flip-flop HFR50 to a binary ONE and counts out two additional frame times for proper clock circuit phasing.

The routine next tests the state of block detector flip-flop 105-88 and if set, decrements the count by one until it is zero. The routine again resets flip-flop HFR41 and tests the block detector flip-flop 105-88. If the flip-flop is still set, the routine tests the first frame stored in the D register for an uncorrectable frame error (i.e. all ONES frame). All ZERO frames are not stored. If no uncorrectable error, the routine sets preamble found flip-flop HFR63 to a binary ONE and resets preamble mode flip-flop HFR50 to a binary ZERO. The routine then resets the data ready flip-flop.

As seen from FIG. 9, the controller upon detecting the preamble begins execution of the PE read critical routine PRCL of FIG. 11b. As seen from FIG. 11b, this routine tests the block detector flip-flop 105-88 for continuity and when set to a binary ONE, the routine resets the one frame timer flip-flop HFR41 to a binary ONE. When it can perform a PSI cycle, the routine transfers a data byte to the PSI register 102 and then tests the data ready flip-flop 105-130 of FIG. 3c to determine when a frame stored in the D register of the data recovery unit 105 can be stored in scratch pad memory 107 via general register GR0. After transfer, the routine stores the states of the data recovery error indicators and tests the state of the uncorrectable error flip-flop. When a binary ZERO indicating no frame error, the routine tests for an all ONES frame. Upon detecting the all ONES frame indicative of the postamble, the routine loads a count of 7. When the allow data transfer signal is a binary ONE, the routine then executes a PSI cycle of operation followed by testing a frame stored in the D register. If the frame is not an all ZERO frame, the routine branches to PRCL11 to check it for an all ONES frame. When the frame is an all ZEROS frame, the routine decrements the all zero count in the write buffer 107. When the count reaches zero, the routine branches to the postamble zero counter routine PRPZ. If the count is not zero, a PSI cycle of operation is performed if possible and the routine branches to test again for the transfer. If no PSI transfer is allowed, the routine tests the block detector flip-flop. If still a binary ONE and no time out, the routine again sets the one frame timer flip-flop HFR43 and begins testing the next frame until the postamble zero count reaches zero.

As seen from FIG. 9, the postamble zero counter routine PRPZ of FIG. 11c is begun following the detection of all ZERO frames. This routine counts 24 all zero frames to ensure that a valid postamble has been detected when a single channel correction has been taken place (i.e. a single channel failure has been detected).

Referring to FIG. 11c, it is seen that the routine tests the state of channel failure indicator flip-flop 105-176 of FIG. 3c. When the flip-flop is set to a binary ONE, the routine loads a count into general register GR0 and sets flip-flop HFR43. The routine tests the block detector flip-flop 105-88 to monitor the block for continuity and decrements the count by one for each all ZERO frame detected. When the count decrements to zero, the routine branches to the trailing edge skip routine PRTE of FIG. 11d. If not zero, the routine resets the data ready flip-flop 105 and begins repeating execution of the routine.

The controller 100 next begins executing routine PRTE. This routine counts 41 frame times or 15 frame times in the case of a single failure to place the write head in the final gap. The routine loads the count into general register GR0, resets the flip-flops HFR53 and HFR51, branches to reset the low threshold and synchronize to the one frame timer flip-flop HFR43 and decrements the count by ONE. The routine continues decrementing the count until it is zero at which time the routine sets the postamble found flip-flop HFR65.

Following execution of routine PRTE, the controller 100 begins execution of the time stop routine PRTS of FIG. 11e. This routine monitors the block and gap interval before stopping the tape device. If postamble flip-flop HFR65 is set to a binary ONE, the routine assumes that it is in the gap interval and monitors for noise for an interval equal to 0.1 inch. If no postamble has been found, the routine looks for 0.1 inch of clean gap before stopping the device. In the case of a retry, the routine uses the extended values (i.e. split block = 0.10 inch, stop gap time = 0.12 inch and gap monitor time = none).

Referring to FIG. 11e, it is seen that the routine first tests the state of the retry bit 5 of the TSI byte. When there is no retry in progress, the routine resets the clock enable flip-flop HFR51 to a binary ZERO and loads a count equivalent to 0.08 inch into general register GR0 and following a threshold routine decrements by one the count in general register GR0. If a retry space is in progress, the routine performs the same operations as above but loads a count equivalent to 0.10 inch into general register GR0. If the count has decremented to zero, the routine resets the one frame timer flip-flop HFR43 and tests the state of the end of gap flip-flop HFR67. If set, the routine branches to the read stop drive routine. When HFR67 is not set, the routine loads a last segment count (equivalent to 0.02 inch) into general register GR0, sets HFR67 to a binary ONE and branches to microinstructions which monitor the gap for noise when the routine detects that the postamble has been detected (HFR65=1). That is, the routine tests the state of the block detector flip-flop 105-88 and when it sets to a binary ONE, this causes the routine to set noise flip-flop HFR22 to a binary ONE and branch to continue the count.

Where the postamble is not detected, the routine extends the stop interval by again starting the routine. When flip-flop HFR67 is detected to have been previously set to a binary ONE, the routine resets the flip-flop and then sets the multiple block flip-flop HFR23 before branching to start again the routine. When the flip-flop is reset to a binary ZERO, the routine restarts the interval without setting the multiple block flip-flop.

Upon completion of routines PRTS (i.e. end of gap interval), the controller signals the stopping of the drive and then returns to the read status analysis routine EXRM:PA.

General Status Analysis

It is necessary that the controller 100 is operative to analyze the states of the block detector error indicators in order to determine whether to abort or retry the operation just completed. Stated differently, the routine performs status analysis for the operation just completed. When certain indicators have been set in register HFR2, the controller is operative to cause an abort of the operation. Other ones of the indicators set in register HFR2 cause the controller to inhibit retry as explained herein. In the case of a read operation, however, it should be appreciated that the fact that an operation is not retryable does not mean that the block contains errors. In all normal read and write operations, the controller using the recovery error indicators included in recovery unit 105 monitors each frame for errors.

In the case of a write operation, when none of the write conditions are set and there was a data error, the controller will initiate a retry operation. Also, if no data errors are detected and some of the conditions are set, the controller still will retry the operation. Thus for a write operation, all the conditions are viewed as errors and only some inhibit retry. For a read operation, the indicators define the existence of certain conditions, some of which inhibit retry.

Write Status Analysis

Referring to FIG. 4, it is seen that following completion of the execution of the read after write routines of FIGS. 9a-10g, the controller tests the results for errors. It will be noted that before branching to the stop drive routine, the final noise routine PWFN loads the history register 104-17 with the return address of the write status analysis routine EXWM:SA shown in FIG. 8.

The routine EXWM:SA forms part of the main or executive write routine and processes the results of a write operation. Referring to FIG. 8, it is seen that microinstructions EXWMSA01-EXWMSA04 clear the working registers used by the routine (i.e. write buffer 102 and general registers GR0-GR2). The termination type byte TT is also stored in write buffer 107.

The next group of microinstructions EXWMSA05-EXWMSA07 performs operations necessary to update the block detector errors stored in register HFR2 (DSB6). These are as follows:

| HFR2: | BLOCK DETECTOR ERRORS/ILLEGAL DATA |
|---|---|
| HFR20: | NO BLOCK DETECTED |
| HFR21: | MULTIPLE BLOCKS DETECTED |
| HFR22: | GAP CHECK BEFORE BLOCK |
| HFR23: | LATE BLOCK |
| HFR24: | SHORT BLOCK |
| HFR25: | LONG BLOCK |
| HFR26: | GAP CHECK AFTER BLOCK |
| HFR27: | ILLEGAL DATA (NRZI ONLY) |

EXWMSA08 tests the contents of general register GR0 following the masking out of bit position 7 which is used for NRZI only. If the test results are zero, indicating no errors, the routine branches to microinstruction EXWMSA15 to update other status bytes following microinstruction EXWMSA09. When the tested results are not zero, the routine sequences to microinstruction EXWMSA09X which masks out the contents of general register GR0 for testing the high order three bit positions to establish whether the error condition is retryable. The result is tested for zero by microinstruction EXWMSA09.

When the result tested is not zero, this signals that one of the nonretryable error positions is set. Following the setting the bit 0 of terminate type byte, stored in write buffer 107, to a binary ONE indicating that the error is software recoverable (ASR), the routine executes microinstruction EXWMSA10X which resets bit position 7 of the write buffer 107 to a binary ZERO. This bit position stores the retryable bit which had been previously set to a binary ONE by the main routine prior to performing the operation. When the tested results are zero indicating that the write operation was executed in a normal fashion, the retryable bit remains set.

The remaining microinstructions EXWMSA11-EXWMSA24 check to determine if any other errors were detected and these errors are stored in the different ones of the general registers GR0-GR1. The routine then branches to a status routine for checking the status of the device concurrent with loading the return address of routine TDSA:START of FIG. 12.

Read Status Analysis

The status analysis routine EXRM:PA also one of the main read routines, is also shown in detail in FIG. 13. The routine makes use of the following status in registers HFR2, TS2 and TS3.

| HFR2: | BLOCK DETECTOR ERRORS/ TAPE MARK |
|---|---|
| HFR20: | NOISE BEFORE BLOCK |
| HFR21: | MBZ (must be zero) |
| HFR22: | NOISE AFTER BLOCK |
| HFR23: | SPLIT BLOCK |
| HFR24: | MBZ (must be zero) |
| HFR25: | RFU |
| HFR26: | RFU |
| HFR27: | TAPE MARK DETECTED |
| Temporary Storage 2 Scratch pad memory location 032 | DATA RECOVERY ERRORS |
| Bit 0: | PE CLOCK ERROR |

-continued

| | |
|---|---|
| Bit 1: | MULTIPLE DROP BIT |
| Bit 2: | UNCORRECTABLE PARITY ERROR |
| Bit 3: | RFU |
| Bit 4: | RFU |
| Bit 5: | RFU |
| Bit 6: | PE OVERSKEW |
| Bit 7: | ANY DROP BIT |
| Temporary Storage 3 Scratch pad memory location 033 | PE SPECIFIC ERRORS |
| Bit 0: | RFU |
| Bit 1: | RFU |
| Bit 2: | RFU |
| Bit 3: | PREAMBLE DETECTED |
| Bit 4: | RFU |
| Bit 5: | POSTAMBLE DETECTED |
| Bit 6: | RFU |
| Bit 7: | RFU |

Referring to the Figure, it is seen that the routine preloads the TT byte into the write buffer 107, clears the general registers to the values indicated and tests the state of tape mark flip-flop HFR27. When set, the routine branches to the common status analysis routine EXRM:CA which tests the states of the block detector indicators. When flip-flop HFR27 is not set to a binary ONE, the routine then resets all nonrelevant bits of register HFR2, updates the PSB2 byte for preamble and postamble errors, and updates the PSB3 and PSB4 bytes to indicate channel failures and multiple drop bit errors.

As seen from FIG. 14, the routine EXRM:CA is the routine which determines whether retry is to take place or if the retry space operation was successful. It is seen that the routine first tests the states of the block detector indicators of register HFR2. If they are all zero, retry can take place or the retry space was successful, and the routine branches to microinstruction EXRMCA13 which in addition to the remaining microinstructions completes compilation of PSB2 as well as setting flip-flop HFR26 to a binary ONE to indicate the detection of a data error.

If the block detector indicators of register HFR2 are not all binary ZEROS, the routine EXRM:CA of FIG. 13 tests the state of split or multiple block flip-flop HFR23 and the noise in initial gap flip-flop HFR20. If either flip-flop is set, the routine resets the retryable bit in the TT byte to a binary ZERO. This of course, prevents retry of a read operation in the case where a split block condition or noise before block condition has been detected since retry of the command under these conditions would result in mispositioning of the tape relative to the tape head.

The routine sets the block detector error bit in PSB1 when it detects that the split block flip-flop HFR23 is set as seen from FIG. 13. This results in the controller aborting the operation.

As seen from FIG. 14, the routine begins execution of routine EXRM:CB. If this is a space operation, the routine branches to a marginal condition check routine EXRM:MC which checks for noise and frame errors to update the bytes indicated. If no space, the routine ESRM:CB transfers the rest of the data frames where no tape mark was detected (i.e. flip-flop HFR27=0), and terminates the transfer. Where a tape mark is detected (i.e. HFR27=1), the routine terminates the transfer by sending a predetermined data byte to the IOC 200.

As seen from FIG. 14, the controller upon completing the status analysis branches to the routine TDHP to analyze the device status results and then returns to routine TDSA:START of FIG. 12. The routine previously discussed in connection with the write operation analyzes controller status for the purpose of determining whether retry should be initiated.

Retry Initiation

After execution of a status analysis routine, the controller 110 begins execution of a command termination routine MCMT. The controller during the execution of this routine examines the TT byte to determine if an error condition has been detected and if the error condition is retryable. When a retryable error condition exists, the controller 110 initiates execution of a retry space operation.

More specifically, referring to FIG. 12, it is seen that microinstructions MCMT040-MCMT050 of the beginning of routine MCMT check the state of the operational out flip-flop in the PSI control 102 to determine whether there is an IOC instruction waiting and whether any hardware errors were detected (e.g., PSI parity errors, register parity errors etc.). The routine begins checking the type of termination by testing different bits via microinstructions MCMT121-MCMT126.

When all of the bits 0, 1, and 2 are not set, the controller terminates the operation in a normal manner. The abort non-recoverable bit 1 and the abort manual intervention bit 2 are set upon the detection of register errors (non media errors). These errors are non-retryable and cause a branch to the routines indicated which abort the command. In the present example, it is assumed that abort software recoverable bit is set and the retryable bit 7 is set. As seen from FIG. 8, this causes the routine to branch to the retry initiation routine MCMT:RT shown in FIG. 13.

Referring to FIG. 13, it is seen that a first microinstruction in the routine tests to determine whether the operation was a space operation. The reason is that space operations are not retried because it is noted that the only abort conditions for erase and space commands map into the same abort conditions that would cause the controller not to retry the command. For example, during a space operation, preamble errors, postamble errors, drop bit errors and other data errors, errors produced by noise are not considered, that is, they ignored. Thus, the type of error conditions remaining result in conditions that would be defined as being non-retryable.

The next microinstruction MCMT:RT03 is executed which increments by one the retry count stored previously in scratch pad memory 107 (e.g. location 097). As seen from FIG. 13, the retry count is compared to the count specified by the function mask byte previously stored in scratch pad memory 107 (e.g. location 087) by microinstruction MCMTRT04H (i.e. the counts are subtracted). The function mask count indicates the number of times commands can be retried. When retry is allowed, the count is other than all ZEROS and conversely when retry is not allowed, the count is all ZEROS. Thus, when the count is all ZEROS, the controller 100 the first time through this routine in the case of an error is operative to abort the command upon sensing an all zero count.

Assuming an other than ZERO count, the routine sequences to microinstruction MCMTRT06 which tests the retry count for zero. Since this is the first retry (i.e. RRC=0), microinstructions MCMTRTO8-MCMTRT11 increment the retry count by 1, make certain that the retry count does not exceed the count in the function mask byte and abort the operation if the retry count exceeds the count specified.

The next group of microinstructions clear the TT byte, clear status and set the operation phase code to XX1. Since the controller 100 will be using the same routines normally used to execute commands, the operation phase code is used to indicate the type of operation being done. For example, by setting the "op phase" to XX1 indicates that the controller 100 is beginning a retry operation. The other two bits "XX" are modified during subsequent operations as explained herein. The microinstructions also fetch device summary status and check it for errors as shown. Microinstruction MCMTRT21 tests the state of the write flip-flop HFR02 and if it is set to a binary ONE, the routine branches to routine EXRM:RT2 concurrent with clearing the registers. If the flip-flop HFR02 is set to a binary ZERO, the routine branches to routine EXRM:RT1. These routines form a part of the main or executive read routine which has a series of entry points for executing different commands (e.g., read, backspace, space, etc.).

Re-Execution Initiation

After execution of the retry space operation, it is necessary to have the controller re-execute the original command provided the retry space operation had been performed successfully. The read status analysis routine provides indications in the TT byte as to the success of previous operation. In a manner similar to that described above, the controller 100 again executes the MCMT routine which again examines the TT byte.

More specifically, referring to FIG. 12, the routine sequences through the microinstructions and upon testing the state of bits 0-2 of the TT byte branches to routine MCMT:ST when the abort bits are not binary ONES. This routine checks to determine whether the controller is to have the device perform a space to tape mark operation. Since this is not a space to tape mark operation, the controller 100 then branches to the operation phase routine MCMT:OP. This routine checks for a non-zero operation phase code. Because this point in the command termination routine was reached, this indicates that the operation was performed successfully. The routine tests to see that one of the two high order bits of the op phase code is not zero. When these bits are ZERO, this indicates that the controller has completed execution of the command sent by IOC 200.

If one of the two bits op phase bits had been set previously, as for example by routine EXRM:RT, the controller branches to routine MCMT:MP. This routine checks to make certain that the device status has been obtained. After clearing the appropriate registers, the routine branches to the command decode routine MCMD at the point indicated in FIG. 14. As seen from FIG. 14, this causes the controller 100 to return to decode again the command code entry for re-execution of the write or read command. However, during the execution of main write or read routine of FIG. 8, the controller 100 is operative to generate a retry service code to the IOC 200.

Description of Write Retry Operation

Figure 4A:
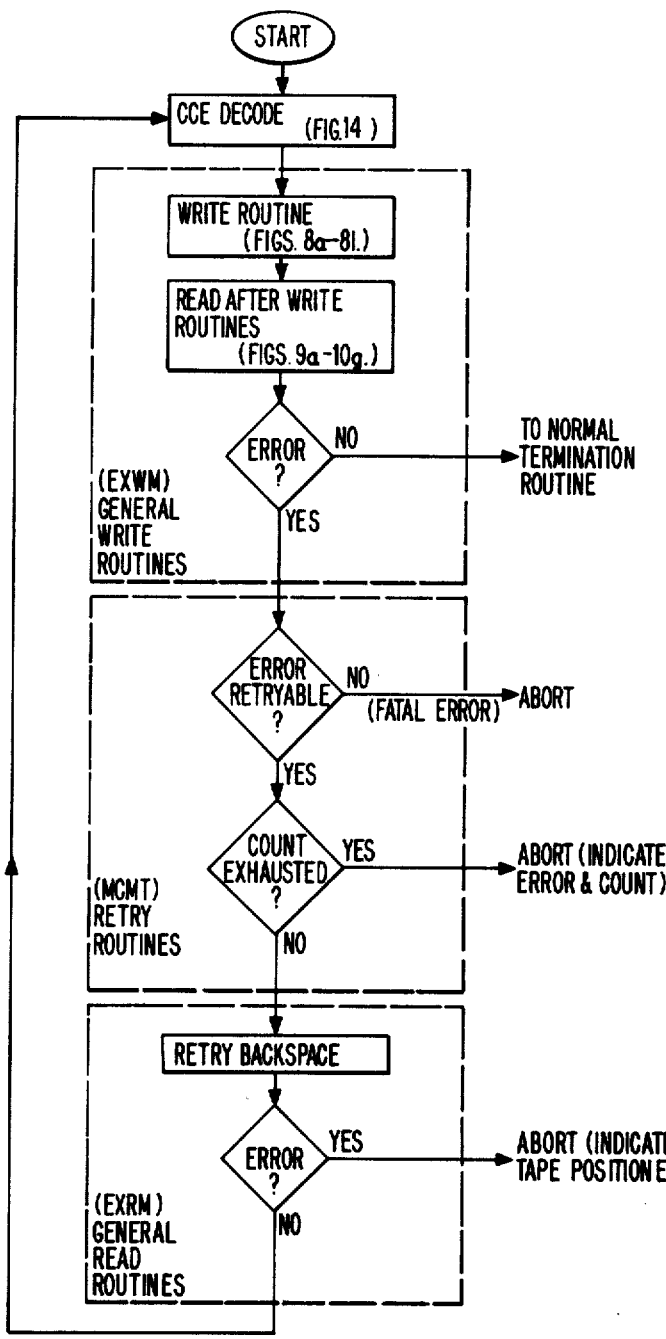
FIGS. 4a and 4b are flow charts used in explaining the way in which the peripheral processor of FIG. 1 retries a write or read command in accordance with the present invention.

In order to retry a write command, the controller 100 must detect that a block has been written with an error as indicated in FIG. 4a. The controller during execution of the write status analysis routine checks the signal indications stored in register HFR2 which define the block profile to determine if the retry space operation to be performed has a high probability of success. Since the block is known to be bad, the controller 100 is required to detect the gap for signalling the tape drive device to stop instead of detecting the postamble portion of the block. Therefore, the controller 100 is required to ensure that the initial gap area is free of noise (i.e. flip-flop HFR21 must be ZERO).

Further, the controller 100 is required to have the tape drive device head stop in the correct gap. That is, if the block has a large hole in it, the tape drive device could stop short resulting in an unerased partial block being left on tape. If the controller 100 during execution of the RAW routines of FIG. 11a detects no block, the tape drive device could space over a good block resulting in a "dropped" block. Thus, flip-flops HFR20 and HFR22 must be binary ZEROS. The other bits in register HFR2 are used as indications of a marginal write condition. They are treated as errors and do not prevent retry as they do not affect the ability of the controller 100 to position the tape drive device correctly on tape.

Assuming the presence of the above conditions (i.e. those enabling retry) and absence of hardware error conditions not relevant to this discussion (e.g. the drive did not "cycle down" or lose vacuum), the controller 100 sets the retryable bit. Since this write command is the command which was sent by the IOC 200, the op phase code is "000." The controller during execution of the write status analysis routine sets the ASR bit in the TT byte. It is also assumed that the retry count is not zero so that upon testing, the controller does not terminate operation as seen from FIG. 4a.

The presence of the same conditions causes the MCMT routine to branch the read only memory 104-2 to the MCMTRT routine and from there to the master read routine to execute the retry backspace operation as illustrated in FIG. 4a.

The controller during execution of the master read routine examines the indicator bits stored in register HFR2, after completion of the backspace operation to determine that the tape read/write head is positioned properly. Since the written block in this case is required to be contiguous (blocks must contain no holes greater than 0.08 inch to enable retry), the controller during the backspace operation should not have detected multiple blocks during the final gap distance of 0.12 inch.

Assuming that the above condition is present (flip-flop HFR23 is a binary ZERO), the controller during execution of the main read routine signals that the retry backspace operation as being successfully completed. That is, the controller does not set bits 0, 1 or 2 in the TT byte (see FIG. 13).

Assuming that the other conditions are not present regarding tape device and controller status (i.e. hardware errors), the controller upon again executing the MCMT routine proceeds as described above to the MCMTOP portion of the routine and then branches back to the command decoder routine to re-execute the write command as shown in FIG. 4a.

It can be seen from FIG. 4a that the controller 100 has now returned to a point corresponding to the beginning of the execution of the original write command. As seen from FIG. 4a, the controller repeats this entire operation until the occurrence of one of the following conditions:

1. the write operation is executed successfully;
2. the allowable number of retries defined by the retry count has been performed (count exhausted); or,
3. one of the conditions discussed above inhibits continuance of the retry operation.

Description of Read Retry Operation

Figure 4B:
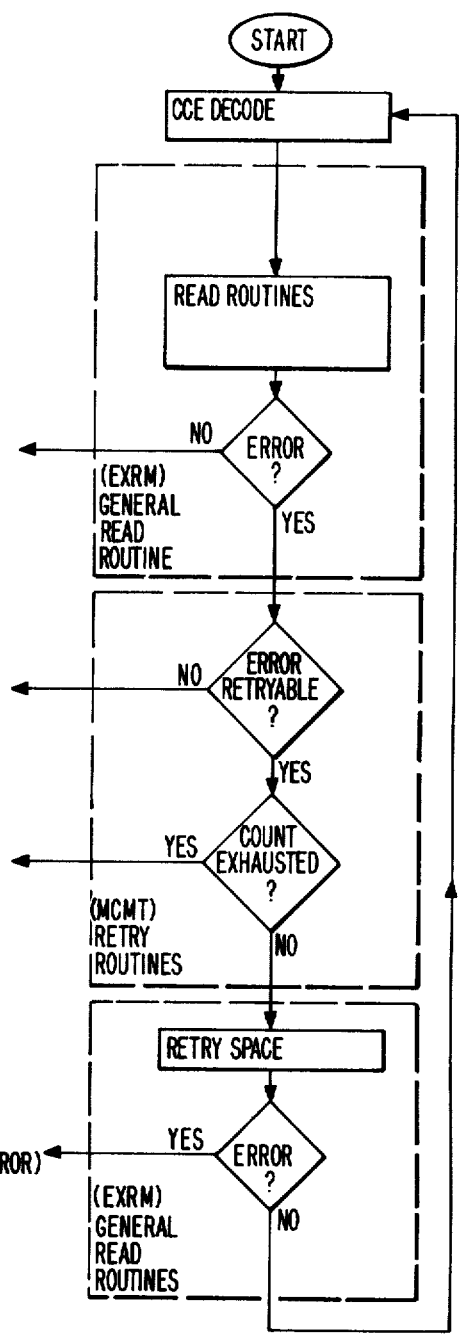

In order to retry a read command, the controller 100 must detect that the block read has an error as seen from FIG. 4b. The controller during execution of the read status analysis routine checks the signal indications stored in register HFR2 which define the block profile to determine if the retry space operation to be performed has a high probability of success. Since the block is known to be bad, the controller is required to detect the gap to stop the tape drive device instead of detecting that the block has been successfully read (i.e. detected the postamble). Therefore, the initial gap area must be free of noise implying that flip-flop HFR20 must be ZERO.

Further, the controller is required to have the tape drive device stop in the correct gap. That is, the block has a large hole in it, the tape drive device could stop short. Therefore, HFR23 must be ZERO. The state of flip-flop HFR22 is not checked since retry initiation requires that the controller 100 has not successfully read the block being retried. Thus, this bit must be ZERO because if it was a binary ONE, the command would not be retried since it is not required.

Assuming the presence of the above conditions and absence of hardware error conditions, others not relevant to this discussion (e.g. the drive did not "cycle down" or lose vacuum), the controller sets the retryable bit. Since this read command is the command sent by the IOC 200, the op phase code is "000." The controller during execution of the read status analysis routine sets the ASR bit in the TT byte. It is also assumed that the retry count is not zero.

The presence of the above conditions cause the controller to execute the MCMT routine including the MCMTRT routine and from there to execute the main read routine to execute the retry space operation as discussed above.

During execution of the main read routine, the controller examines the indicator bits stored in register HFR2 after the backspace operation to determine that the read/write head is positioned properly. Since the read block is required to be contiguous (block must contain no holes greater than 0.08 inch for retry), the controller during the backspace operation should not have detected multiple blocks during the final gap distance of 0.12 inch.

Assuming that the above conditions are present (flip-flop HFR22, HFR22 and HFR23 are binary ZEROS), the controller upon executing the main read routine signals that the retry backspace operation has been successfully completed. That is, it does not set bits 0, 1 or 2 in the TT byte.

Assuming that the other conditions are not present regarding the device and controller hardware errors, the controller proceeds to execute the MCMT routine including the MCMTOP portion and then returns to the command decoder routine to re-execute the read command as shown in FIG. 4b.

It can be seen that the controller has now returned to a point corresponding to the beginning of execution of the original read command. As seen from FIG. 4b, the controller repeats the entire operation until upon the occurrence of one of the following conditions:

1. The read operation is executed successfully;
2. The allowable number of retries has been performed (i.e. count exhausted); or,
3. One of the conditions discussed above inhibits continuance of the retry operation.

From the foregoing, it is seen that the method and apparatus of the present invention provides for efficient retry of commands by a peripheral subsystem. In accordance with the present invention, retry is initiated only when the peripheral controller of the subsystem determines that the command can be successfully re-executed. Additionally during the execution of the retry operation, the controller determines whether the retry operation is progressing successfully before re-execution of the command takes place. More specifically, during a write retry operation, the controller tests signal indicators representative of the profile characteristics of the block read during the backspace operation to determine whether the command can be re-executed successfully.

The arrangement of the present invention enables the sybsystem to retry commands without having to provide additional control storage for special routines. That is, the controller shares the microprogram routines normally used in executing commands.

It will be obvious to those skilled in the art that many changes can be made to the illustrated embodiment without departing from the scope of the present invention. For example, although the invention was described with reference to phase encoded write and read operations, it should be obvious that the invention can be used with different methods of recording.

To prevent undue burdening of the description within the ken of those skilled in the art, a block diagram approach has been followed, with a detailed functional description of each block and specific identification of the circuits it represents. The individual engineer is free to select elements and components such as flip-flop circuits, registers, etc. from his own background or from available standard references such as Computer Design Fundamentals, by Chu (McGraw-Hill Book Company, Inc.), and Pulse, Digital and Switching Waveforms by Millman and Taub, (McGraw-Hill Book Company, Inc.).

The engineer is free to select microinstruction word formats from his own background or from standard references such as Computer Organization and Microprogramming by Chu (Prentice-Hall Inc.) Copyright 1972 in addition to those shown in the U.S. Patents referenced herein.

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

What is claimed is:

1. A method for retrying commands received by a magnetic tape peripheral controller from a data processing unit coupled to said controller during the handling of error conditions occurring during the execution of read and write operations respectively in which information bytes of digital signals of a block having a predetermined format are read from a multichannel magnetic medium and written by a magnetic tape device on said multichannel magnetic medium, said device coupled to said controller, said controller including processing means, recovery means coupled to said device for assembling said digital signals into said bytes, said recovery means including activity detector means responsive to said signals to generate signals indicative of the rate at which said signals are being received, and indicator storage means coupled to said detector means and to said processing means, said method comprising the steps of:

- a. generating output signals by said activity detector means during the monitoring of the reception of said digital signals received by said recovery means from said tape device corresponding to said bytes of said block being read by said tape device from said medium for a predetermined number of time intervals during the execution of an operation by said controller processing means specified by a command received from said data processing unit;
- b. storing a plurality of error signal indications in said indicator storage means in response to said output signals from said activity detector means which define the profile characteristics of said block detected during step (a); and,
- c. generating signals by said controller processing means for initiating a retry of said command and re-execution of said operation upon the completion of said operation upon detecting an error condition only when said error signal indications stored in indicator storage means signal that said profile characteristics of said block read during said operation indicate that said device can reliably retry said operation.

2. The method of claim 1 wherein said command is a write command coded to specify a write operation and wherein said method further includes the steps of:

- d. generating signals by said controller processing means to said device to perform a backspace operation;
- e. monitoring by said activity detector means the reception of signals from said tape device representative of the bytes of said block read by said tape device from said medium within a predetermined number of intervals during the execution of said backspace operation by said device;
- f. storing by said processing means a plurality of signal indications in said indicator storage means in response to said signals received by said activity detector means which define the profile characteristics of said block detected during step (e); and,
- g. generating signals by said processing means for continuing said retry of said operation by initiating re-execution of said write command only when said signal indications stored in said indicator storage means indicate that said write command can be reliably executed by said device.

3. The method of claim 2 wherein one of said predetermined number of intervals occurring during said backspace operation is modified in a predetermined manner during the monitoring of said signals in step (e).

4. The method of claim 1 wherein said command is a read command coded to specify a read operation and wherein said method further includes the steps of:

- h. said controller processing means generating signals to said device to perform a space operation in a direction opposite to that specified by said read command;
- i. generating output signals by said activity detector means during the monitoring of the reception of signals from said tape device representative of the bytes of said block being read from said medium by said device within a different predetermined number of intervals during the execution of said space operation;
- j. storing a plurality of signal indications in said indicator storage means in response to said signals received from said activity detector means which define said profile characteristics of said block being read from said medium within said different predetermined number of intervals during step (i); and,
- k. generating signals by said processing means for continuing said retry of said operation by initiating re-execution of said read command only when said signal indications stored in said indicator storage means signal that said read command can be reliably executed by said device.

5. The method of claim 1 wherein said method further includes the steps of:

grouping different ones of said error signal indications stored in said indicator storage means into at least first and second categories; and, inhibiting initiating of said retry of said command when said processing means detects the presence of said stored signal indications of a first one of said categories.

6. The method according to claim 3 wherein said predetermined manner of modifying said one of predetermined number of intervals results in generating signals to said tape device during said backspace operation for causing said device to space on said medium for a distance greater than that corresponding to a maximum amount of damage which said signal indications stored in step (f) can occur in said profile characteristics of said block without inhibiting the retry of said operation.

7. The method according to claim 3 wherein said tape device includes recording and playback heads and wherein predetermined ones of said time intervals have a predetermined relationship to the distance between said recording and playback heads.

8. The method according to claim 5 wherein said command is coded to specify a write operation wherein said predetermined number of time intervals consist of an initial gap interval, a beginning of block window interval, an end of block interval and a drop-off window interval, said controller processing means being operative to monitor said output signals from said activity detector means for detection of noise during said initial gap interval beginning at the start of said block signaled by said device during said beginning of block window interval, the continuity of said profile characteristics during said end of block interval and detection of discontinuance of said output signals indicating a drop-out of said block during said drop-off window interval.

9. The method according to claim 8 wherein said first category of stored signal indications define a no block condition, a multiple block condition and a noise in initial gap condition, said controller processing means being operative to signal said no block condition of said signals from the end of said initial gap interval to the beginning of said drop-off window interval, said multiple block detected condition upon detection of a predetermined number of said signals being received in succession followed by a discontinuance of receiving said signals for a predetermined period of time during said beginning of block window interval and said signal noise in initial gap condition upon detecting receipt of less than said predetermined number of said signals during said initial gap interval.

10. The method of claim 9 wherein storage of any one of said signal indications in said first category inhibits said controller processing means from performing said step (c) of generating signals for initiating said retry of said command.

11. The method of claim 9 wherein said predetermined number of said signals being received in succession corresponds to five consecutive bytes which defines detection of said block.

12. The method of claim 8 wherein said second category of stored signal indications define a late block condition, a short block condition, a long block condition and a noise condition, said controller processing means being operative to signal said late block condition from said output signals upon detecting that said predetermined number of said digital signals have been received after the beginning of said block window interval, signal said short block condition from said output signals upon detecting that said predetermined number of said digital signals had been received during said beginning of block window interval and then detected discontinuance of said output signals prior to said drop-off window interval, signal said long block condition from said output signals upon detecting that said predetermined number of said digital signals have been received during said beginning of block window interval and that said digital signals continued to the end of said drop-off window interval and signal said noise condition from said output signals upon detecting less than said predetermined number of said digital signals in other than during said initial gap interval.

13. The method of claim 12 wherein storage of different ones of said signal indications in said second category does not inhibit said controller processing means from performing said step (c) of generating signals for initiating said retry of said command.

14. The method according to claim 13 wherein said controller processing means performs said step (c) of generating said signals when said signal indications signal that none of the conditions in said first category are present and that any one of the conditions or all of the conditions are present in said second category.

15. The method of claim 13 wherein said tape device includes recording and playback heads and said initial gap interval corresponds to the interval equal to the minimum distance from said recording head to said playback head of said tape device, said beginning of block window interval coresponds to a distance defining the maximum amount of allowable damage which said block can have, said end of block interval corresponds to distance equal to said initial gap interval distance and said drop-off window interval corresponds to a distance equal to said beginning of block window interval distance.

16. The method of claim 2 wherein said method further includes the steps of:
grouping different ones of said stored signal indications into at least first and second categories; and
inhibiting re-execution of said write command when said stored signal indications of a predetermined one of said categories are present.

17. The method of claim 2 wherein said different predetermined number of time intervals consists of an initial gap interval and a final gap interval, said controller processing means being operative to monitor said output signals for detection of noise during said initial gap interval beginning upon receiving an up to speed indication from said tape device in addition to ending at the start of said block and the detection of noise during said final gap interval beginning at the end of said block and ending a predetermined distance following said end of block.

18. The method according to claim 16 wherein said first and second categories of stored signal indications define a noise before block condition, a noise after block condition and a multiple block condition, said controller processing means being operative to signal said noise before block condition upon detecting less than a predetermined number of said signals being received in succession during said initial gap interval, signal said noise after block condition upon detecting less than a predetermined number of said signals being received in succession during said final gap interval and signal said multiple block condition upon detecting a predetermined number of said signals being received following the end of said initial gap interval and during said final gap interval.

19. The method according to claim 18 wherein storage of any one of said signal indications in said first category inhibits said controller processing means from performing step (g) of initiating re-execution of said write command.

20. The method according to claim 18 wherein storage of any one of said signal indications in said second category does not inhibit said controller processing means from performing said step (g) of initiating re-execution of said write command.

21. A method for retrying commands executed by a peripheral controller received from a data processing unit involving any one of a plurality of storage devices coupled to said controller, each of said storage devices having a storage medium on which blocks of digital signals are recorded, said commands being retried in response to error conditions occurring during input/output operations specified by said commands in which digital signals of a block are read from said storage medium or written on the storage medium of a selected one of said plurality of storage devices, said controller including processing means, data recovery means coupled to said plurality of said devices and storage means coupled to said recovery means and to said processing means, said method comprising the steps of:

a. reading from said storage medium, information bytes of said block during the execution of an input/output operation by a selected one of said devices specified by one of said commands received from said unit;

b. transferring signals representative of said bytes by said one device to said controller recovery means;

c. storing by said processing means a plurality of signal indications in said storage means in response to said signals received by said recovery means denoting the profile characteristics of said block being read from said medium during said execution of said operation by said device;

d. grouping by said processing means different ones of said signal indications in said storage means into to at least first and second categories of conditions; and, e. initiating the start of a retry of said input/output operation by said processing means upon completing execution of said operation only upon detecting that none of the indications in said first category has been stored in said storage means signaling that said operation can be retried reliably by said device.

22. The method according to claim 21 wherein said one of said commands is coded to specify a write operation and wherein said method further comprises the steps of:

f. generating signals by said processing means to said device to perform a backspace operation;

g. monitoring the reception of digital signals by said data recovery means from said device representative of the bytes of said block written in response to said one of said commands being read by said storage device from said medium within a different predetermined number of intervals during the execution of said backspace operation by said device;

h. storing by said processing means a plurality of signal indications in said storage means in response to said signals received by said recovery means which define the profile characteristics of said block detected during step (g); and, i. generating signals by said processing means for continuing the retry of said operation by initiating re-execution of said write command only when said signal indications in said storage means indicate that said write command can be reliably executed by said device.

23. The method according to claim 21 wherein one of said commands is coded to specify a read operation and wherein said method further includes the steps of:

j. generating signals by said processing means to perform a space operation in a direction opposite to that specified by said read command;

k. monitoring the reception of signals by said recovery means representative of the bytes of said block previously read in response to said one of said commands being read by said storage device from said medium within a different predetermined number of intervals during the execution of said space operation;

l. storing by said processing means a plurality of signal indications in said storage means in response to said signals received by said recovery means which define said profile characteristics of said block being read from said medium within said different predetermined number of intervals during step (k); and, m. generating signals by said processing means for continuing retry of said operation by initiating re-execution of said read command only when signal indications stored in said storage means by said controller indicate that said read command can be reliably executed by said storage device.

24. A data processing system including an input/output processing unit including storage for a plurality of channel command entries (CCE's), each entry including a plurality of control bytes, one of said bytes corresponding to a command byte coded to specify an operation to be performed, a microprogrammed peripheral controller coupled to said input/output processing unit and responsive to command control bytes from said processing unit to perform input/output operations involving a selected one of a plurality of storage devices coupled to said peripheral controller, said controller comprising:

an addressable control store for storing microprograms including a plurality of microinstructions used for transferring bytes of a block between said input/output unit and a selected one of said devices in response to one of said command control bytes;

decoder means coupled to said control store for generating control signals in response to decoding microinstructions read out from said control store;

data transfer means operatively coupled to receive signals from said selected one of said devices during the execution of said operation to be performed specified by one of said command bytes, said data transfer means including activity detector means coupled to receive said signals and operative to generate output signals indicative of the rate at which said signals are being received; and, signal indicator storage means coupled to said detector storage means and to said decoder means, said signal indicator storage means being conditioned by signals from said decoder means during a predetermined number of time intervals occurring during execution of said operation to store a plurality of signal indications which define the profile characteristics of said block being read from said device as signaled by said activity detector means output signals; and, said controller including means operative upon detecting an error to address said control store for read out of microinstructions for generating signals to initiate retry of said command by said device only when said signal indications stored in said indicator storage means representative of said profile block characteristics signal said controller that retry of said command can be executed reliably.

25. The system of claim 24 wherein said plurality of channel command entries form a channel program and wherein said controller further includes storage means for storing a count indicating the number of times said controller can retry commands of said channel program, said controller means in response to errors being operative to address said control store for read out microinstructions for conditioning said decoder means to generate signals for sensing whether said count has been exhausted thereby inhibiting retry of said command.

26. The system of claim 24 wherein said one of said command bytes is coded to specify a write operation and each of said plurality of said storage devices is a magnetic tape device connected for reading and writing respectively bytes of digital signals of blocks from and on a magnetic type medium, said controller means being operative to address said control store for read out of a number of microinstructions, said decoder means in response to said number of microinstructions generating signals to cause said selected device to perform a backspace operation across said magnetic tape medium and said control store including means for receiving a control signal from said device signaling the beginning of execution of said backspace operation, said controller means being conditioned by said control signal to address said control store for read out of sequences of microinstructions during a predetermined number of time intervals of said operation, said decoder means in response to said sequences generating signals for causing said signal indicator storage means to store a plurality of signal indications which define said profile characteristics of said block written in response to said one of said command control bytes being read by said device during said backspace operation as signaled by said detector output signals, and said controller means being operative upon detecting an error condition to address said control store for read out of another sequence of microinstructions, said decoder means being conditioned by said another sequence to generate signals for initiating re-execution of said write command only when said stored indications signal said controller that said command can be re-executed reliably by said magnetic tape device.

27. The system of claim 26 wherein said controller further includes a first register coupled to said control store for receiving different predetermined counts for defining different ones of said predetermined intervals and said decoder means being operative to generate signals for loading said first register with a predetermined count for defining a last one of said predetermined intervals to have a duration sufficient in length to space across a maximum amount of damage which said stored signal indications can define as occurring within said block without inhibiting said controller from re-executing said write command.

28. The system of claim 24 wherein said controller further includes:
    a counter coupled to said control store, said counter being operative to receive initally an index count read out from said control store;
    clocking circuits for applying clock pulse signals to said counter for decrementing said counter to a predetermined count for generating timing signals defining intervals for transferring said bytes between said controller and said selected one of said devices; and,
    a first register coupled to said control store, said register being operative to receive different counts read out from said control store for defining different ones of said predetermined number of time intervals, said decoder means being operative to generate signals for sampling said detector output signals and for decrementing the count contents of said first register to a predetermined count in response to said timing signals for establishing the end and duration of each of said predetermined number of time intervals.

29. The system of claim 24 wherein said command is coded to specify a read operation, said controller means being operative to address said control store for read out of a number of microinstructions, said decoder means in response to said number of microinstructions generating signals for conditioning said device to perform an operation for spacing across said storage medium and said control store including input means for receiving a control signal from said selected device signaling the beginning of execution of said space operation, said controller means being conditioned by said control signal to address said control store for read out of further sequences of microinstructions, during a predetermined number of time intervals of said operations, said decoder means in response to said further sequences of microinstructions generating signals for conditioning said signal indicator storage means to store a plurality of signal indications defining said profile characteristics of said block first read in response to said one of said command control bytes being read during said space operation as signaled by said detector output signals; and,
    said controller means being operative upon detecting an error condition to address said control store for read out of other microinstructions, said decoder means in response to said other microinstructions generating signals for initiating re-execution of said read command by said device only when said stored indications signal said controller that said command can be re-executed reliably by said device.

30. The system of claim 26 wherein said stored signal indications are grouped into first and second categories of conditions, said first category of stored signal indications coded to define a no block condition, a multiple block condition and a noise initial gap condition, said controller means being conditioned by said detector output signals to signal said no block condition upon detecting the occurrence of an absence of said signals from the end of said initial gap interval to the beginning of said drop-off window interval, to signal said multiple block detected condition upon detecting a predetermined number of said digital signals being received in succession followed by a discontinuance of receiving said digital signals for a predetermined period of time during said beginning of block window interval and to signal said signal noise in initial gap condition upon detecting receipt of less than said predetermined number of said digital signals during said initial gap interval.

31. The system of claim 26 wherein said storage devices are magnetic tape devices, each having read and write heads and wherein predetermined ones of said time intervals have a predetermined relationship to a time interval of delay between said read and write heads.

32. The system of claim 30 wherein storage of any one of said signal indications in said first category of conditions causes said controller to inhibit generating said signals for initiating said retry of said command.

33. The system of claim 30 wherein said second category of stored signal indications define a late block condition, a short block condition, a long block condition and a noise condition, said controller means being conditioned by said detector output signals to signal said late block condition upon detecting that said predetermined number of said signals have been received after said being of block window interval, signal said short block condition upon detecting that said predetermined number of said signals have been received during said beginning of block window interval and followed by discontinuance of said signals prior to said drop off window interval, signal said long block condition upon detecting that said predetermined number of said signals have been received during said beginning of block window interval and that said signals continued to the end of said drop off window interval and signal said noise condition upon detecting less than said predetermined number of said signals other than during said initial gap interval.

34. The system of claim 29 wherein the duration and said predetermined number of said time intervals of said read operation and said sapce operation are the same.

35. A peripheral controller coupled to a data processing system and to a plurality of magnetic tape devices connected to read and write frames of digital signals arranged in blocks on a number of channels of a magnetic medium, each block having a predetermined format, said controller including processing means, an addressable control store for storing microprograms used to perform read and write operations in response to commands received from said processing system, decoder circuits coupled to said control store for generating control signals in response to decoding microinstructions read out from said control store, a data recovery unit for assembling into bytes digital signals transferred by a selected device, said recovery unit having an input coupled to receive said digital signals from said selected device and an output coupled to said processing means and including a plurality of error indicator storage circuits operative to store signals indicative of error conditions occurring during the assembling of said digital signals into bytes and activity detector means coupled to said input and operative to generate signals indicative of the rate at which said digital signals are being received, said controller further including retry apparatus comprising:

- signal indicator storage means coupled to said activity detector means and to said processing means;
- said control store further including a plurality of microinstructions of a retry routine and a plurality of predetermined sequences of microinstructions included in said microprograms for monitoring signals generated by said activity detector means;
- said decoder circuits being operative during the execution of said operation to generate signals in response to read out of said predetermined sequences of microinstructions for conditioning said signal indicator storage means during a predetermined number of time intervals during execution of an operation to store signal indications which define a profile of said block being transferred in accordance with said signals generated by said activity detector means; and,
- said controller processing means upon detecting an error condition stored by said error indicator storage circuits to address said control store for read out said microinstructions of said retry routine to initiate retry of said command only when said signal indications stored by said indicator storage means representative of said profile signals indicate to said controller processing means that said selected device can retry said command reliably.

36. The controller of claim 35 wherein said one command is coded to specify a write operation and said controller processing means is operative to address said control store for read out of a sequence of microinstructions, said decoder means in response to said sequence of generating signals to cause said selected device to perform a backspace operation across said magnetic tape medium and said control store including input means for receiving a control signal from said device signaling the beginning of execution of said backspace operation, said processing means being conditioned by said control signal to address said control store for read out of sequences of microinstructions during a predetermined number of time intervals of said operation, said decoder means in response to said sequences generating signals for causing said signal indicator storage means to store a plurality of signal indications which define said profile of said block being read by said device during said backspace operation as signaled by said detector output signals; and said controller processing means being operative upon detecting an error condition to address said control store for read out of another sequence of microinstructions of said retry routine, said decoder means in response to said another sequence generating signals for initiating re-execution of said write command only when said stored indications signal said processing means that said command can be re-executed reliably by said device.

37. The controller of claim 35 wherein said command is coded to specify a read operation, said controller processing means being operative to address said control store for read out of microinstructions, said decoder means in response to said microinstructions generating signals for conditioning said device to perform a space operation across said tape medium and said control store including input means for receiving a control signal from said selected device signaling the beginning of execution of said space operation, said processing means being conditioned by said control signal to address said control store for read out of further sequences of microinstructions during a predetermined number of time intervals of said operation, said decoder means in response to said further sequences generating signals for having said signal indicator storage means store a plurality of signal indications which define said profile of said block being read during said space operation as signaled by said detector output signals; and said controller processing means being operative upon detecting an error condition to address said control store for read out of said microinstructions of said retry routine, said decoder means in response to said microinstructions generating signals for initiating re-execution of said read command only when said stored indications signal said processing means that said command can be re-executed reliably by said device.

38. The controller of claim 35 wherein said controller further includes:

- a counter coupled to said control store, said counter being operative to receive initially an index count read out from said control store;
- clocking circuits for applying clock pulse signals to said counter for decrementing said counter to a predetermined count for generating timing signals defining intervals for transferring said bytes between said controller and said selected one of said devices; and
- a first register coupled to said control store, said register being operative to receive different counts read out from said control store for defining different ones of said predetermined number of time intervals, said decoder means being operative to generate signals for sampling said detector output signals and for decrementing the count contents of said first register to a predetermined count in response to said timing signals for establishing the end and duration of each of said predetermined number of time intervals.

39. The controller of claim 36 wherein said activity detector means includes:

zone detector means coupled to said input and operative to generate output signals in response to receiving said signals from a predetermined group of said number of channels for establishing a first criterion; and, block detector means coupled to said input and operative to generate output signals in response to receiving said signals from a different group of said number of channels for establishing a second criterion;

said controller processing means being operative during the retry of a command coded to specify a write operation to store said signal indications in accordance with said output signals from said zone detection means during execution of said write operation and to store indications in accordance with said output signals from said block detector means during said backspace operation thereby utilizing said first and second criteria for those parts of a write retry operation subject to different variations.

* * * * *

UNITED STATES PATENT OFFICE
CERTIFICATE OF CORRECTION

PATENT NO. : 3,984,814

DATED : October 5, 1976

INVENTOR(S) : Myrl Kennedy Bailey, Jr. & George J. Barlow

It is certified that error appears in the above-identified patent and that said Letters Patent are hereby corrected as shown below:

Column 48, line 63, delete "type" and insert --tape--.

Column 51, line 3, delete "sapce" and insert --space--.

Signed and Sealed this

Twenty-second Day of March 1977

[SEAL]

Attest:

RUTH C. MASON
*Attesting Officer*

C. MARSHALL DANN
*Commissioner of Patents and Trademarks*